(12) United States Patent
    Paiva

(10) Patent No.: US 10,897,538 B1
(45) Date of Patent: *Jan. 19, 2021

(54) ARTIFICIAL INTELLIGENCE FOR A GRAPHICALLY INTERACTIVE VOICE RESPONSE SYSTEM

(71) Applicant: Talkdesk, Inc., San Francisco, CA (US)

(72) Inventor: Tiago Paiva, San Francisco, CA (US)

(73) Assignee: TALKDESK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,627

(22) Filed: Nov. 30, 2019

Related U.S. Application Data

(60) Provisional application No. 62/901,547, filed on Sep. 17, 2019.

(51) Int. Cl.
    *H04M 3/51* (2006.01)
    *G06F 3/0482* (2013.01)
(52) U.S. Cl.
    CPC ........ *H04M 3/5166* (2013.01); *G06F 3/0482* (2013.01); *H04M 2203/355* (2013.01)

(58) Field of Classification Search
    CPC ........... H04M 3/5232; H04M 2201/42; H04M 3/42161; H04M 3/5175; H04M 3/5191; G06F 3/0482
    USPC ............ 379/265.02, 265.09, 265.01, 265.05, 379/265.11, 247
    See application file for complete search history.

(56) References Cited

U.S. PATENT DOCUMENTS

| | | | | |
|---|---|---|---|---|
| 6,064,730 A | * | 5/2000 | Ginsberg ............ | H04M 3/5191 379/265.09 |
| 2002/0073207 A1 | * | 6/2002 | Widger ................. | H04M 3/436 709/227 |
| 2010/0166158 A1 | * | 7/2010 | Costello .............. | H04M 3/5166 379/88.04 |

* cited by examiner

*Primary Examiner* — Thjuan K Addy

(57) ABSTRACT

The graphical programming call router features a rich library of powerful and easy-to-use components that administrators can use to seamlessly drop in contact center actions such as data dips, complex interactive voice responses ("IVRs") and call recordings, among many others. This makes it easy to visualize the exact structure and outcome of any call flow. The graphical programming call router also offers granular queue management functionality so you can get specific around call prioritization, wait time and time-based actions on virtual queues.

20 Claims, 49 Drawing Sheets

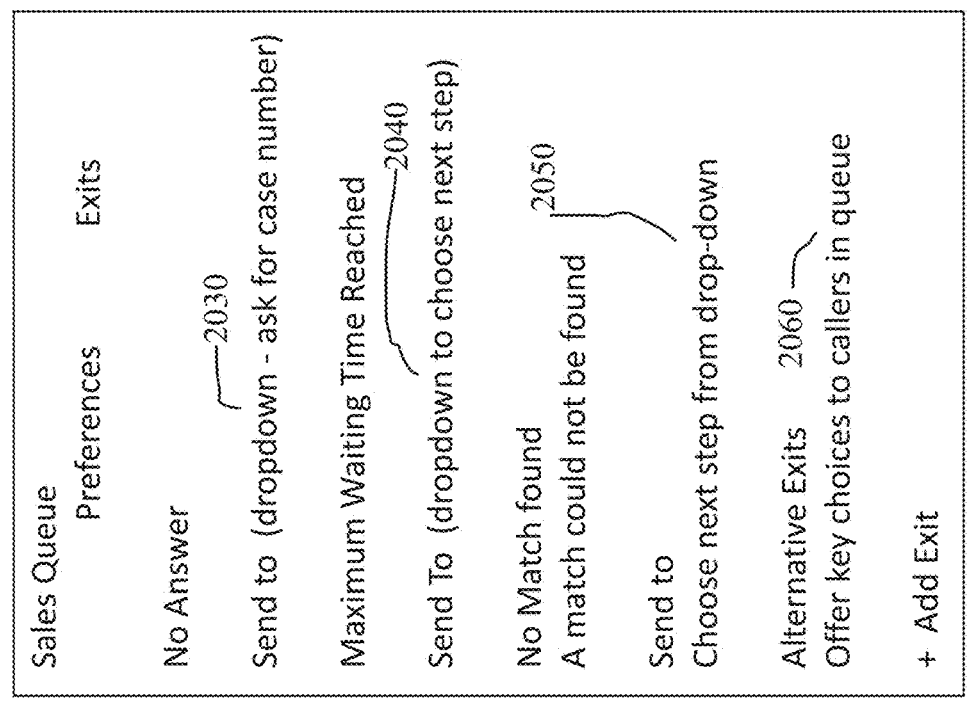
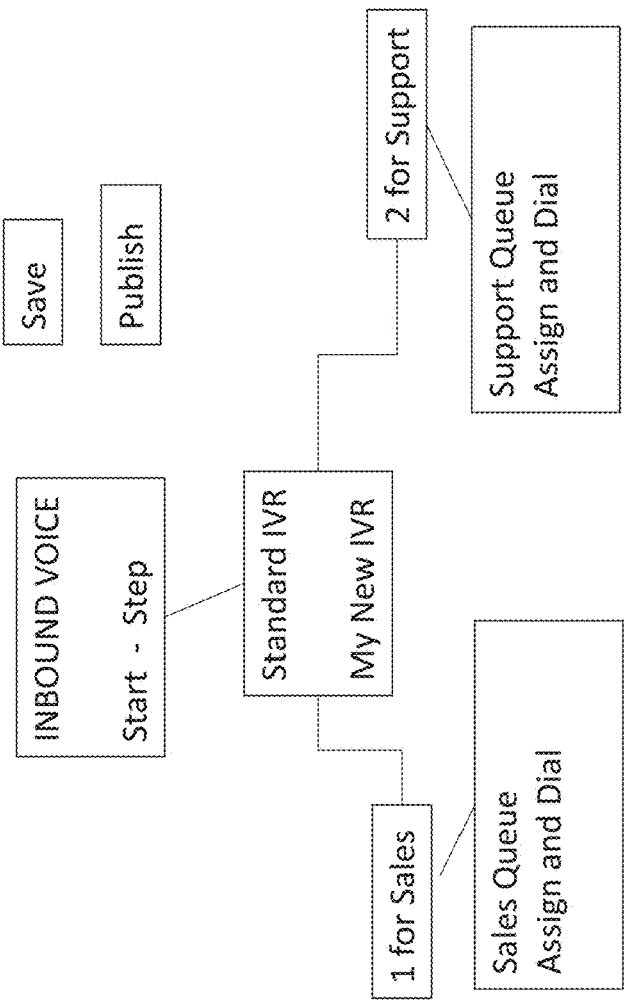
FIGURE 20

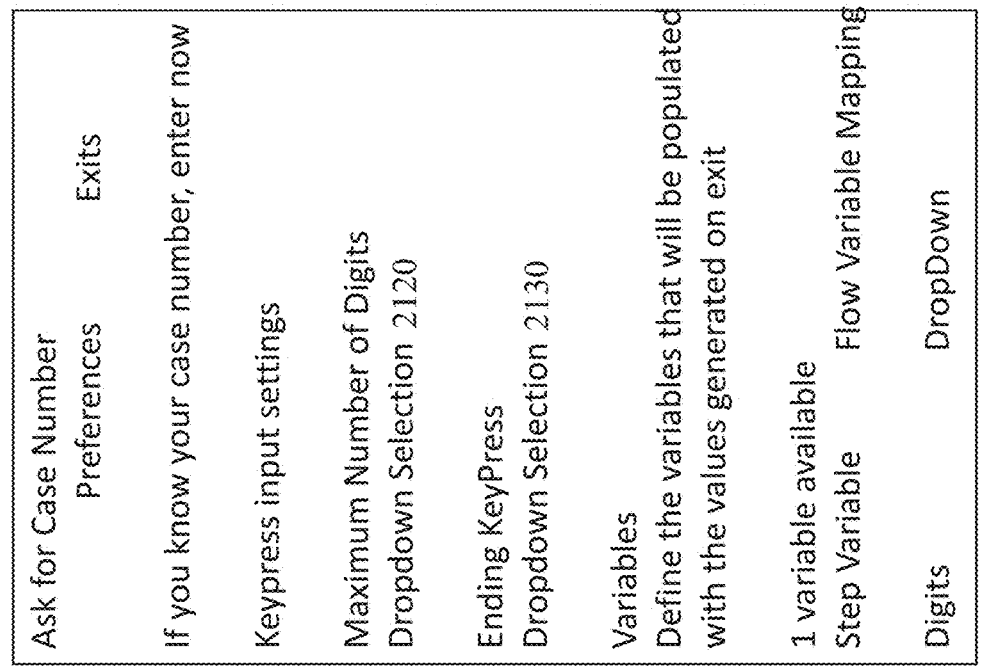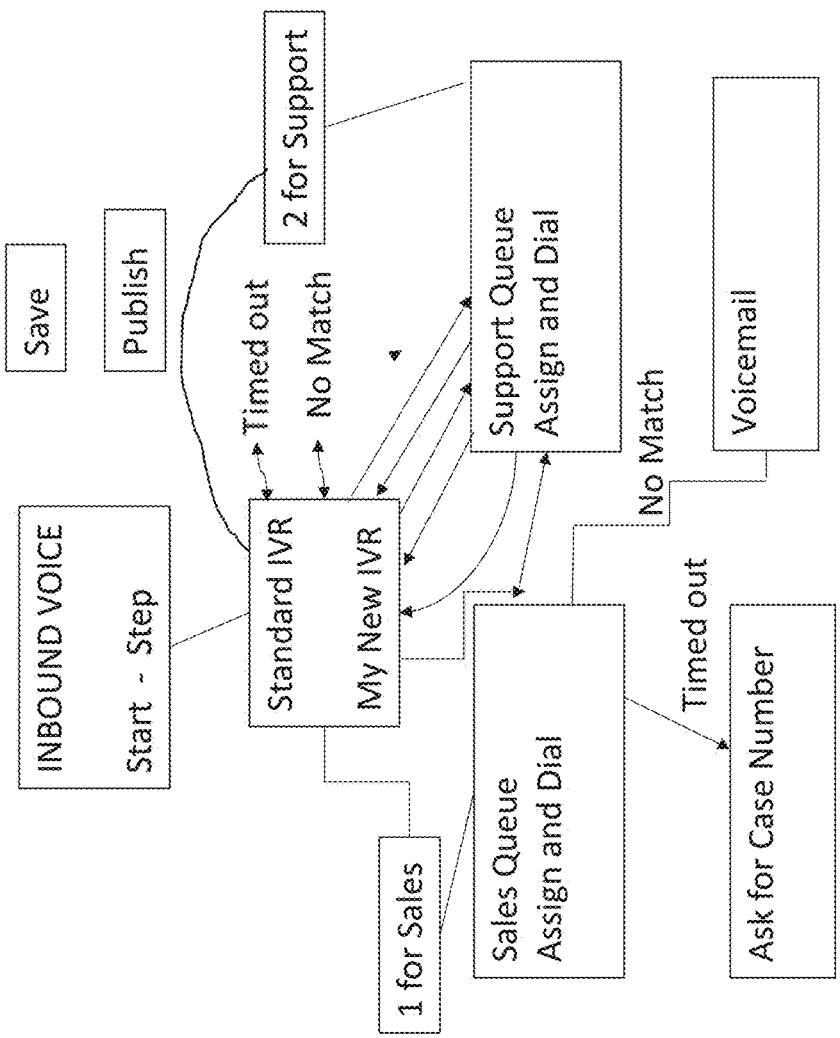
FIGURE 21

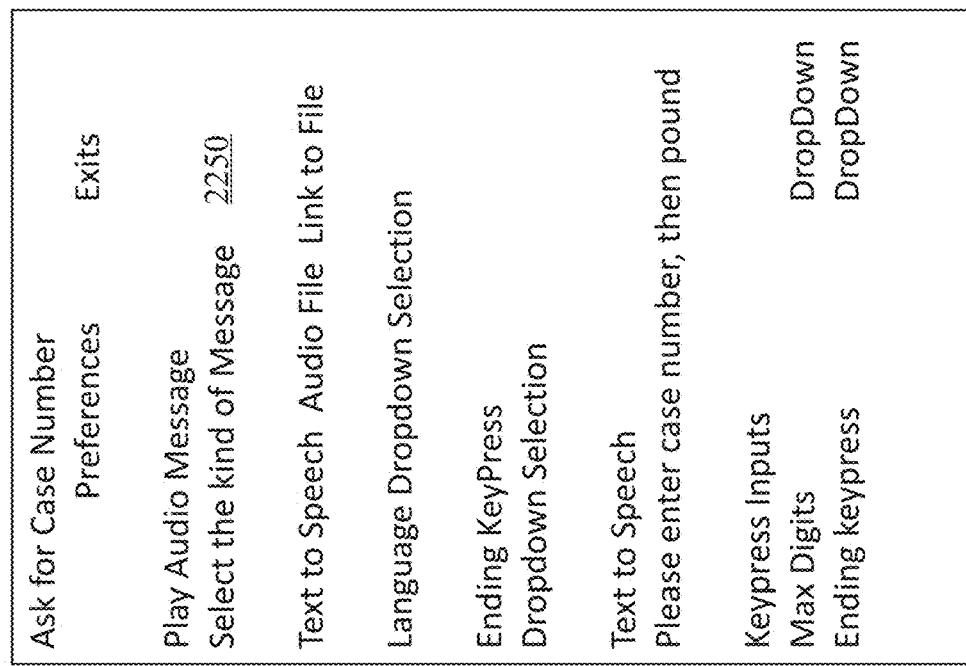
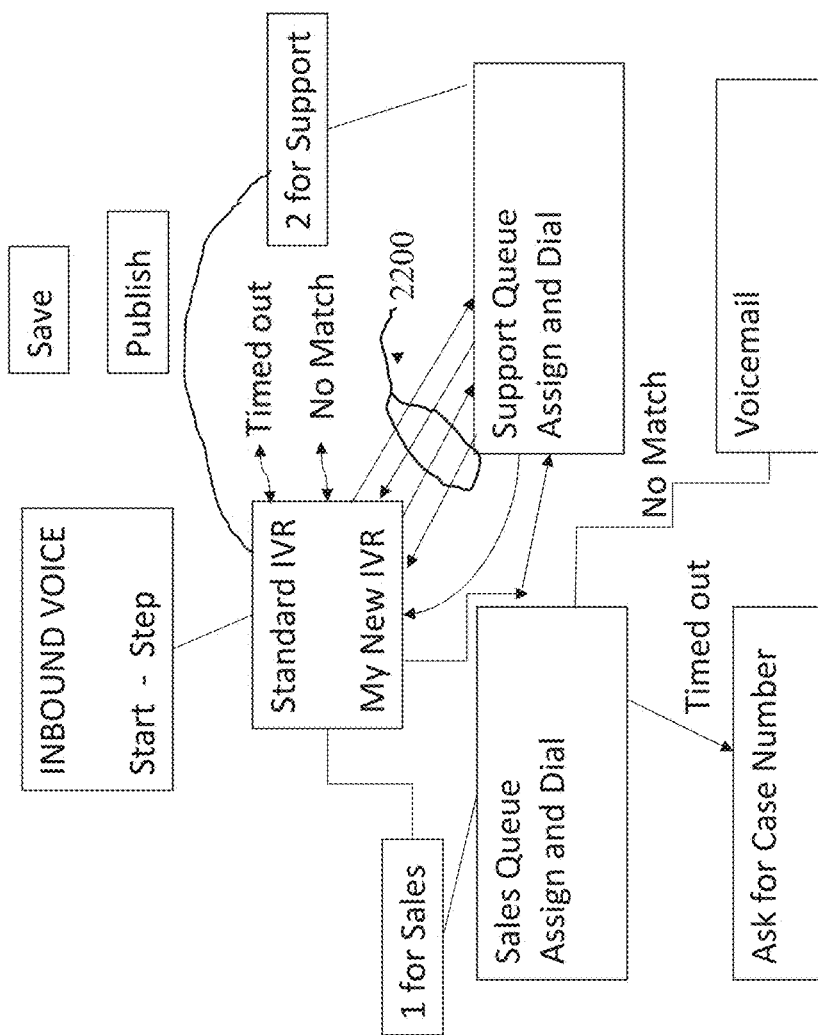
FIGURE 22

PREFERENCES                    2400

The Step Variable available allows you to configure a variable for the context
That will be generated in this component and use it in the future flow

CALENDAR

Preferences                    Exits

Variables
Define Variables that will be populated with the values generated on exit 1 Variable available Step Variable                  Flow Variable Mapping Match String                   Calendar Rules Dropdown Menu

FIGURE 24

Terminology
Archived
Component
Data Dips
Dash
Flow
Flow Editor
Flow Manager
Interaction
Published Studio Components
Assignment and Dial
Auto Answer
Calendar Based Rules
    Preferences
    Exits
Callback
Conditional Statement
Custom Data Dip
Estimated Waiting Time
Forward to External Number
Hangup Call
Inbound Voice
Input IVR

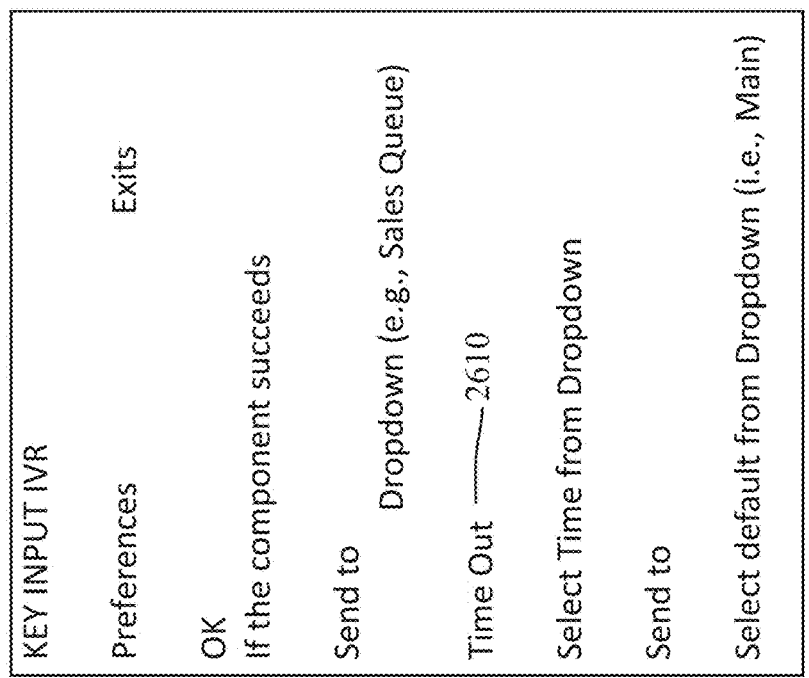
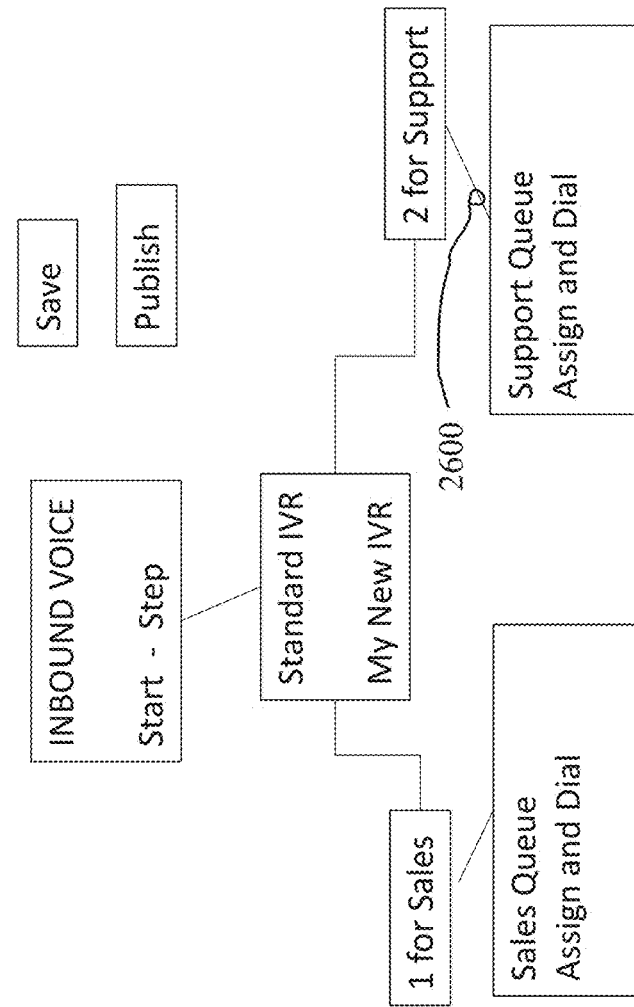
FIGURE 26

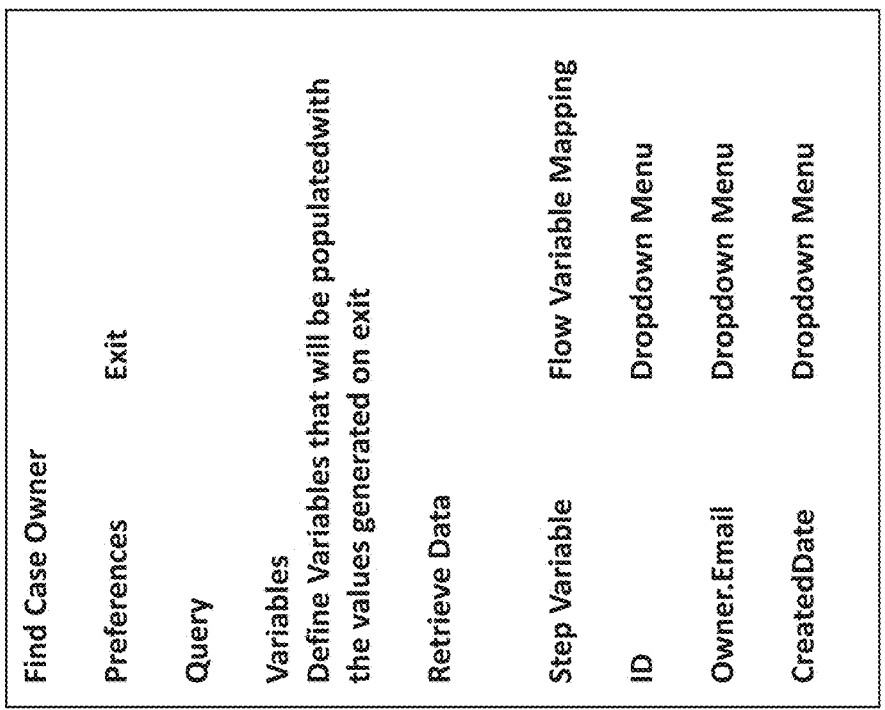
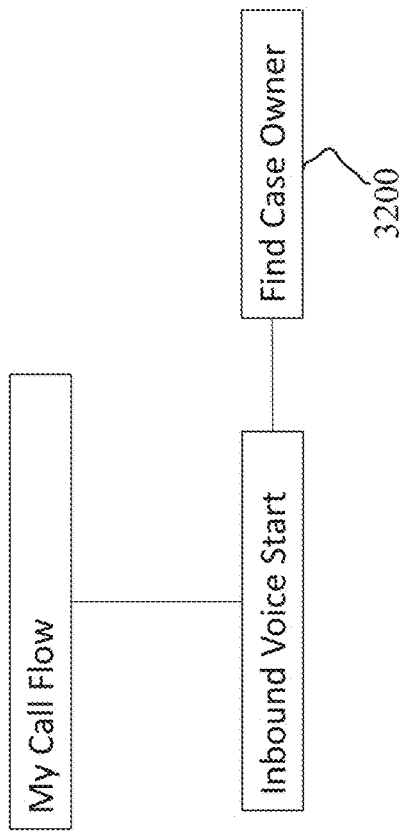
FIGURE 32

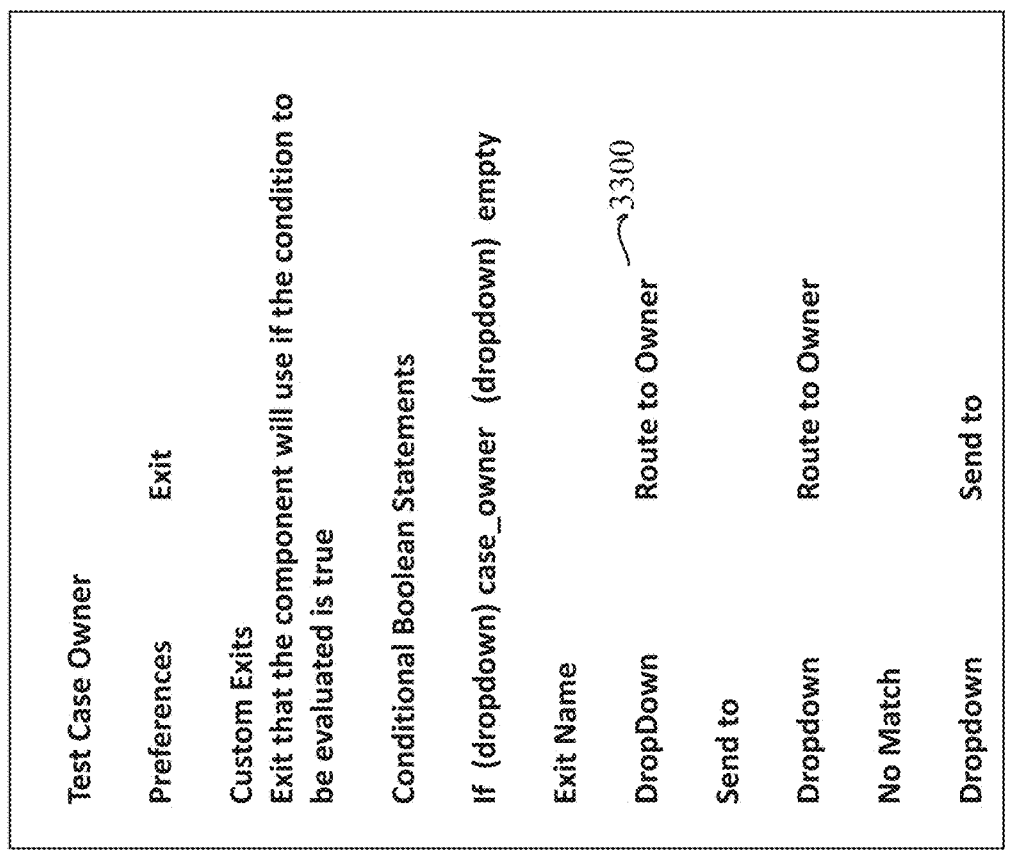
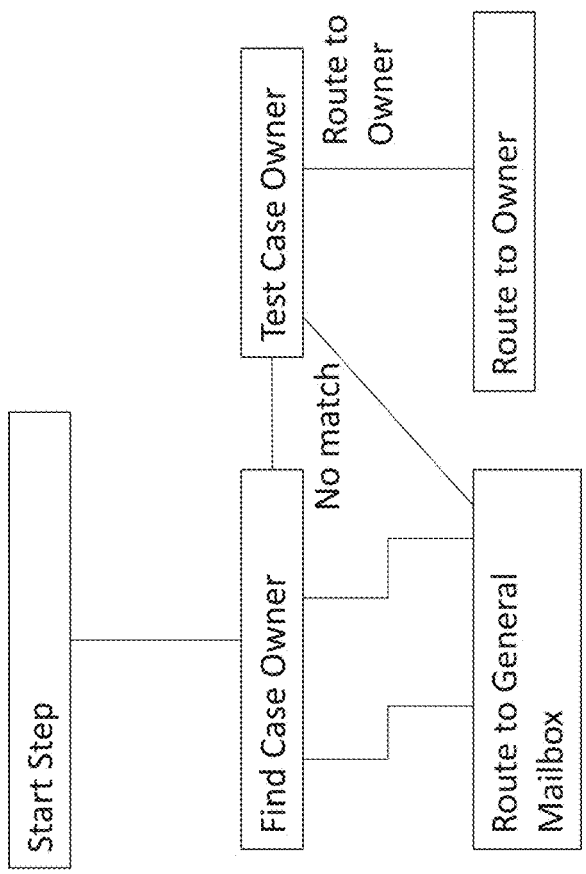
FIGURE 33

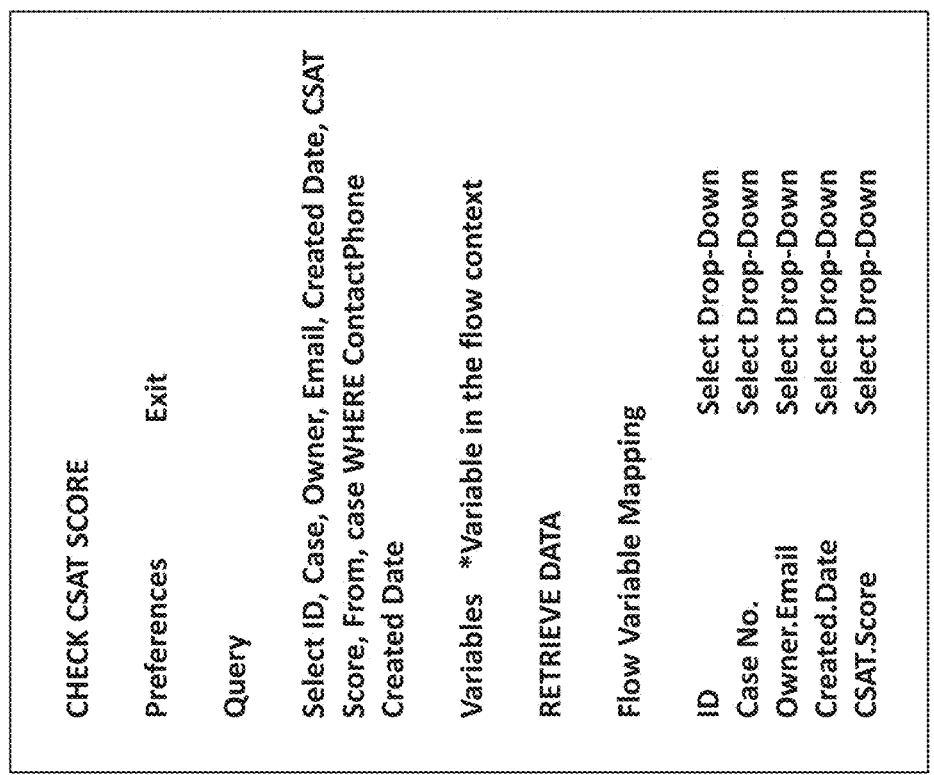
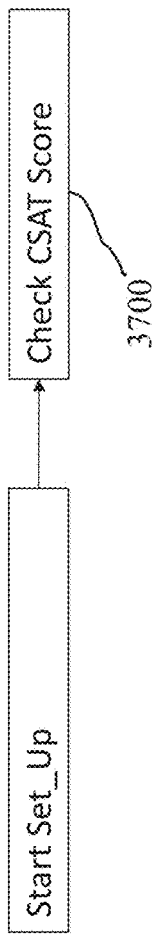
FIGURE 37

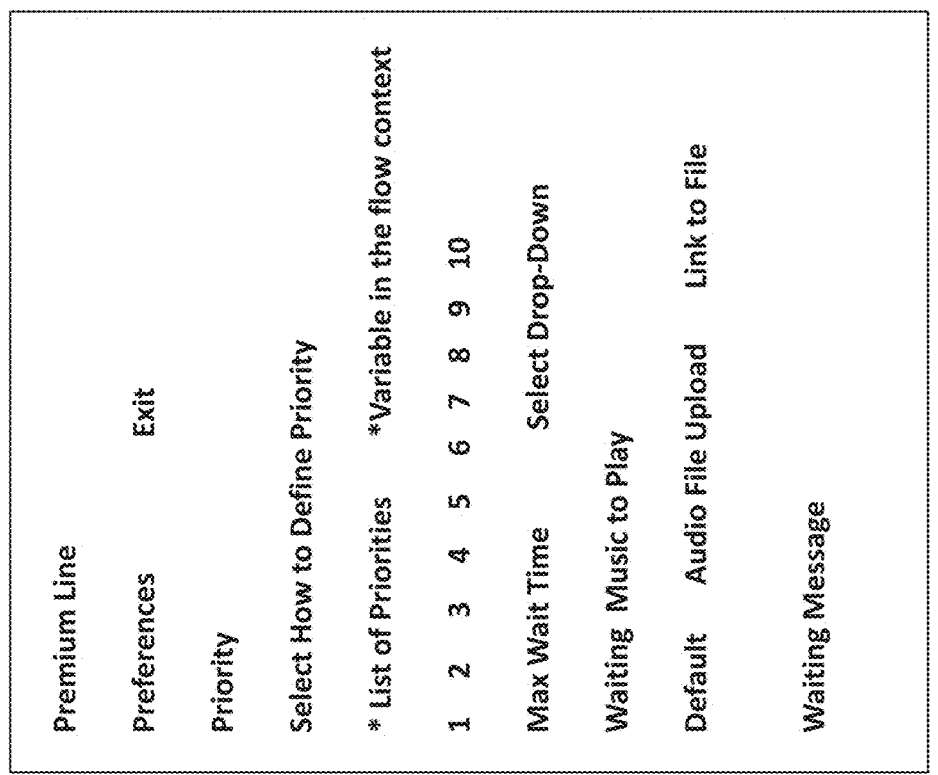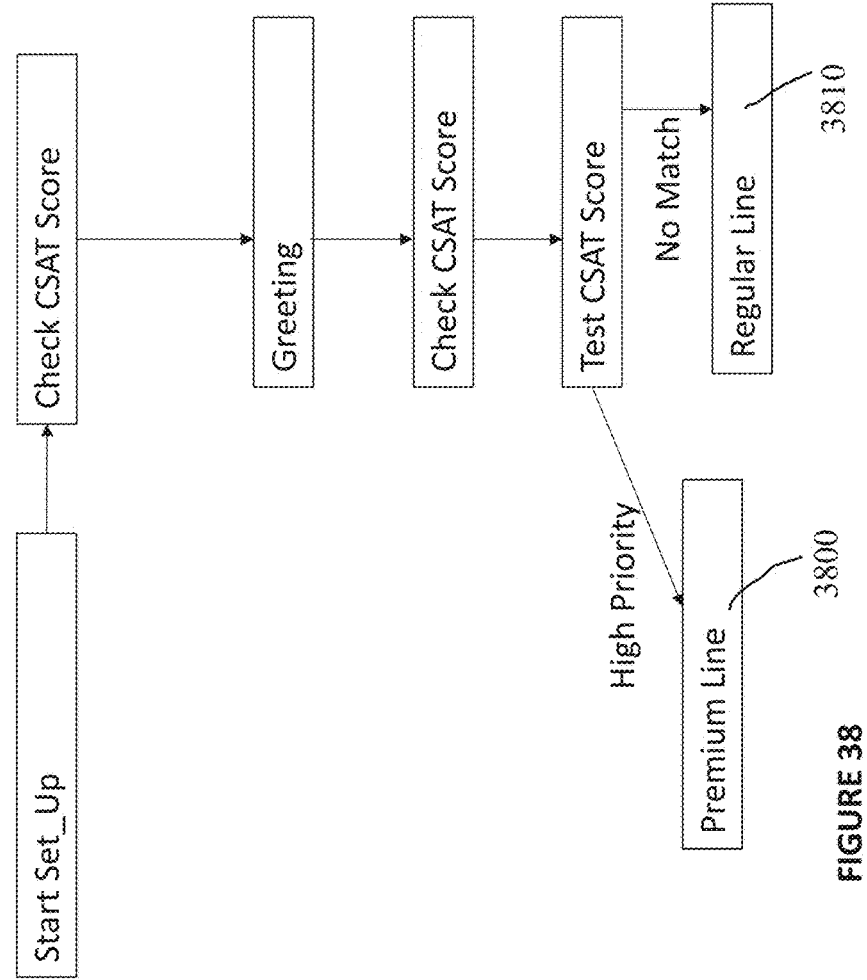
FIGURE 38

| Calls Contacts Voicemails Teams Reporting Admin | MyApps WebMode 5min break |
|---|---|
| Live LiveDashboard Explore Inbound Service Level Outbound Agents Numbers Calls Dispositions Sentiment Scheduled | |

EXPLORE

Default Dashboards

Agent Details     Agents     Calls     Dispositions
No schedules     No Schedules     1 Scheduled     1 Scheduled Inbound     Number Details     Numbers     Outbound
No schedules     No Schedules     No Schedules     No Schedules Sentiment     Service Level
No Schedules     No Schedules My Dashboards 1
Default Reports 17
My Reports 3

ARTIFICIAL INTELLIGENCE FOR A GRAPHICALLY INTERACTIVE VOICE RESPONSE SYSTEM

CROSS REFERENCE TO RELATED APPLICATIONS

None.

STATEMENT REGARDING FEDERALLY SPONSORED RESEARCH

None.

FIELD

This disclosure relates to programming and set-up techniques for interactive voice response systems featuring an automated attendant in a call center environment.

BACKGROUND

Large businesses often have extremely busy telephone systems, some of which merit a corporate call center to receive incoming calls from customers and clients. Computer systems have been used for decades to manage the call center environments, and virtual attendants have been developed to triage calls as they come into the call center. The problems that call centers currently incur center largely around flexibility and enacting changes to the call center call routing systems on the fly.

Today, contact centers are primarily on-premise software solutions. This requires an enterprise to make a substantial investment in hardware, installation and regular maintenance of such solutions. Using on-premise software, agents and supervisors are stationed in an on-site call center. In addition, a dedicated IT staff is required because on-site software may be too complicated for supervisors and agents to handle on their own. Another drawback of on-premise solutions is that such solutions cannot be easily enhanced to include capabilities to that meet the current demands of technology. Thus, there is a need for a solution to enhance legacy on-premise solutions to provide an easy path for such solutions to address the ever changing technology advancements and channels by which customers interact with contact centers.

A need currently exists in the field of virtual telephone systems, call centers, and interactive voice response systems to set up call programming and call routing to agents within an organization.

BRIEF SUMMARY

A method using computerized networks to route call data and other kinds of incoming communications data to a customer agent includes presenting, on a computerized display, a series of drop-down menus indicating options for transmitting incoming call data within an organization and adding, to the computerized display, a graphical indication of a selected option from the series of drop down menus.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

The components in the drawings are not necessarily to scale relative to each other. Like reference numerals designate corresponding parts throughout the several views.

FIG. 20 is a schematic representation of a networked call center routing program with visual routing components and drop down menu options as disclosed herein.

FIG. 21 is a schematic representation of a networked call center routing program with visual routing components and drop down menu options as disclosed herein.

FIG. 22 is a schematic representation of a networked call center routing program with visual routing components and drop down menu options as disclosed herein.

FIG. 24 is a schematic representation of a networked call center routing program with visual routing components and drop down menu options as disclosed herein.

FIG. 26 is a schematic representation of a networked call center routing program with visual routing components and drop down menu options as disclosed herein.

FIG. 32 is a schematic representation of a networked call center routing program with visual routing components and drop down menu options as disclosed herein.

FIG. 33 is a schematic representation of a networked call center routing program with vi

FIG. 37 is a schematic representation of a networked call center routing program with visual routing components and drop down menu options as disclosed herein.

FIG. 38 is a schematic representation of a networked call center routing program with visual routing components and drop down menu options as disclosed herein.

Visual routing components and drop down menu options as disclosed herein.

FIG. 45 is a schematic representation of a networked call center routing program with visual routing components and drop down menu options as disclosed herein.

Figure 46:
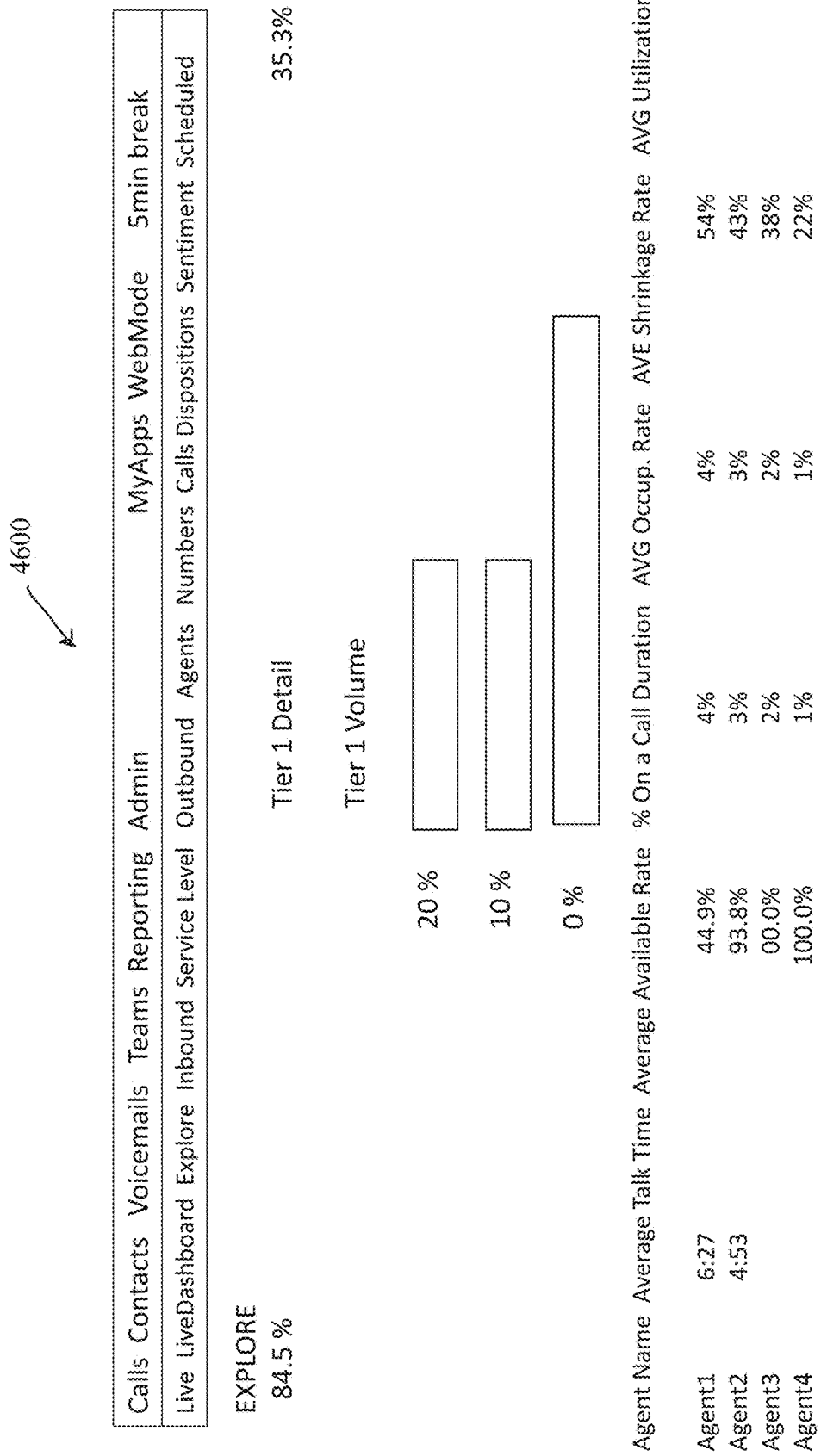

FIG. 46 is a schematic representation of a networked call center routing program with visual routing components and drop down menu options as disclosed herein.

Figure 47:
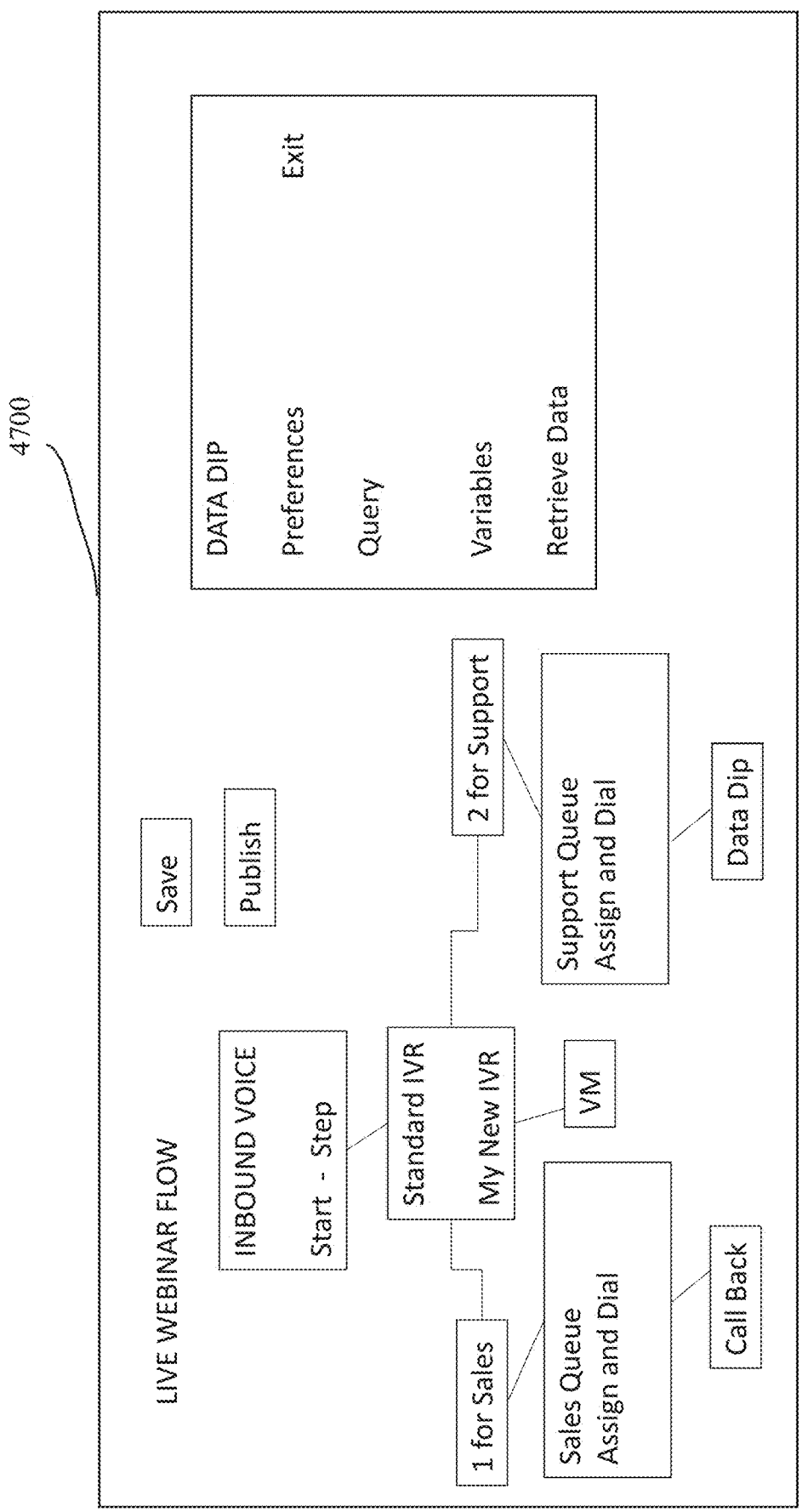

FIG. 47 is a schematic representation of a networked call center routing program with visual routing components and drop down menu options as disclosed herein.

Figure 48:
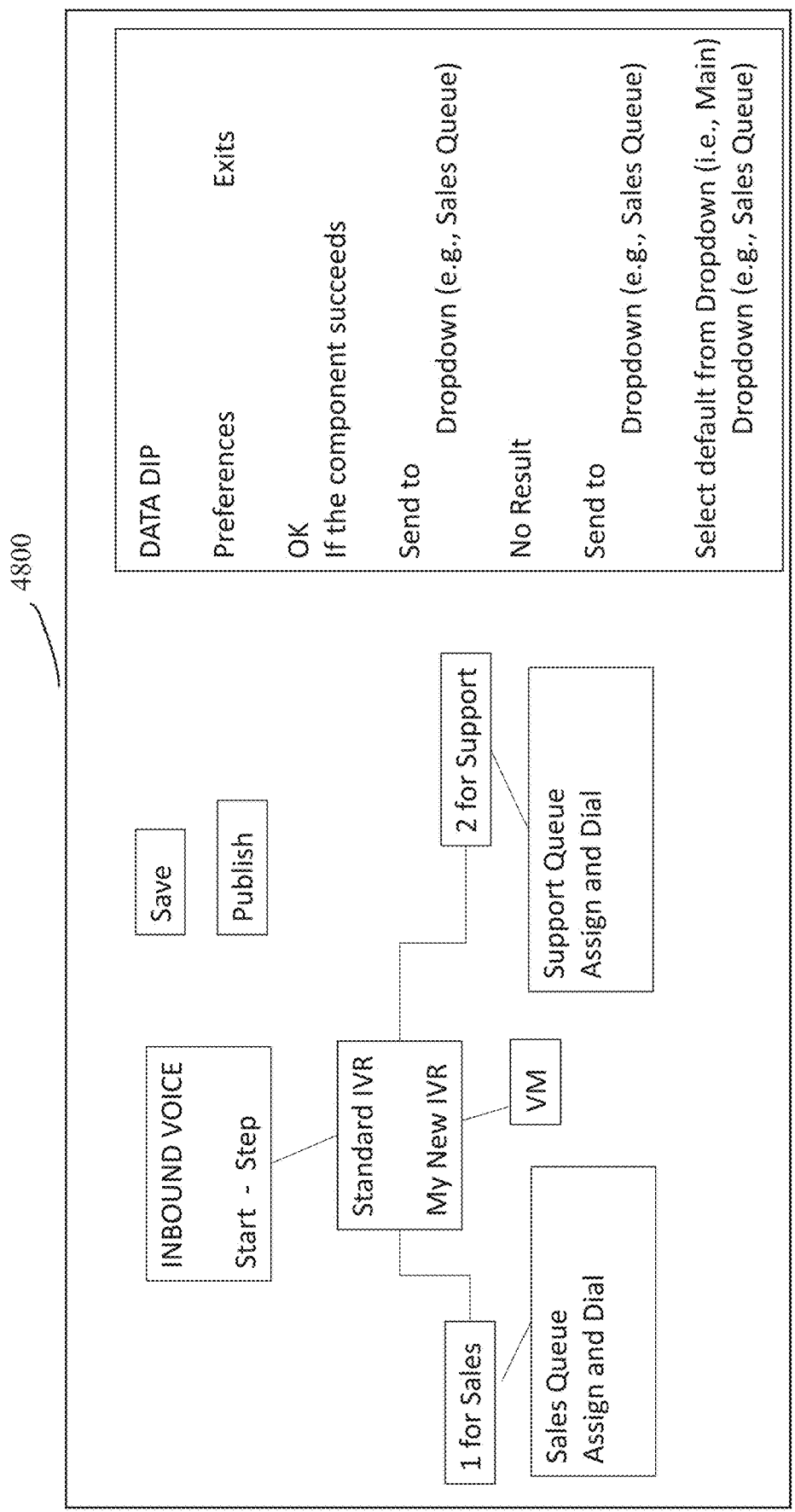

FIG. 48 is a schematic representation of the efficiency for various algorithms used to authenticate data updates at any one of the primary computer, member computers, or verifier party computers as disclosed herein.

DETAILED DESCRIPTION

The following description of the disclosure is provided as an enabling teaching of the disclosure in its best, currently known embodiment(s). To this end, those skilled in the relevant art will recognize and appreciate that many changes can be made to the various embodiments of the embodiments described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this disclosure belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically by reference in their entireties and at least for the material for which they are cited.

This disclosure relates generally to telecommunication systems by which certain incoming telecommunications data arrive at an organization for processing, and the incoming telecommunications data are analyzed for action in a computerized, software driven environment such as a call center utilizing automated virtual attendants, interactive voice response systems, and the like, along with routing protocols directing certain data to human agents or human computer operators. In particular, incoming telecommunications data may be traditional voice data, voice over internet protocol (VOIP) data, chat or messaging data, keyboard or touch screen entries, text-to-speech and speech-to-text data, and the like. The incoming telecommunications data may be generally referred to as respective "calls" coming into a system, but the term "call" is not limited to any particular source, content, protocol, or format. The terms "call" and "call data," as used herein, is non-limiting and only used as a convenient expression to denote incoming telecommunications data, bi-directional telecommunications data, and output telecommunications data of all kinds and with respect to an organization's telecommunications processing system, such as but not limited to a call center.

In some embodiments, this disclosure is directed to not only processing the call data but also pre-planning the manner in which call data is handled. Historically, many call center software operations are programmed by a vendor to map out call "flow" routes across and among hardware devices and/or call agents, both live and virtual, who handle the incoming call data. The call agents are responsible to ensure that appropriate output data is transmitted back to a caller and that the caller is properly engaged in the most appropriate manner in the fastest time. The call flow planning, therefore, is critical to call center success rates. In some embodiments of this disclosure, the call flow planning, implementation, and updating can be successfully achieved by a client organization as opposed to a vendor because this disclosure implements a graphical programming system for call flow planning that can be utilized by a purchasing organization in-house. The embodiments described herein allow for numerous employees of an organization, managing incoming and outgoing telecommunications data, to have authorized access to a call flow management system within an organization so that changes and updates do not have to be implemented by only the vendor who sells the system. Instead, as shown in the figures and described below, user-friendly drop-down menus implement and supplement a graphical representation of the call flow that an iterative selection of parameters has implemented. The graphical representation allows the user to see how a flow is currently working, click on links and decision tools, and access user friendly selection tools for changes.

Unless defined otherwise, all technical and scientific terms used herein have the same meaning as commonly understood by one of ordinary skill in the art. Methods and materials similar or equivalent to those described herein can be used in the practice or testing of the present disclosure.

While implementations will be described within a cloud-based contact center, it will become evident to those skilled in the art that the implementations are not limited thereto.

The present disclosure is generally directed to a cloud-based contact center solution. With the rise of cloud-based computing, contact centers that take advantage of this infrastructure are able to quickly add new features and channels. Cloud-based contact centers improve the customer experience by leveraging application programming interfaces (APIs) and software development kits (SDKs) to allow the contact center to change in in response to an enterprise's needs. For example, communications channels may be easily added as the APIs and SDKs enable adding channels, such as SMS/MMS, social media, web, etc. Cloud-based contact centers provide a platform that enables frequent updates. Yet another advantage of cloud-based contact centers is increased reliability, as cloud-based contact centers may be strategically and geographically distributed around the world to optimally route calls to reduce latency and provide the highest quality experience. As such, customers are connected to agents faster and more efficiently.

Example Cloud-Based Contact Center Architecture

Figure 1:
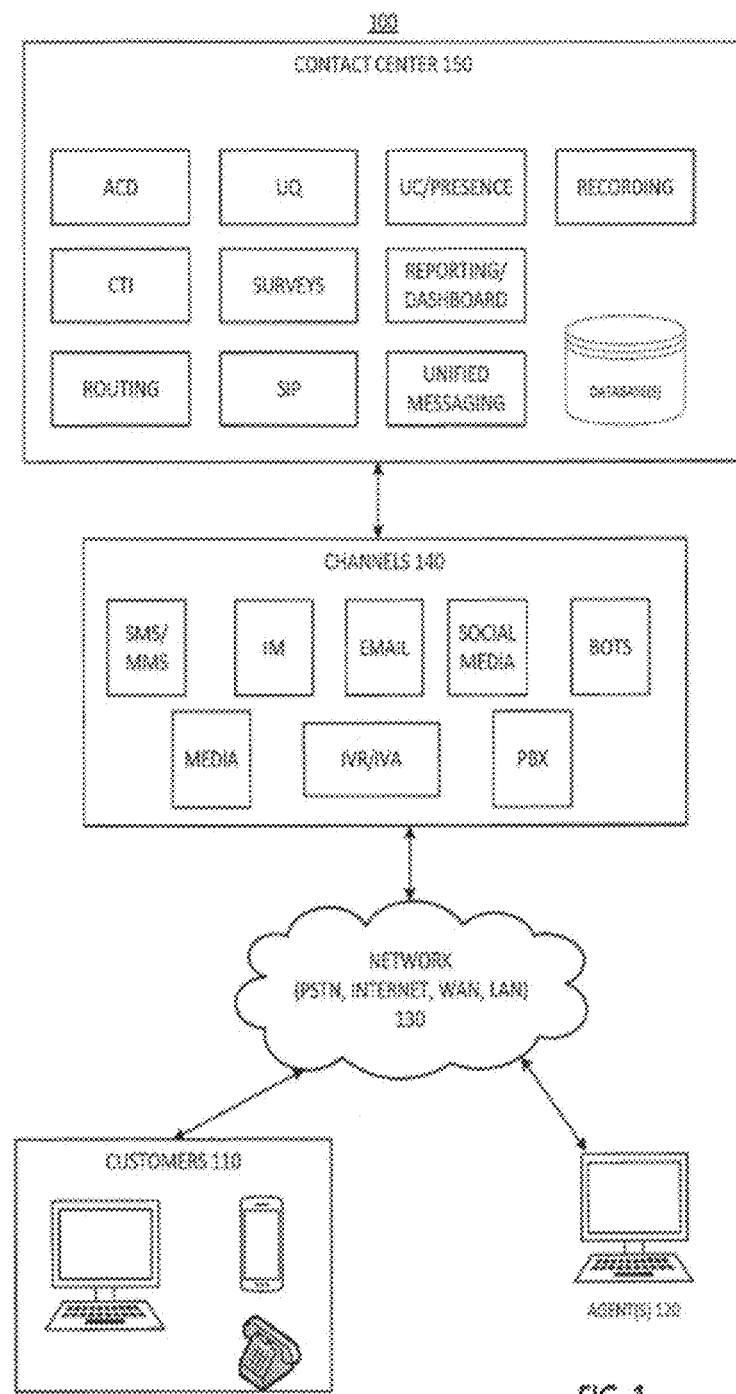
FIG. 1 illustrates an example environment.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with agent(s) 120 through a network 130 and one or more of text or multimedia channels 140. The agent(s) 120 may be remote from the contact center 150 and handle communications with customers 110 on behalf of an enterprise. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

Agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

Figure 2:
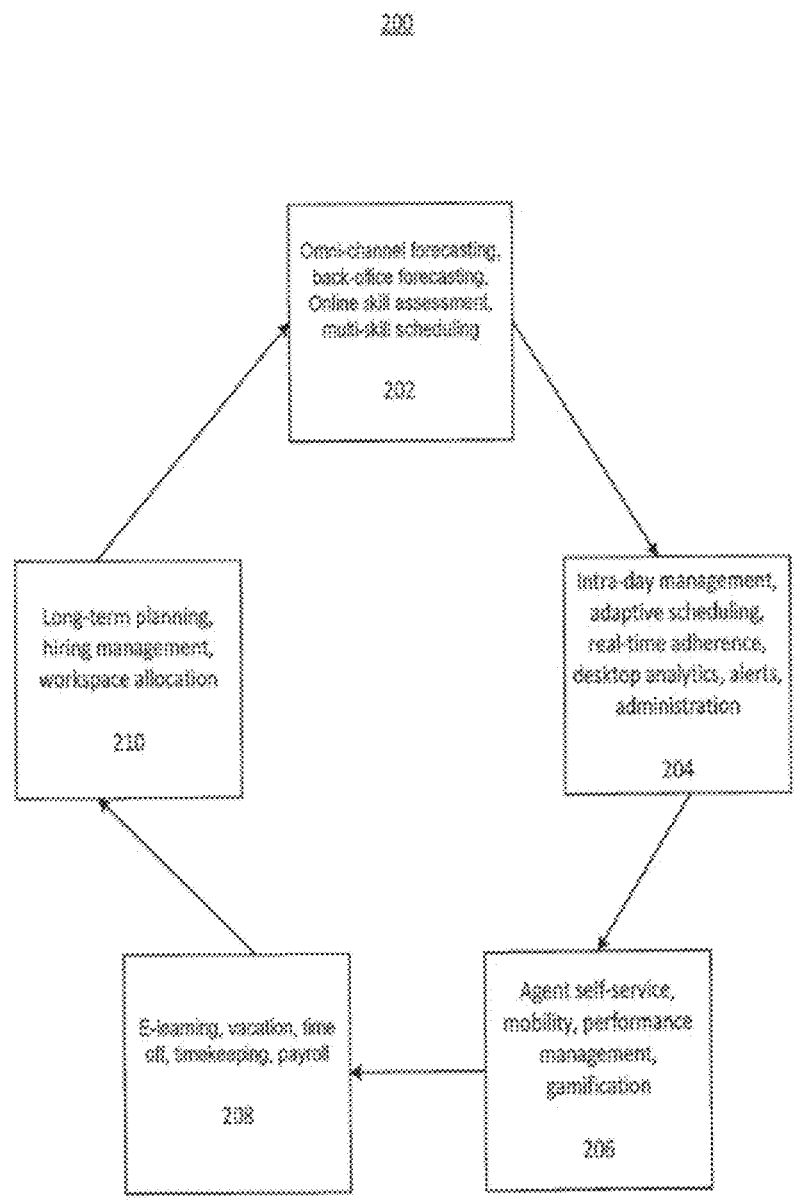
FIG. 2 illustrates aspects of workforce management (WFM) solutions within the context of the environment of FIG. 1.

The cloud-based contact center 150 may include a number of optional components to help improve the performance of agents and their departments. For example, a Workforce Management (WFM) module may be provided that forecasts and schedules the agents 120 to handle interactions in each channel 140. Additional details of the WFM module 200 are shown in FIG. 2. WFM suites address planning, staffing, resource management and real-time intraday challenges. WFM suites also include workflow automation functionality to reduce the administrative burden associated with managing common contact center activities, such as vacation, time-off or schedule changes, optimizing schedules and/or break periods, and overtime or early departure requests to address real-time variances to a plan.

WFM solutions 200 may also provide agents 120 with self-service capabilities such that agents 120 may create and manage their own schedules and obtain insight into personal performance. FIG. 2 groups the WFM suite components by primary function, although many of these overlap. Group 202 includes omni-Channel Forecasting that enables users to build forecasts for multiple contact center channels (inbound/outbound voice, email, chat, short message service (SMS), video, messaging, social media, etc.). Omni-channel forecasting accounts channel-specific interaction characteristics such as real-time or deferred activities and the ability to simultaneously handle concurrent email, chat, SMS interactions, etc. Different algorithms may be used to generate forecasts for the various communication channels, based on historical transaction volume data (e.g., hour of the day, day of week, week of month and month of the year), shrinkage factors and seasonal changes (holidays, marketing promotions, and cyclical events). Projected future transaction volumes and demand, and a capability to simulate interaction volumes and develop "what if" scenarios may be included. Volume forecasts and staffing requirement forecasts may be generated.

Also in group 202 is Back-Office/Branch Forecasting, which provides forecasting capabilities to address the unique requirements of back-office and branch environments. This includes forecast modeling techniques and algorithms to calculate skill and staffing requirements for branch/location based on customer demand and traffic patterns, including the availability of pooled employee resources across multiple locations. Multi-Skill Scheduling creates a timetable of blended agent activities that balances forecasted demand against agent availability. Schedules are based on the skill mix and proficiency level of agents who have been trained to perform various activities, support different products, or have the ability to handle more than one communication channel.

Group 204 contains intra-day management tools that provide the capability to gauge real-time service-level impacts and help determine the actions required to ensure service levels are met on an ongoing basis. Adaptive Real-Time Scheduling tools are self-learning applications that use rules to automate the process of identifying unanticipated changes in demand and finding and acquiring the resources to address the staffing overage or underage. This module may identify variances from plan, identify the skills and resources needed to handle the re-forecasted volumes, and automate the process of addressing the variances by interacting directly with employees, using self-service tools to resolve the misalignment in real time. Real-Time Adherence tools capture and compare current agent activity and status data from the automatic call distributor (ACD) (in contact centers), or work allocation and management solutions (in back offices) to schedule information. This comparison allows managers to recognize what agents are doing relative to scheduled activities, and then address any deviations from the plan. It enables managers to identify impacts on shrinkage, and determine if agents are not where they are supposed to be or doing what they are scheduled to do. Desktop Analytics (DA) provides information regard what employees do at their desktops by using an automated and systemic approach to monitor, capture, structure, analyze, report and react to all staff desktop activity and process workflows. It tracks employee activity, including detection of keystrokes, data entry, applications, screens and fields accessed, events, usage duration, and resulting actions. It measures application utilization, system response time, usage patterns, and performance metrics in order to monitor application usage and assess user efficiency, effectiveness, compliance, and external customer impact. DA modules may also provide real-time guidance to employees, as the solution knows what is being done in desktop applications.

Group 204 includes administration modules such as dashboards the display online graphical presentations of real-time, near-real-time and historical WFM data. Dashboards should be flexible and customizable by users, allowing them to modify the look and feel. Dashboards typically include widgets, gadgets, gauges, meters, switches, charts and graphs that allow role-based monitoring of operational activity for all stakeholders (agents, managers, WFM administrators, etc.). Reporting automates the gathering, organization and display of WFM-related data in order to show management what is happening in the operation. Reporting modules should deliver information interactively online, including drill-down and drill-through to underlying data, as well as in printed documents. Standard reports should consolidate information from all WFM modules and provide different views of operational and agent performance data in narrative, graphical or tabular formats. A flexible reporting module should make it easy for users to filter and view information based on employees, teams, time periods, channels, etc. Administration provides an environment for managing the parameters used to set up the application and to drive forecasting and scheduling; parameters include work rules, calendars, contact routing, schedules, scheduling rules, skill groups, interaction channel types (phone, chat, email, etc.), operating hours, etc. The environment should provide pre-built tools to facilitate system access, user set-up, user identification and rights (privileges), password administration and security.

Group 206 includes agent self-service tools, such as a web-based and/or mobile-enabled interface into the WFM application that allows agents to input preferences for time off or schedules (e.g., hours and days they want to work), view vacation accruals, sign up for overtime assignments or voluntary time off, initiate full or partial shift swaps, request schedule exceptions, and access other related information. Agent self-service modules allow agents see personal performance statistics to facilitate self-management efforts and determine if they are meeting the goals set by their manager. Alerts communicate real-time issues to agents, managers or administrators. Alerts can be based on user-defined thresholds to notify managers of out-of-adherence situations or extended contact durations, and inform agents of upcoming schedule or activity changes via screen displays, pop-up messages, emails, texts and broadcast messages. Mobility provides agents, managers, supervisors and administrators with role-based access to WFM functionality on tablets, and iOS and Android mobile devices. Agents can also initiate or respond to schedule change requests, shift swaps, time-off and overtime requests.

Within group 206, performance management tools use analytics to help managers align their goals with those of the enterprise, and produces dashboards and scorecards that allow managers to monitor, track and improve department and individual employee performance. Gamification allows contact center, back-office and branch environments to incorporate gaming and behavioral modification science, methodology and techniques systemically into business applications and processes. Gamification modules provide a recognition and reward framework to motivate and enhance performance, productivity, employee retention, sales, etc. These modules are designed to drive sustainable performance improvements and provide recognition and/or awards for goal achievement while fostering healthy competition in operating departments. Vacation/Time-Off Management provides functionality for managing time-off requests and accruals. eLearning/Meeting Management schedules individual or group training or meeting sessions. The solution utilizes user-generated input, like the maximum and minimum number of staff allowed in the meeting, the venue, and the starting time and length of the session, to optimize the placement of events. Timekeeping/Payroll Management provides functionality to automate the timekeeping process. Payroll management can be configured to interface with corporate human resources (HR) or payroll systems, or work as a stand-alone module.

Group 208 includes long-term strategic planning tools that allows managers to plan operational forecasts, budgets and schedules one or more years into the future. A benefit of this functionality is the ability to create and compare multiple "what if" scenarios and forecasts to enable users to evaluate and estimate financial and service-level impacts of potential changes, and be prepared to alter their forecasts and schedules appropriately to support the changing business environment. Hiring Management manages the employee acquisition process. This includes forecasting the number of staff and the specific skill sets required, the optimal mix of shifts (full-time, part-time, flex) and when the training should commence, to accommodate the required ramp-up period. Can also include the ability to integrate with HR systems to create hiring plans based on optimal staffing profiles. AI-based hiring management solutions may also assist enterprises in the candidate selection process, and analyze the quality of hires. Workspace Allocation automatically creates seating charts during the scheduling process. The module assigns workspaces to agents based on performance, seniority, queues, skills, teams, shifts or other user-designated input. It also inserts the seating assignment into agents' schedules, and allows supervisors to display and print the assignments.

Figure 3:
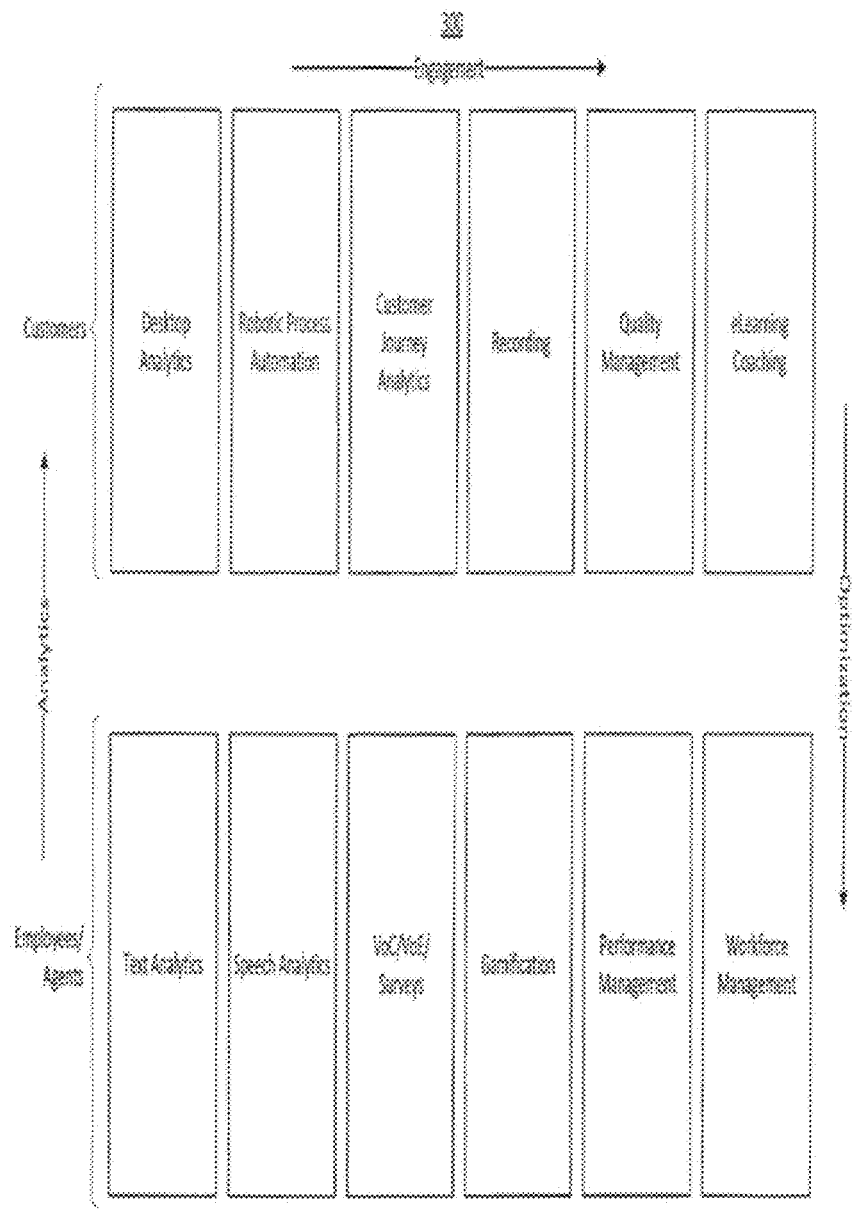
FIG. 3 illustrates aspects of workforce optimization (WFO) solutions within the context of the environment of FIG. 1.

FIG. 3 illustrates key components of a cloud-based contact center WFO suite 300. The WFO suite 300 is a set of applications designed to capture and analyze omni-channel interactions in order to optimize performance and promote customer and employee engagement, satisfaction and retention. WFO suites 300 are designed to help companies optimize, analyze and engage employees and customers. The WFO suites 300 leverage historical and real-time data to analyze customer behavior and the performance of front-office, back-office and branch operations and employees. The findings are used to identify the underlying cause of issues, and provide the information needed to support data-driven decisions and improvements to address the expectations, needs and wants of customers, prospects and employees.

The component include, but are not limited to:

Recording (e.g., audio, screen and video recording for quality assurance, regulatory or speech/text analytics), quality assurance/quality management that determines how well agents adhere to internal policies and procedures;

Quality management (QM)—evaluates how well each agent adheres to the internal policies and procedures of the department. Contact center performance management (CCPM)—integrates data from multiple sources to produce contact center reports and dashboards.

Workforce Management (WFM, as described above) for forecasting and scheduling agent staffing needs;

Coaching/eLearning—provides highly tactical and timely feedback and/or learning content to agents to help them improve their performance. Gamification—provides a recognition and reward framework to improve performance, productivity, employee retention, performance, sales, etc.;

Voice of the customer (VoC)/voice of the employee (VoE)/surveying tools that are omni-channel solutions that collect internal and external feedback, actively solicited and/or passively gathered from social media, community platforms and online review sites;

Performance management tools that align contact center activities with enterprise goals (e.g., provides scorecards and dashboards to measure staff, team and department performance, and provides the data, metrics and key performance indicators (KPIs) needed to improve the contact center and enhance the customer experience);

Speech Analytics (e.g., post-call and real-time)—capture, structure and analyze unstructured phone conversations to uncover the reasons why people call, and to identify new revenue opportunities and allows a company to identify and address an issue while the caller is still on the line.

Text Analytics—software used to extract information from unstructured text-based data such as emails, chats, SMS, social media, etc., in order to structure it for further analysis or action;

Robotic process automation (RPA)—software that leverages AI, machine learning, workflow and other technologies to automate the processing of repetitive tasks, initiate actions and communicate with other systems or employees. RPA emulates the processes performed by human workers and can be trained to adapt to changing conditions, anomalies and new situations;

Customer relationship management (CRM)/servicing—provides a complete view of the customer relationship and their interaction history;

Desktop analytics (DA)—captures, tracks and analyzes everything that happens on the agent desktop. Desktop analytics to provide visibility to management by capturing, tracking and analyzing everything that happens on agents' desktops; text analytics that is used to extract information from unstructured text-based interactions such as emails, chats, SMS, social media, etc., in order to structure it and use it to identify the reasons why people contact the organization;

Real-time guidance/next-best action (NBA)—tools designed to give agents the right information at the right time to deliver a personalized experience to each customer;

Gamification—allows contact centers and other departments to incorporate gaming methods and techniques into business applications and processes to enhance and improve agent/staff performance, motivate and drive ideal behaviors, and provide recognition and awards for goal achievement;

Customer Journey Analytics—an agile method of capturing, aggregating, measuring and evaluating the full experience as customers/prospects traverse an organization; provides the ability to reconstruct and assess what happens at every touch point, from inception to fulfillment, to evaluate the experience from the customer perspective;

Robotic process automation that is software to process transactions, manipulate data, trigger responses, initiate actions and communicate with other digital systems to automate the completion of high-volume, repetitive and non-cognitive tasks; can be applied on an attended and unattended basis.

Figure 4:
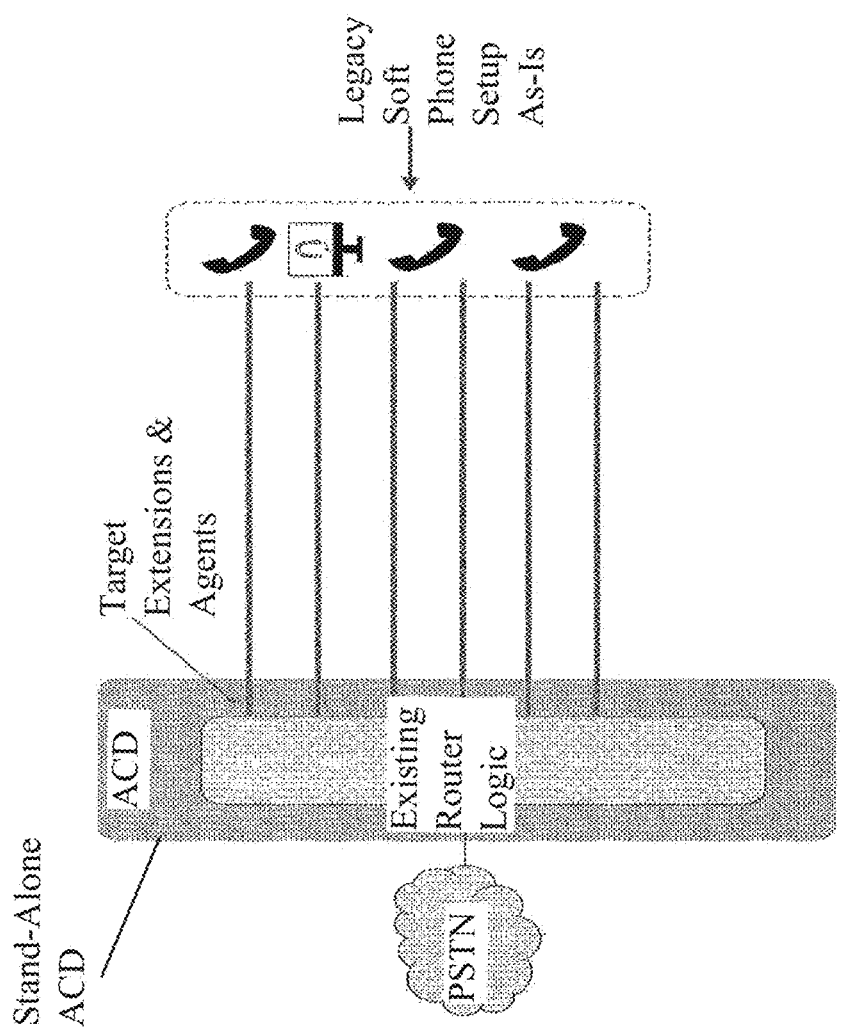
FIG. 4 illustrates example implementations of automated voice response systems programmed as set forth in the present disclosure.
Figure 5:
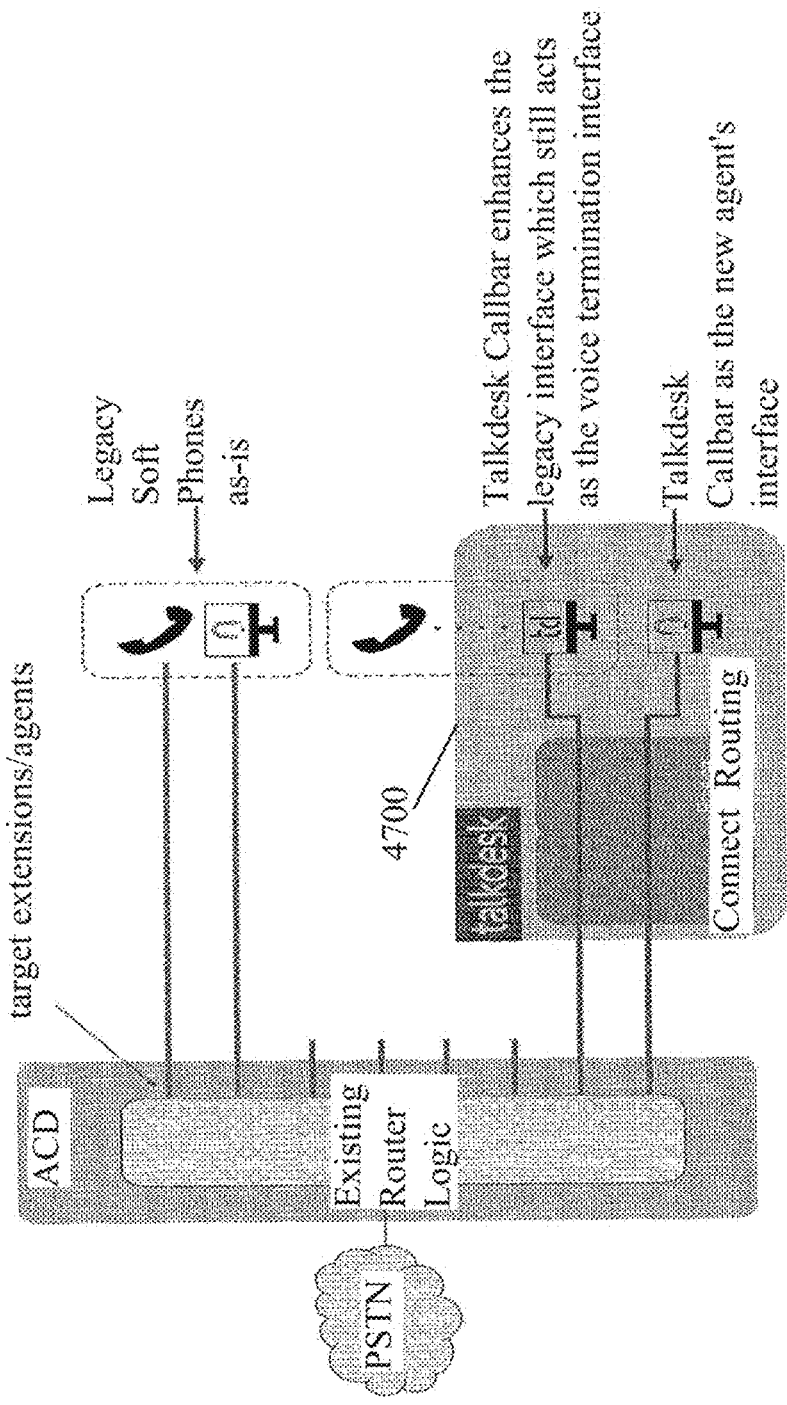
FIG. 5 illustrates example implementations of automated voice response systems programmed as set forth in the present disclosure.
Figure 6:
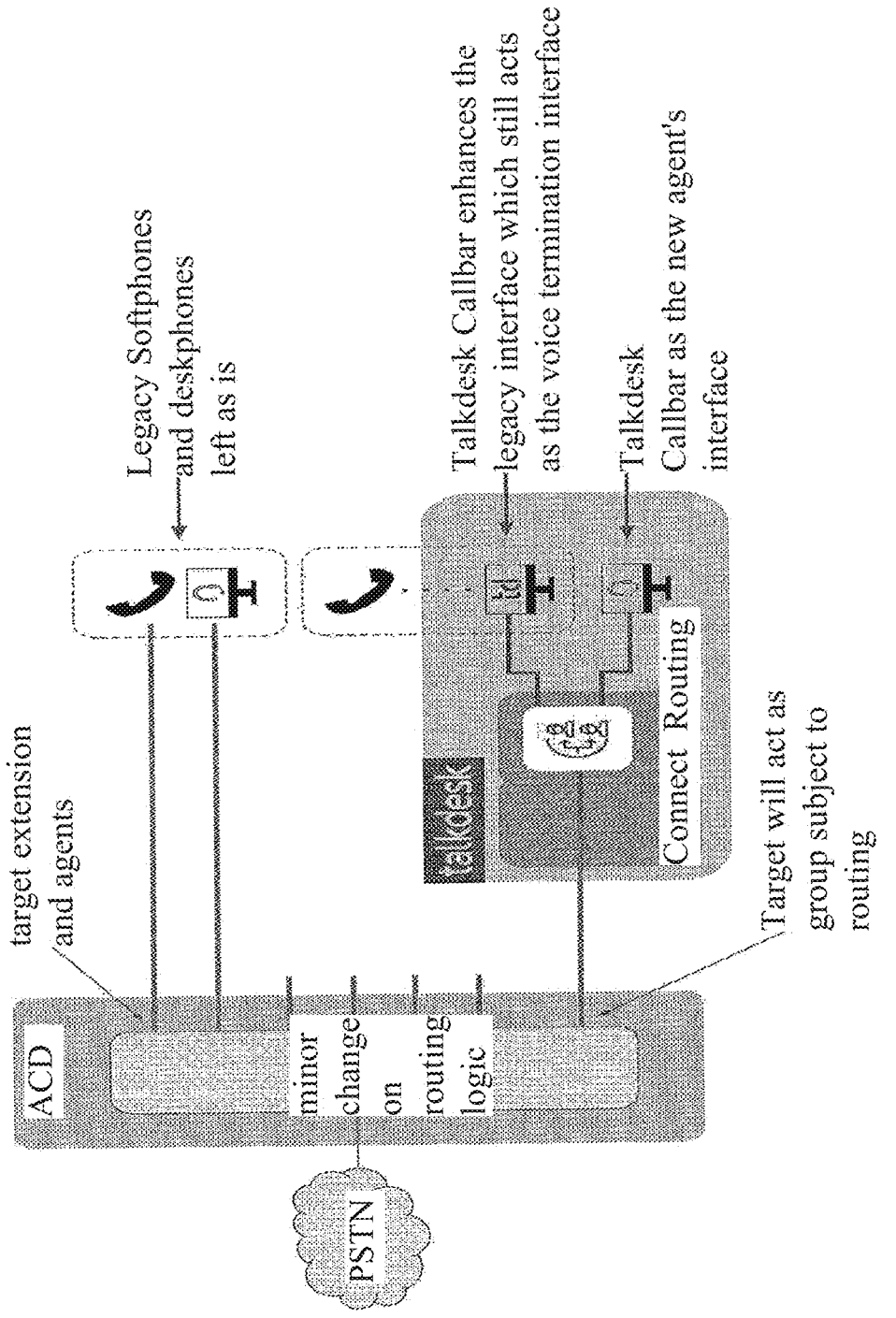
FIG. 6 illustrates example implementations of automated voice response systems programmed as set forth in the present disclosure.
Figure 7:
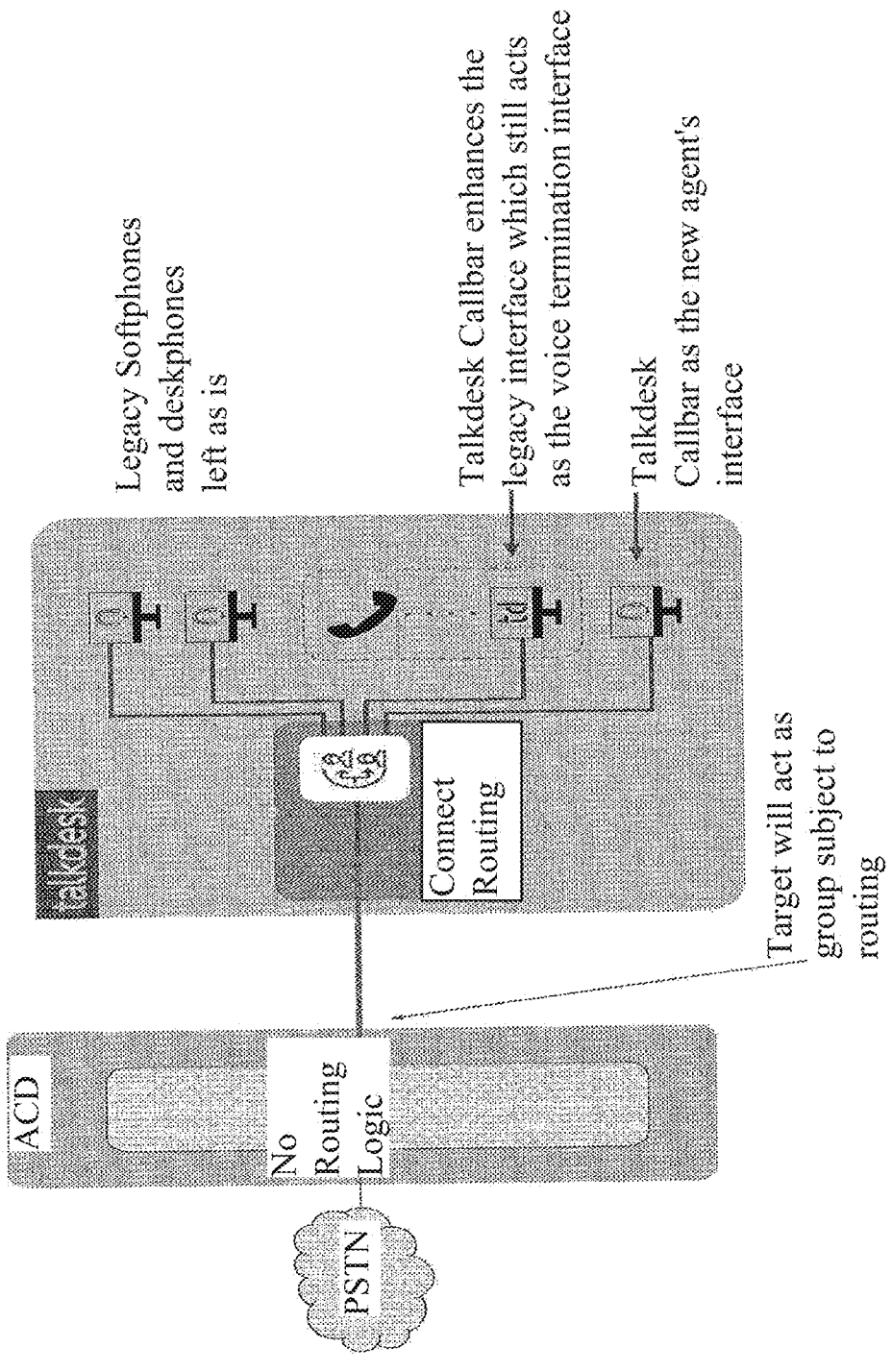
FIG. 7 illustrates example implementations of automated voice response systems programmed as set forth in the present disclosure.
Figure 8:
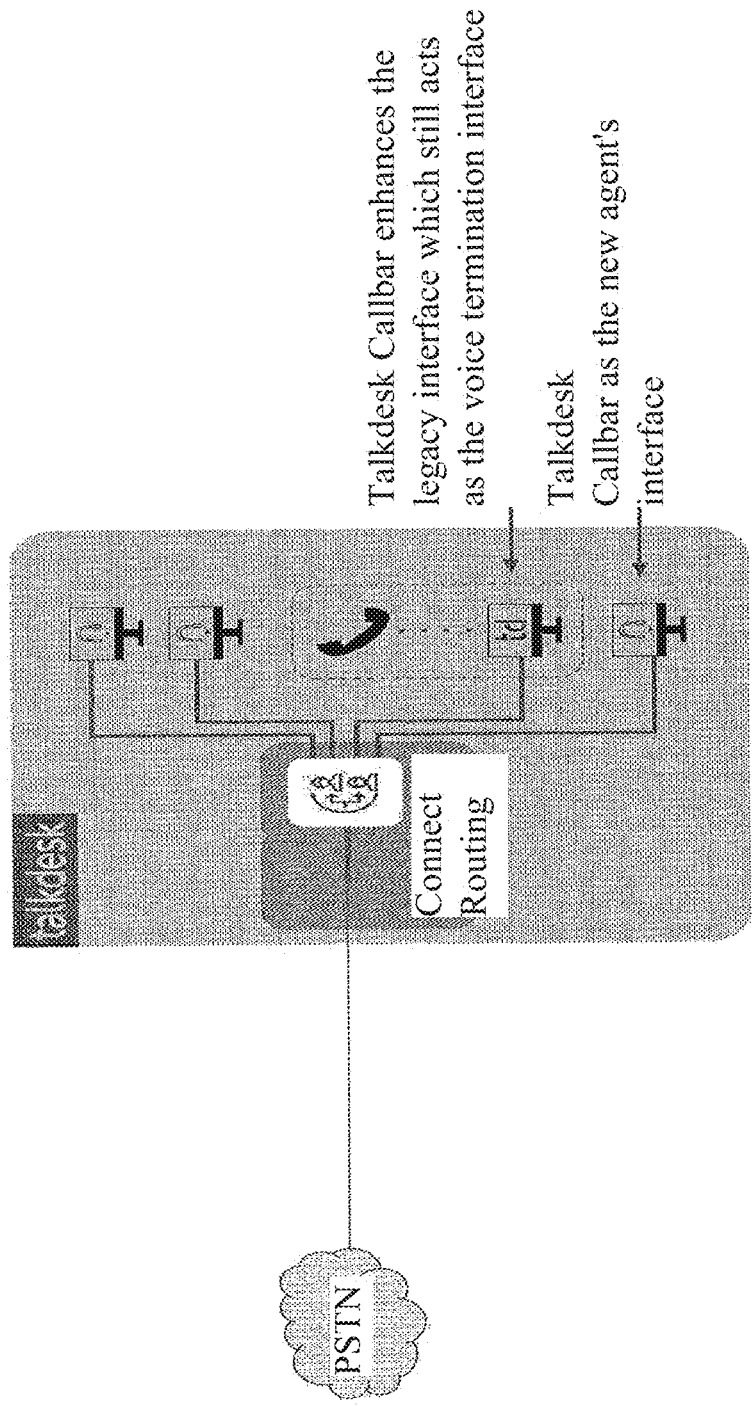
FIG. 8 illustrates example implementations of automated voice response systems programmed as set forth in the present disclosure.
Figure 44:
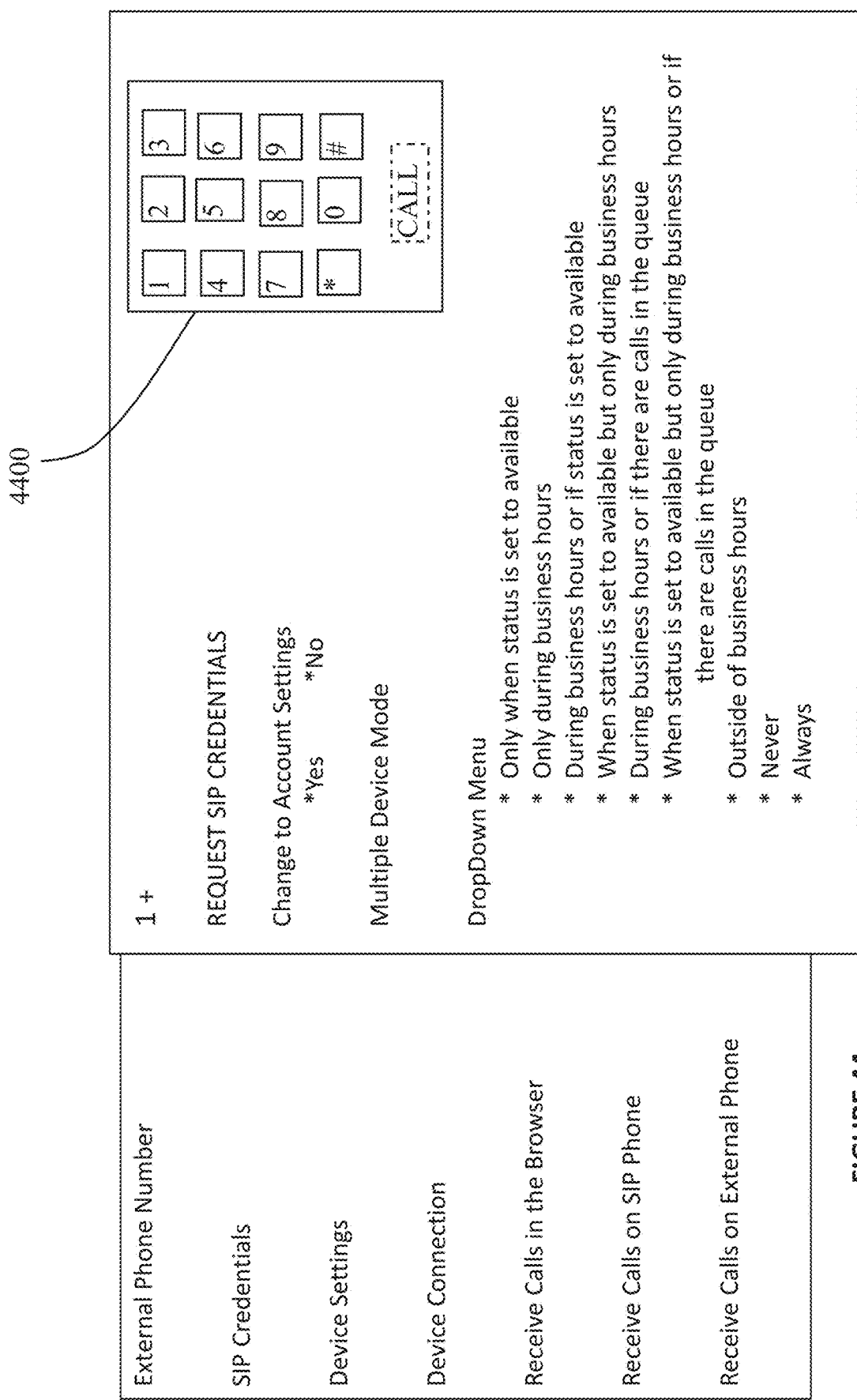
FIG. 44 is a schematic representation of a networked call center routing program with visual routing components and drop down menu options as disclosed herein.

Thus, in the context of FIGS. 1-3, the present disclosure provides improvements by enabling voice systems (e.g., the ACD) of traditional on-premise solutions to use AI-infused, cloud-based contact center applications to boost agent productivity, operational agility, and customer experience. FIG. 4 illustrates the operation of a traditional ACD routing calls to legacy softphones a desktop computers. FIG. 5 shows a first example implementation according to the present disclosure. In this example, connection and routing components are placed in front of the PBX/ACD/IVR and SIP trunk calls into the existing infrastructure. The connection and routing component(s) may be Talkdesk Callbar 4400 shown in FIG. 44, which enables agents to place and receive calls, as well as set availability, mute or hold a call, transfer calls, initiate a call conference, merge or create new contacts, pulse call recording, add notes to a caller's activity history, and access the contact's profile page in an integration of choice. In the scenario of FIG. 5, the connection and routing component(s) become the telephone and recording software for the enhanced legacy agent interface. FIG. 6 shows an alternative first example implementation according to the present disclosure. In FIG. 6 there is a change to routing logic to perform specific routing to certain targets within a group (e.g., sales). In FIGS. 5-6, the connection and routing component(s) act as ACD extensions. In FIG. 6, the connection and routing component(s) offer routing on, e.g., specific branches. In both FIGS. 5-6, the connection and routing component(s) take advantage of Universal Device support, and maintain the audio interface on the legacy phone devices. This offers the option of gradually throwing away perfectly good "dumb phones." FIG. 7 shows another alternative first example implementation according to the present disclosure. In FIG. 7, all routing logic is removed from the ACD and all contact center traffic is routed by the connection and routing component(s). FIG. 8 shows a second example implementation according to the present disclosure. Here, the connection and routing component(s) sit behind a SIP server. Here, the connection and routing component(s) may be built into the SIP server in order to perform full routing to the enhanced legacy agent interface.

Figure 9:
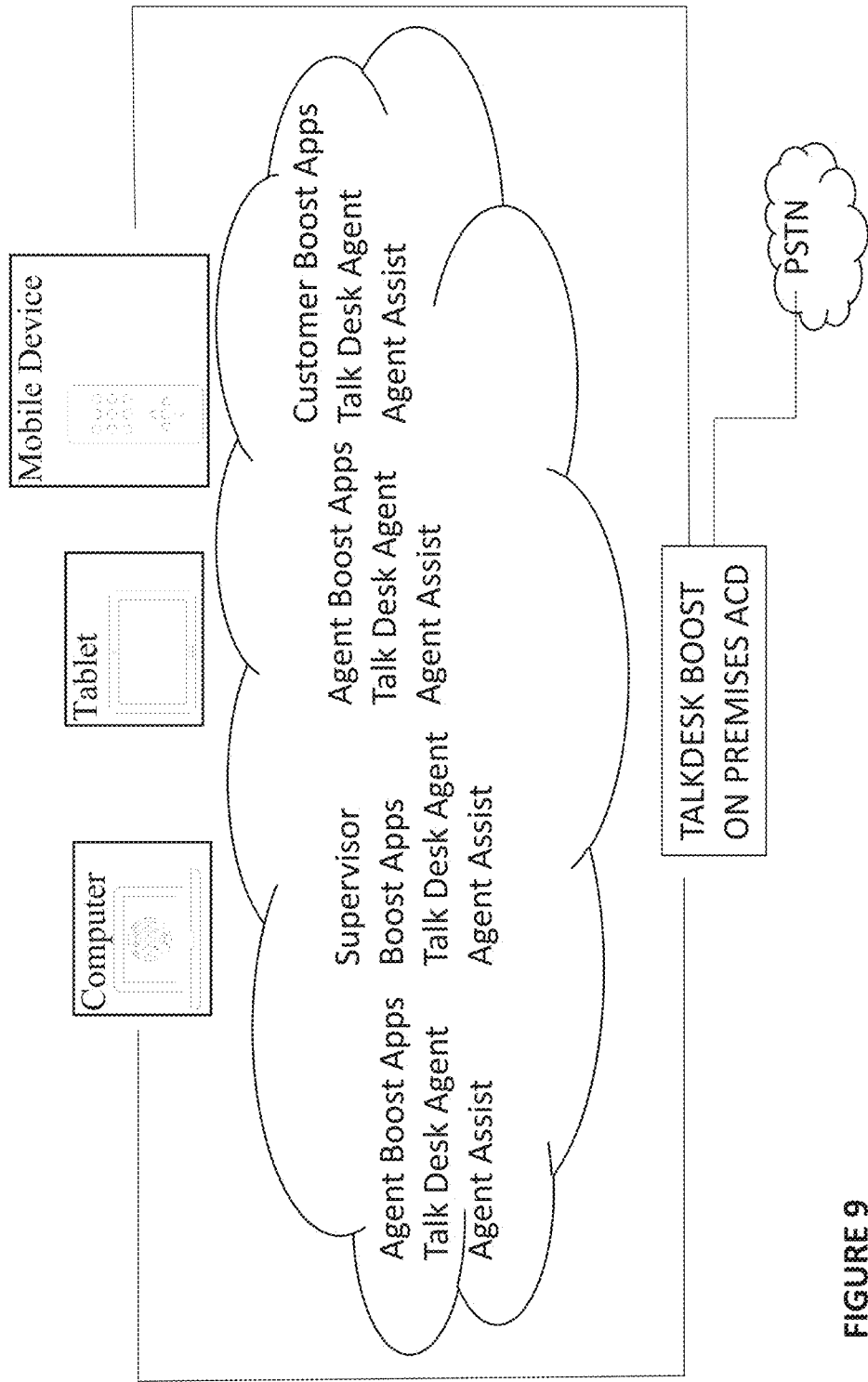
FIG. 9 illustrates example implementations of automated voice response systems

As shown in FIG. 9, the enhancements of the present disclosure are a suite of intelligent, AI-infused contact center applications built on a modern cloud-native communications platform that integrates seamlessly with existing legacy ACD systems and accelerates digital transformation. The present disclosure provides contact centers with a contemporary solution that instantly enhances agent productivity, operational efficiency and agility, and customer experience.

The present disclosure enables enterprises to integrate their existing system and enjoy access to a constant stream of new features, as well as international expansion. Such new features include:

Enjoy AI and advanced cloud capabilities

Gain efficiencies with 40+ CRM and other system integrations

Realize benefits quickly and risk-free

The present disclosure will increase operational efficiency by equipping agents 120, supervisors, and customers with smart tools to advance customer support and make every contact valuable. The present disclosure employs efficient tools to leverage and extend existing investments. The present disclosure works with an enterprise's favorite apps and enables a selection of a preferred agent desktop experience.

Figure 10:
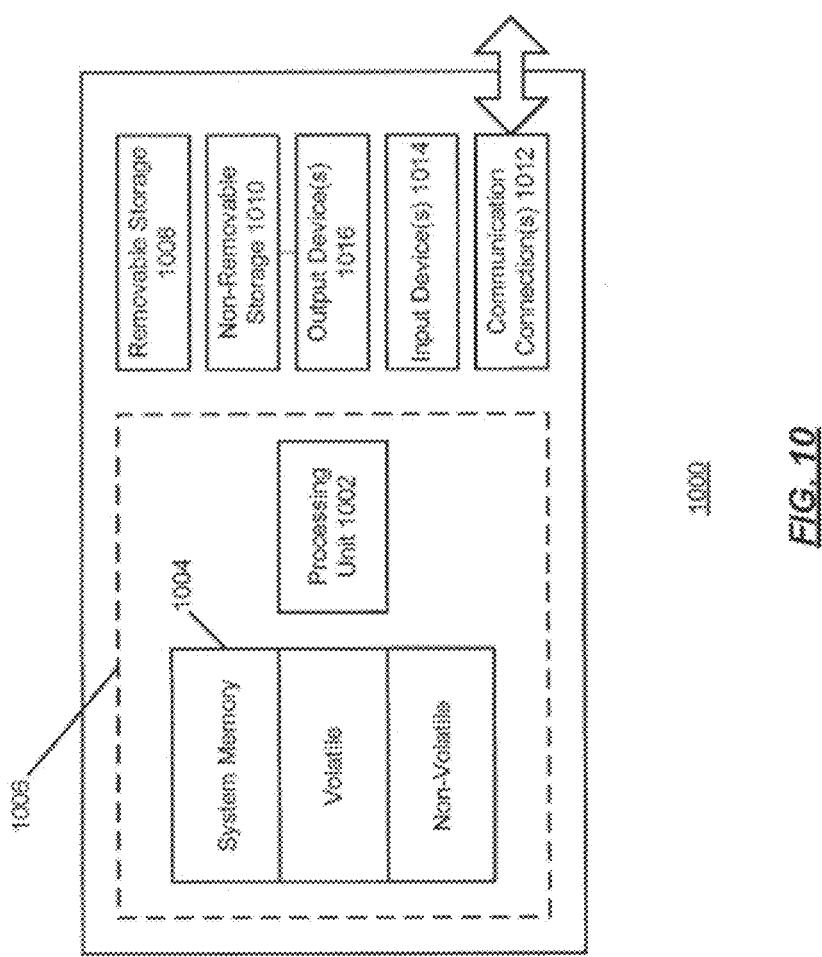
FIG. 10 illustrates an example computing device.

The present disclosure will empower agents 120 with mobile access and real-time knowledge to deliver consistent customer experience excellence over multiple touchpoints. The present disclosure will improve agents' engagement, increase CSAT/NPS, and achieve defined business goals, FIG. 10 shows an exemplary computing environment in which example embodiments and aspects may be implemented. The computing system environment is only one example of a suitable computing environment and is not intended to suggest any limitation as to the scope of use or functionality.

The graphical programming call router of this disclosure features a flow-based routing for handling incoming data streams that require action by either a live agent or a virtual, computer driven agent. There are several settings that are moved from the customer account or customer telephone number level to the call flow level, and some of these transfers may be automatic when the graphical call router has been implemented with intention.

Depending on how each call flow is configured, these are some of the settings that may be managed by supervisors in a customer organization who need authority in the system to make adjustments "on-the-fly" for real world conditions. The graphical programming call router described herein is configured to identify an incoming call data source and provide the following assignments that may be programmed in either a customized or pre-set way:

Ring groups of the number;
Maximum number of agents to ring;
Maximum waiting time;
Interactive Voice Responses;
Holiday Hours;
Business Hours;
Greetings;
Recording enablement;
Time zones.

Figure 11:
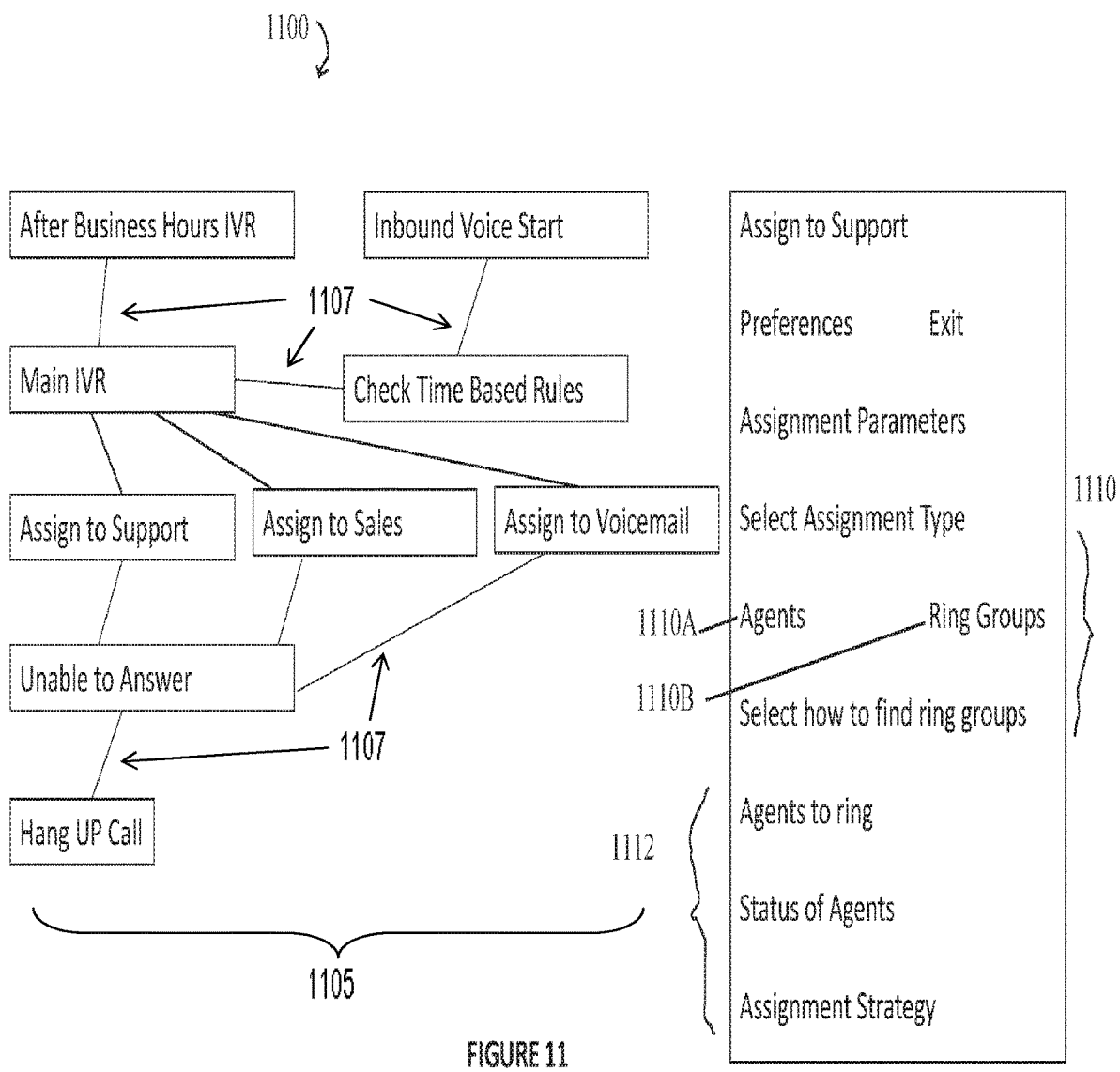
FIG. 11 is a schematic representation of a networked call center routing program with visual routing components and drop down menu options as disclosed herein.

The remainder of this disclosure makes references to the figures as noted. The figures illustrate example implementations that are provided to clarify the nature and the environment of the disclosure without limiting the scope of the embodiments in any way. The graphical programming call router of this disclosure has many options available via a user interface. In one non-limiting embodiment, once a "Create New Flow" button is pressed an authorized user can start defining a new call flow 1100, 1300, 1700, 3600 and configuring each component 1105 as shown in FIG. 11 at 1110 and 1112 in drop down menus. The drop down menus allow for a programmer to make selections that can be seen directly in a graphical representation as shown in the call flow 1100. The graphical representations show the selected drop down options 1110, 1112 in a corresponding call flow route 1107 that connects components 1105 in the graphical representation. In different embodiments described below, both the components 1105 and the routes 1107 are active links that can direct a user to more information or display information directly on the screen.

Figure 12:
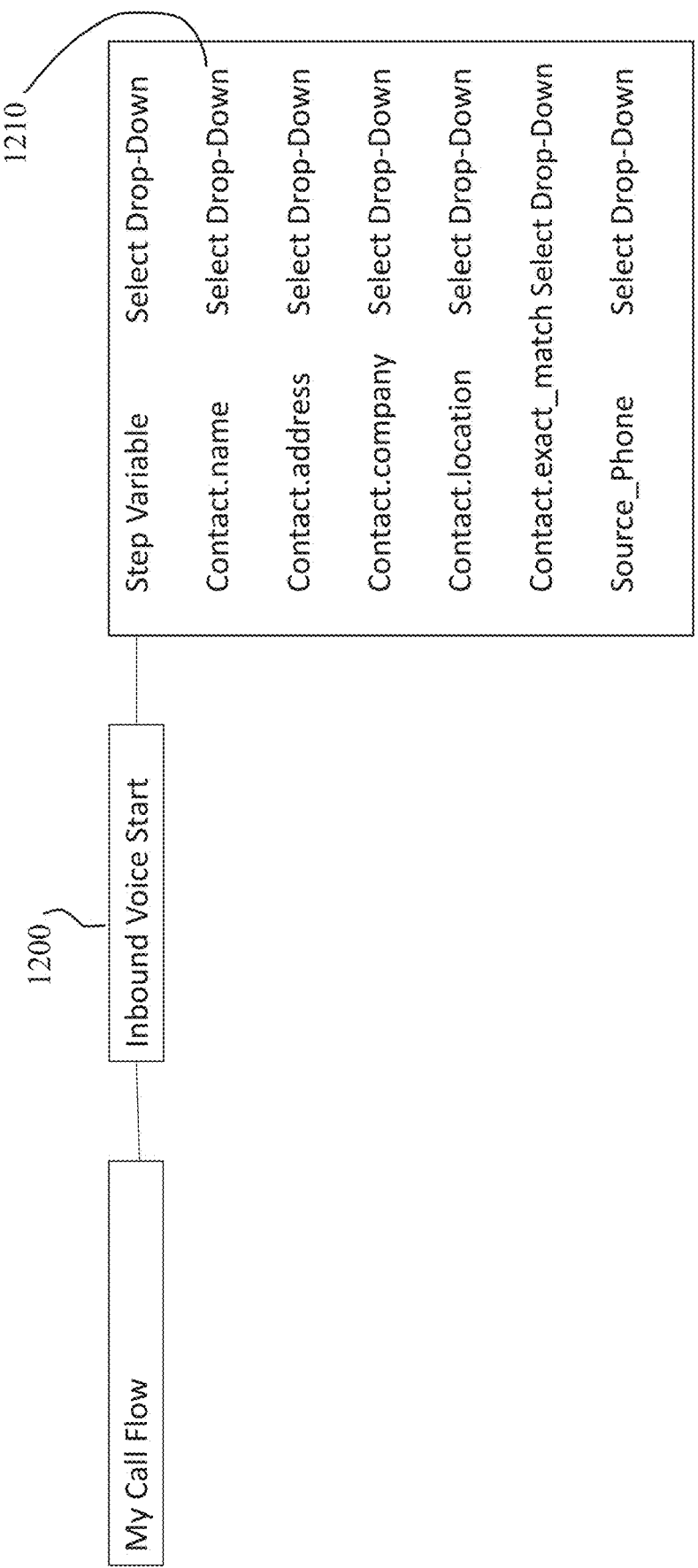
FIG. 12 is a schematic representation of a networked call center routing program with visual routing components and drop down menu options as disclosed herein.

Illustrated further in FIG. 12, each flow 1107 consists of a number of building blocks, called components 1200 (or steps), and are started by an interaction trigger 1210 selected in a drop down menu that is displayed simultaneously with the call flow route graph that defines the actions that the components will execute. For example, a "Play Audio" component provides the ability to receive an input text from a call center agent or operator or from a text channel of incoming call data and transform it into voice in one of the available languages.

A user can also use a variable in a Play Audio component to play a personalized greeting message for a caller: e.g., one can configure the waiting music that a customer listens to when they call you, so that the user can be consistent in brand management, or take advantage of the time customers are waiting to promote goods or services.

In another embodiment, the result of a data dip into companion software or database resources may be used to route "VIP" customers to an assignment component with a higher priority. The system of these embodiments is also configured to implement a set of actions to be triggered during a flow execution according to time rules, or any other conditions, to automate communications to be sent to customers during or after a call, etc.

Figure 13:
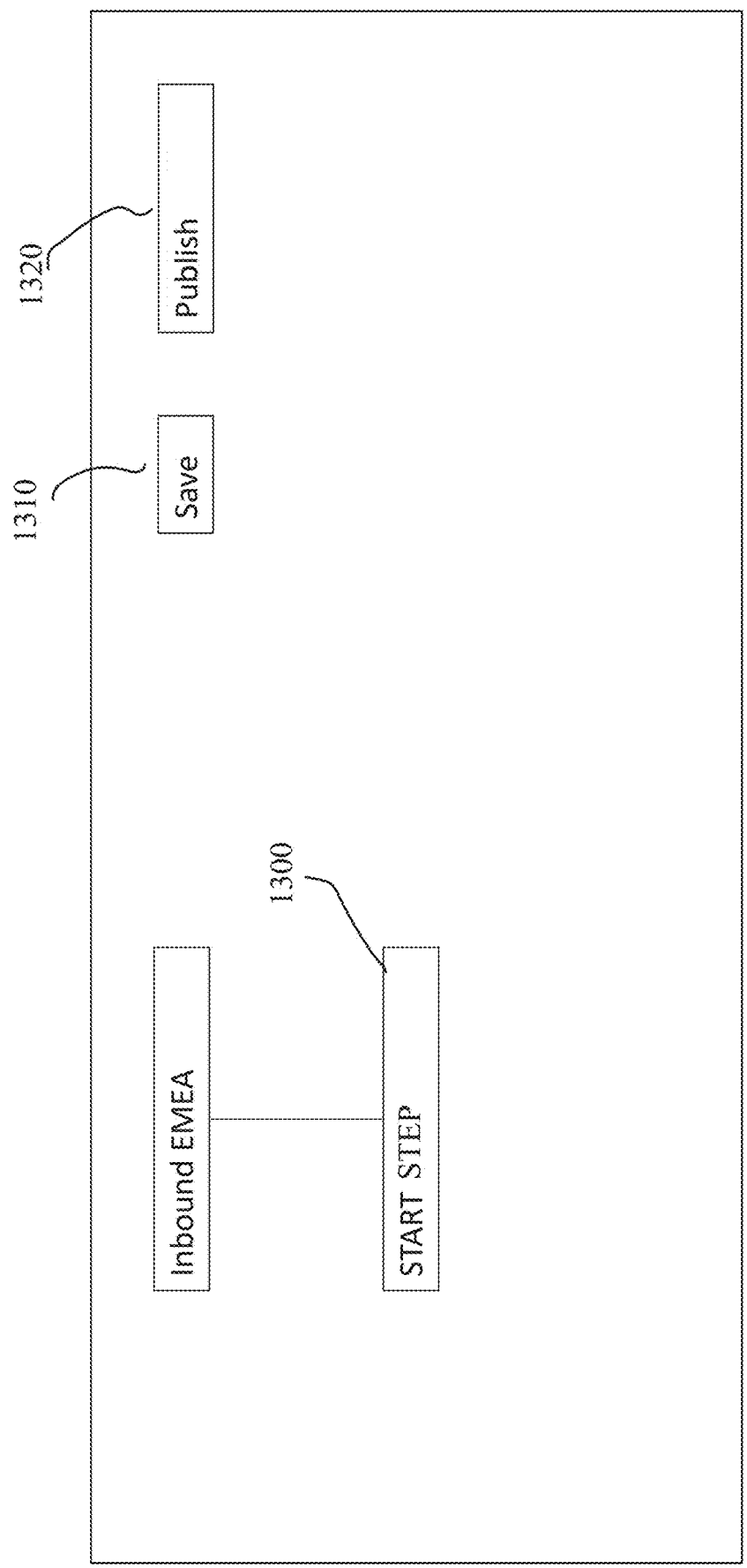
FIG. 13 is a schematic representation of a networked call center routing program with visual routing components and drop down menu options as disclosed herein.

In an example embodiment, the graphical programming call router may be configured to manage time consuming steps that are necessary in incoming communications management, such as but not limited to the creation of interactive voice response greetings. The following steps are illustrative of how the system may be programmed to accomplish tasks that formerly required extensive time commitments from IT professionals and vendor service personnel. FIG. 13 shows a first initial selection of starting the instruction development process for a call flow and illustrates options to save the work 1310 for later return and completion or the option to publish the work 1320 for activating as a live route in a call center.

Figure 14:
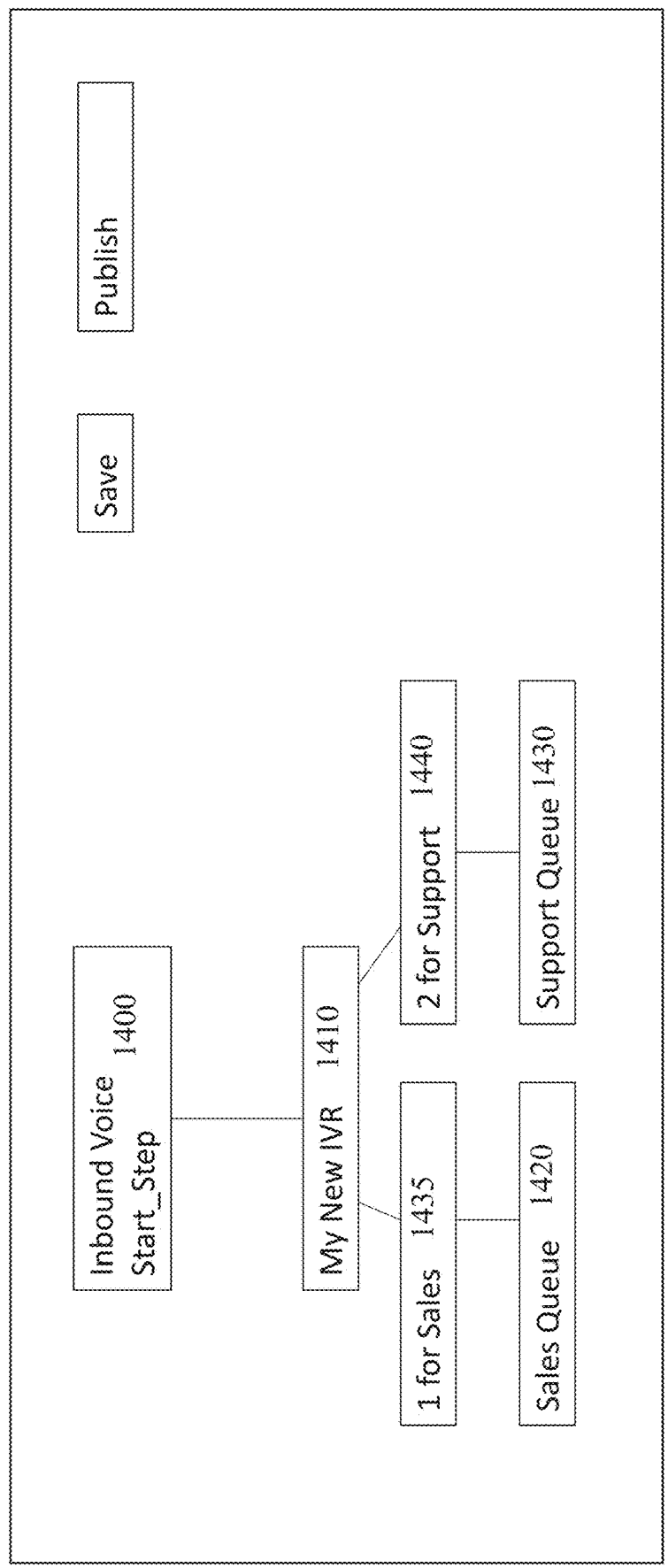
FIG. 14 is a schematic representation of a networked call center routing program with visual routing components and drop down menu options as disclosed herein.

FIG. 14 illustrates example, non-limiting steps in creating interactive voice response (IVR) greetings as one of many components 1400 in a call flow of the figure. Some example steps to implement the instruction development of FIG. 14 include:

Log in to the system account as an administrator.
Click the Admin section at the top of the page.
Select the Flows tab.
Click the Create New Flow button and type in a name and a brief description of a new flow's main actions 1200, so one can easily identify it when assigning phone numbers later on. The example of FIGS. 13 and 14 is "Inbound EMEA" and used "Inbound support flow for EMEA region" as the description.
Hit Create Flow.
Click the new My new IVR component.
Under the Preferences tab, make sure Text to Speech is selected and on the Language of audio output drop-down menu select the language to be used for the new greeting (we've selected English, UK for ours).
Type in the message that the developer/programmer wants customers to hear when they reach this IVR on the Text to speech box (e.g. "Press 1 for sales, 2 for support.") at 1435 and 1440 respectively
Press the Save button [1310] to create a new flow.

In the example of FIG. 14, the above described drop down menu selections have created components 1410, 1420, 1430 to implement flow routes 1435, 1440 so that when call data arrives such as "hit 1 for sales and 2 for support" the computerized instructions direct the call data to the correct department.

2. Assigning a Call

When assigning a call, a user can select from different parameters to determine the best agent or group to answer the call:

"Agents" 1110A (the call can be assigned to one or multiple specific agents).

"Ring Groups" 1110B (the call can be assigned to one or multiple ring groups).

"Variables in the flow context" 1210 (the call can be assigned to a list of agents defined via an interaction context variable*).

* Context collection: The embodiments described herein allow the IVR to collect information that will qualify an interaction save the information as context for a call. Context can be objectively identifiable portions of incoming call data (telephone numbers, IP addresses, circuit identification, call channel, data format) and can include meta data that either the user, a telecom service provider, or a call center adds to the call data for more information delivery to either a human or virtual agent.

Figure 15:
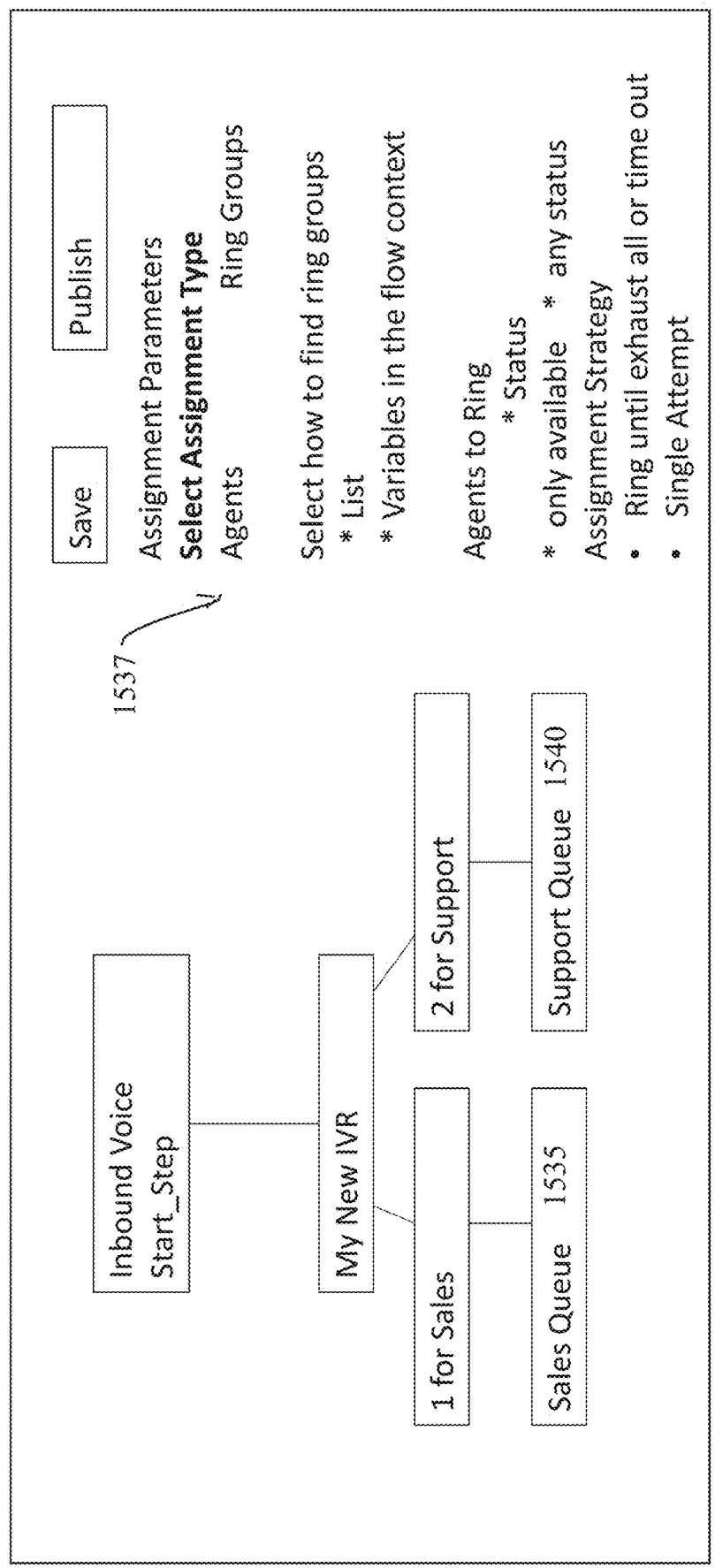
FIG. 15 is a schematic representation of a networked call center routing program with visual routing components and drop down menu options as disclosed herein.

For a simple example shown in FIG. 15, the figures show how to assign the calls that reach a support interactive voice response (IVR) menu option for a list of ring groups:

Click the Support queue component 1540 and select its Preferences tab.

Click the Ring Groups button 1537.

Make sure the List of Ring Groups in the programming account option is selected and click the drop-down list 1537.

Tick the box to select all ring groups, or select the individual ring groups to which you want the calls to be routed to.

Save the changes.

As shown in the drop-down schematic of FIG. 15, in one non-limiting embodiment, the user must now select how many agents should be rung at a time, define the priority of calls to support, define a maximum waiting time, and choose the music to play to callers as they wait for a support agent to answer the call.

Figure 23A:
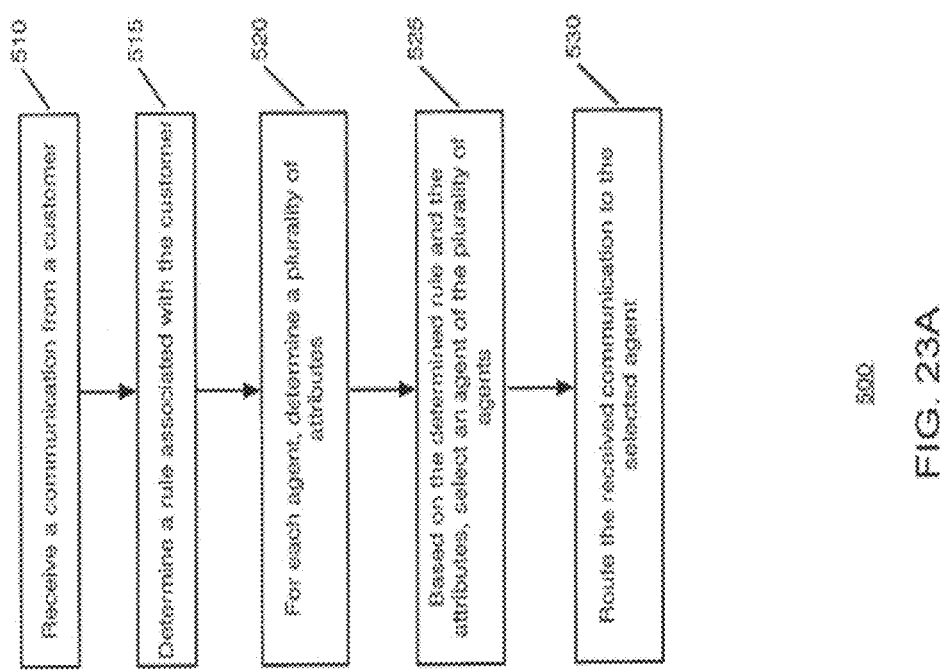
FIG. 23A is a schematic representation of a networked call center routing program in block diagram as disclosed herein.

Embodiments of this disclosure allow for interactions to be handled by highest priority level, such as by a rule illustrated at block 515 of FIG. 23A. These kinds of rules can be generated by drop down menus described above, or they may be created on the fly according to the above noted context data and meta data for a call. In one non-limiting example, if different interactions have the same priority, the one that has been in the queue the longest will be assigned first. Agents need to be in the "available" status to be able to receive interactions. If multiple agents match the condition, then the "most idle" agent(s) is/are chosen. Without limiting the scope of the embodiments, idle time here is defined by the time spent between the last interaction that was handled by that agent and the time of the assignment request. An agent that has been idle the longest will be chosen first.

Figure 16:
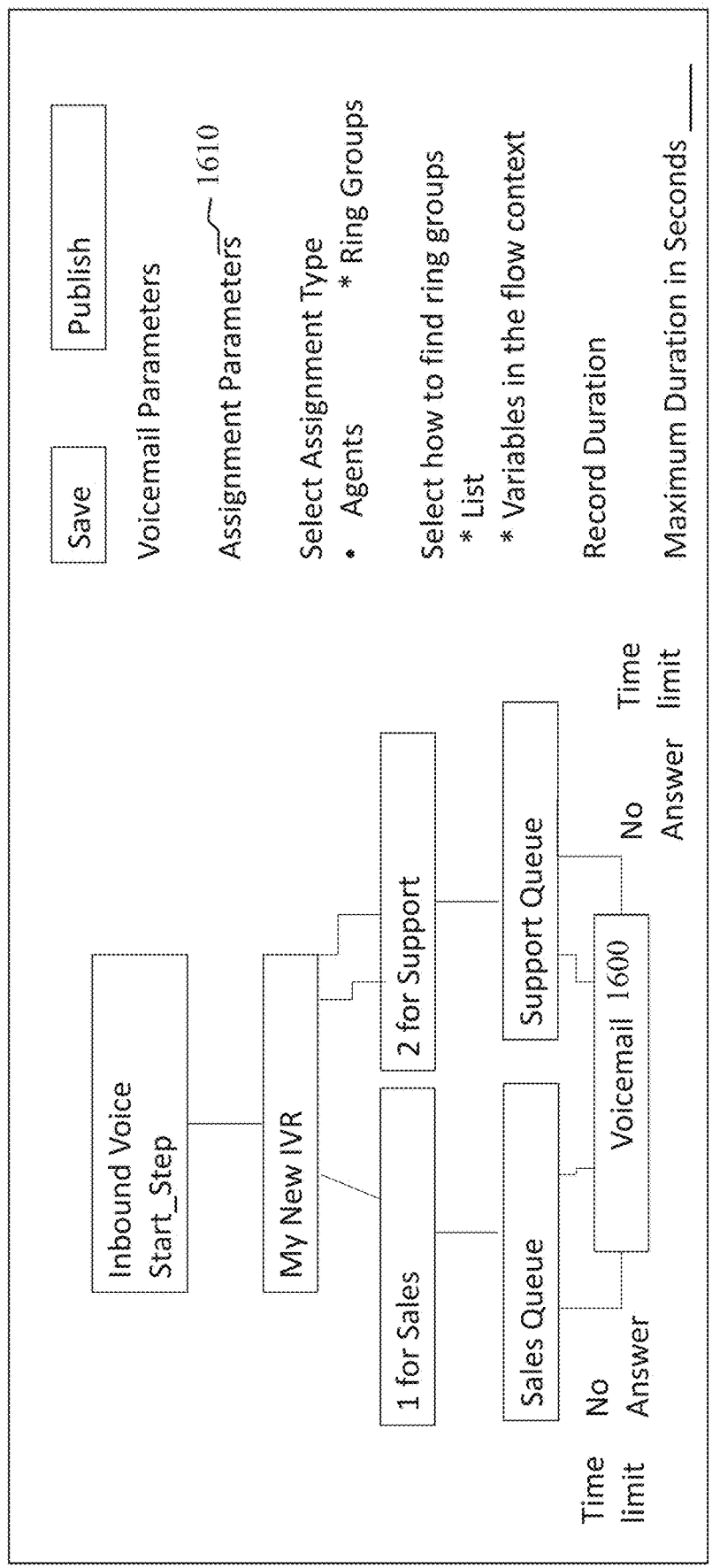
FIG. 16 is a schematic representation of a networked call center routing program with visual routing components and drop down menu options as disclosed herein.
Figure 17:
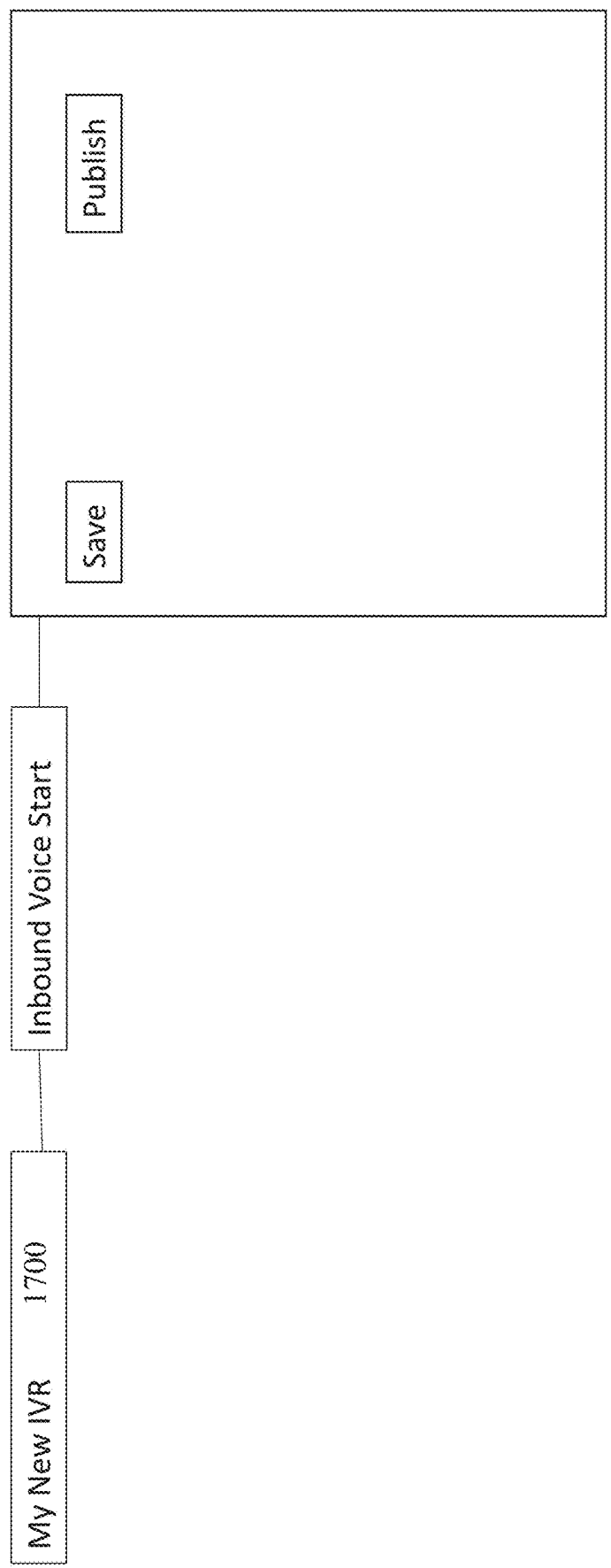
FIG. 17 is a schematic representation of a networked call center routing program with visual routing components and drop down menu options as disclosed herein.

For now, as shown in the routes of FIG. 16, one can complete support line configuration and the sales line configuration by defining what to do when there was at least one successful dial attempt but no agent answered the call, and when there was a match but all agents were busy and the configured timeout was reached. In this situation, a programmer can determine pre-defined exits 1608 from certain components 1600

Select the Exits tab.

Expand the Send to drop-down menu for the No answer section 2030 and select Add new step.

From the Component drop-down menu, select Voicemail 1600.

Type in a name for this exit step: "Voicemail".

Hit Add Step.

Scroll down to the "Maximum waiting time reached" section 2040.

Expand the Send to drop-down menu and select Voicemail. Scroll down to the "No match found" section.

Expand the Send to drop-down menu and select Voicemail.

Save changes.

If a user wants to give callers one or several ways out of the waiting queue:

Scroll down to the "Alternative Exits" section 2060 of FIG. 20.

In "Keypress Exits", select 1.

We will have option 1 sending the call back to the Standard IVR so we'll name our Exit: "1 to return to Standard IVR."

Hit Send to and select My new IVR (the name we gave to our Standard IVR component).

Save the flow as set forth in FIG. 21.

The Support queue component is now configured. Other kinds of queues, such as a Sales queue component of FIG. 22, one must adjust choices 2250 accordingly.

When all components are configured, a user may initiate other features that are equally subject to the graphical programming choices such as an added Voicemail component 1600. In this component the system is configured to make users able to assign to specific agents or ring groups voicemail messages left by customers.

Hit the Voicemail component and select its Preferences tab.

Click the Ring Groups button.

Make sure the List of Ring Groups in your Talkdesk account option is selected and click the drop-down list.

Tick the box to select all ring groups or select the individual ring groups to which the voicemail will be assigned to.

Go to the "Record duration" section and type in the maximum amount of time in seconds that each voicemail message will last.

Save changes.

Figure 18:
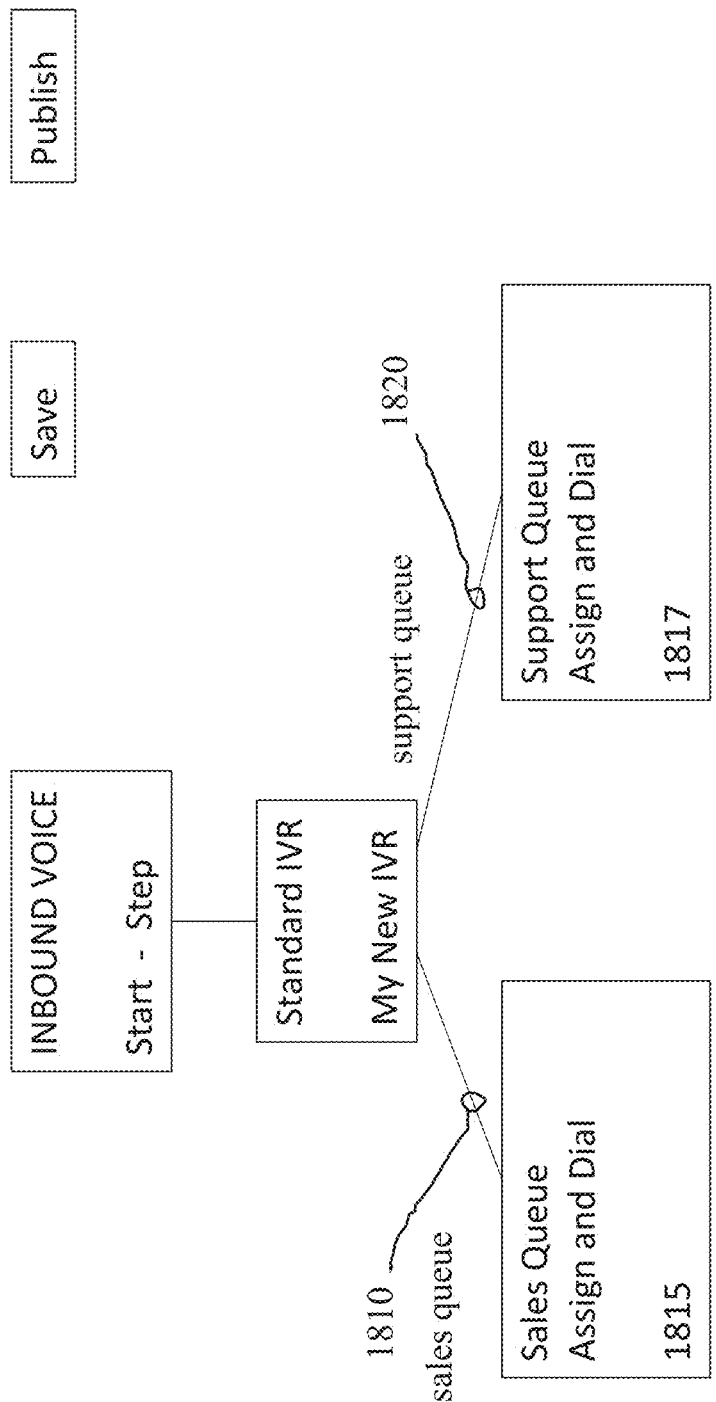
FIG. 18 is a schematic representation of a networked call center routing program with visual routing components and drop down menu options as disclosed herein.
Figure 19:
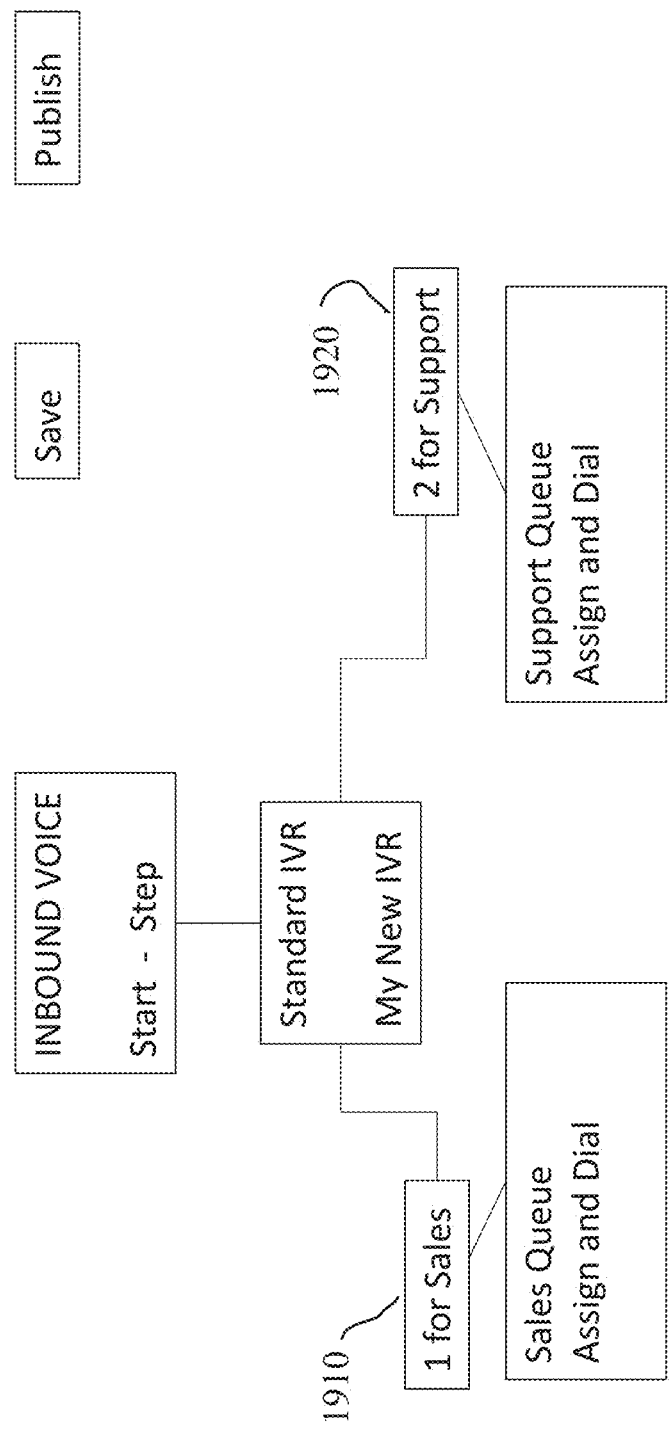
FIG. 19 is a schematic representation of a networked call center routing program with visual routing components and drop down menu options as disclosed herein.

One notable characteristic of this disclosure is the ability to program portions of a call center's data operations in discrete modules. As shown in FIG. 18, once a sales queue 1810 call flow route has been programmed with its respective component 1815, a different component can be programmed for a support queue and its component 1817. These modules may be configured to interact across flow routes or have distinct process for handling incoming call data as shown in FIGS. 18 and 19. In this way, when a caller inputs a selection such as "1" or "2" as a call input 1910, 1920, the components may have respective "assignment" and "dial" protocols as shown.

Figure 23B:
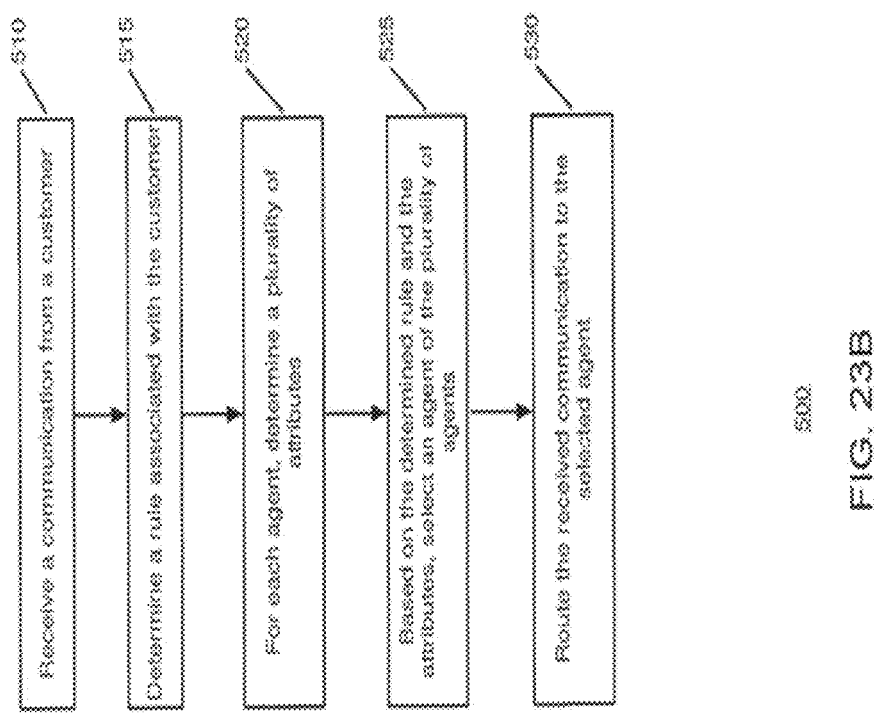
FIG. 23B is a schematic representation of a networked call center routing program with visual routing components and drop down menu options as disclosed herein.
Figure 25:
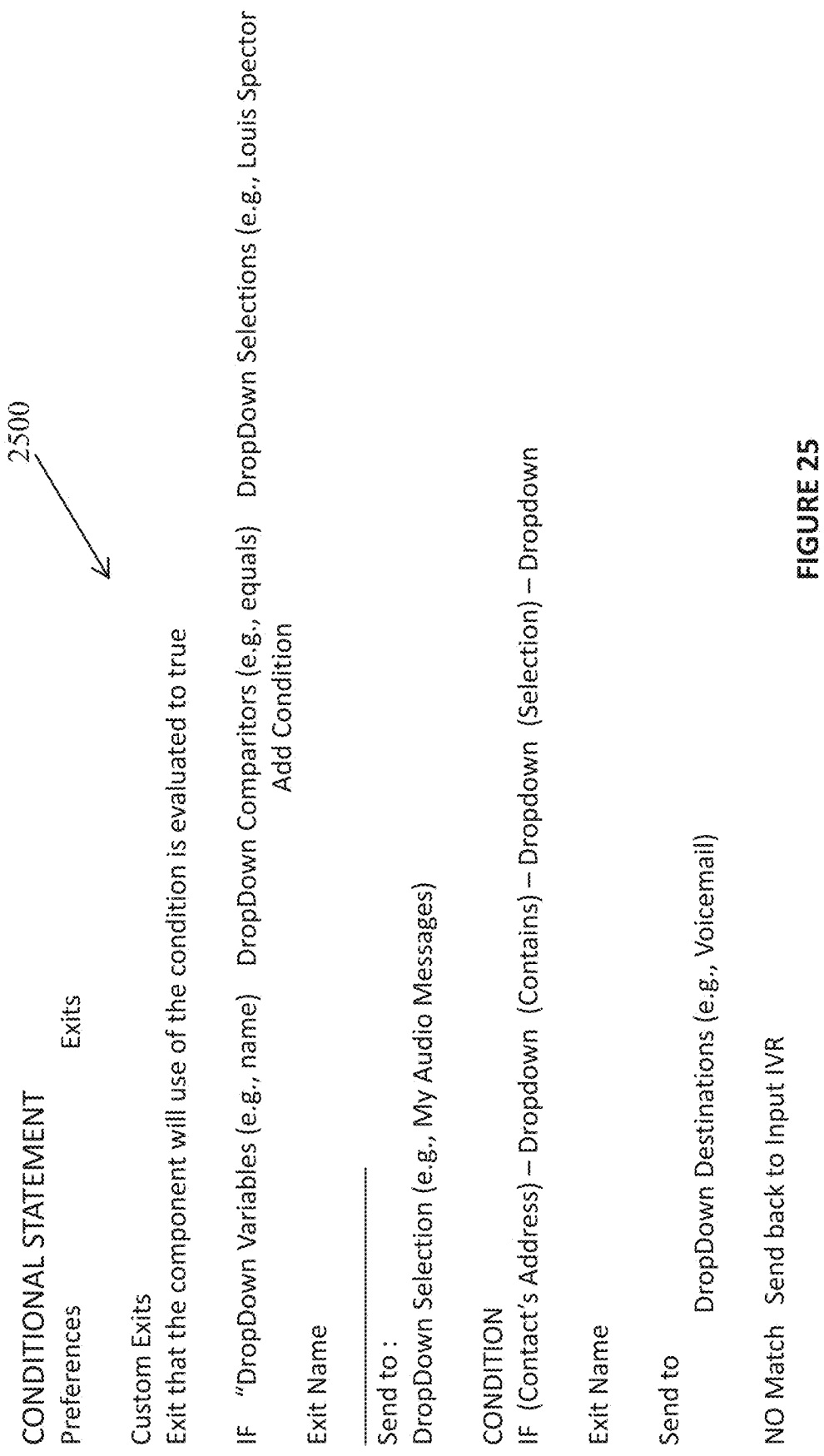
FIG. 25 is a schematic representation of a networked call center routing program with visual routing components and drop down menu options as disclosed herein.

Embodiments of this disclosure allow for the graphical programming call router to refer to outside resources according to attributes set up on a computerized program according to FIG. 23A and FIG. 23B, including other databases, servers, cloud-based data storage and the like to retrieve information about incoming data and anticipate how to best handle the same.

Using data dips and working with variables is shown, for example in FIG. 12 as variable drop down items 1210. This disclosure refers to a "data dip" as a non-limiting term by which the systems of this disclosure access information across other networks and other storage devices that are external to the call center software.

As shown in numerous figures, the drop-down menus of this disclosure include protocols for establishing variables. Variables are programming values that can change according to either conditional statement program flows or by access to real time dynamic data stored in external sources (cloud servers, external databases and the like). The process of programming variables is a powerful tool of this disclosure by allowing incoming communication data to be processed to collect data points and use them to make routing decisions. The data points can include the above noted context data and meta data. Some components, such as 2100 in FIG. 21, can expose data points that can be used to initialize or update certain flow variables 2130. For example, an inbound voice component exposes the data points such as but not limited to contact details, source and dialed phone numbers, and the Standard IVR component collects the keys pressed by the caller and populates the "selection" variable.

Here are some examples for using variables:

Use a variable in a Play Audio component to play a personalized greeting message for a caller. For example, one can configure the waiting music that a customer listens to when they call, so that the caller experience can be consistent in brand management or take advantage of the time customers are waiting to promote goods or services.

Use the result of a data dip in in an external resource such as Salesforce to route VIP customers to an assignment component with a higher priority.

You can also configure a set of actions to be triggered during a flow execution according to time rules, or any other conditions, to automate communications to be sent to customers during or after a call.

Figure 31:
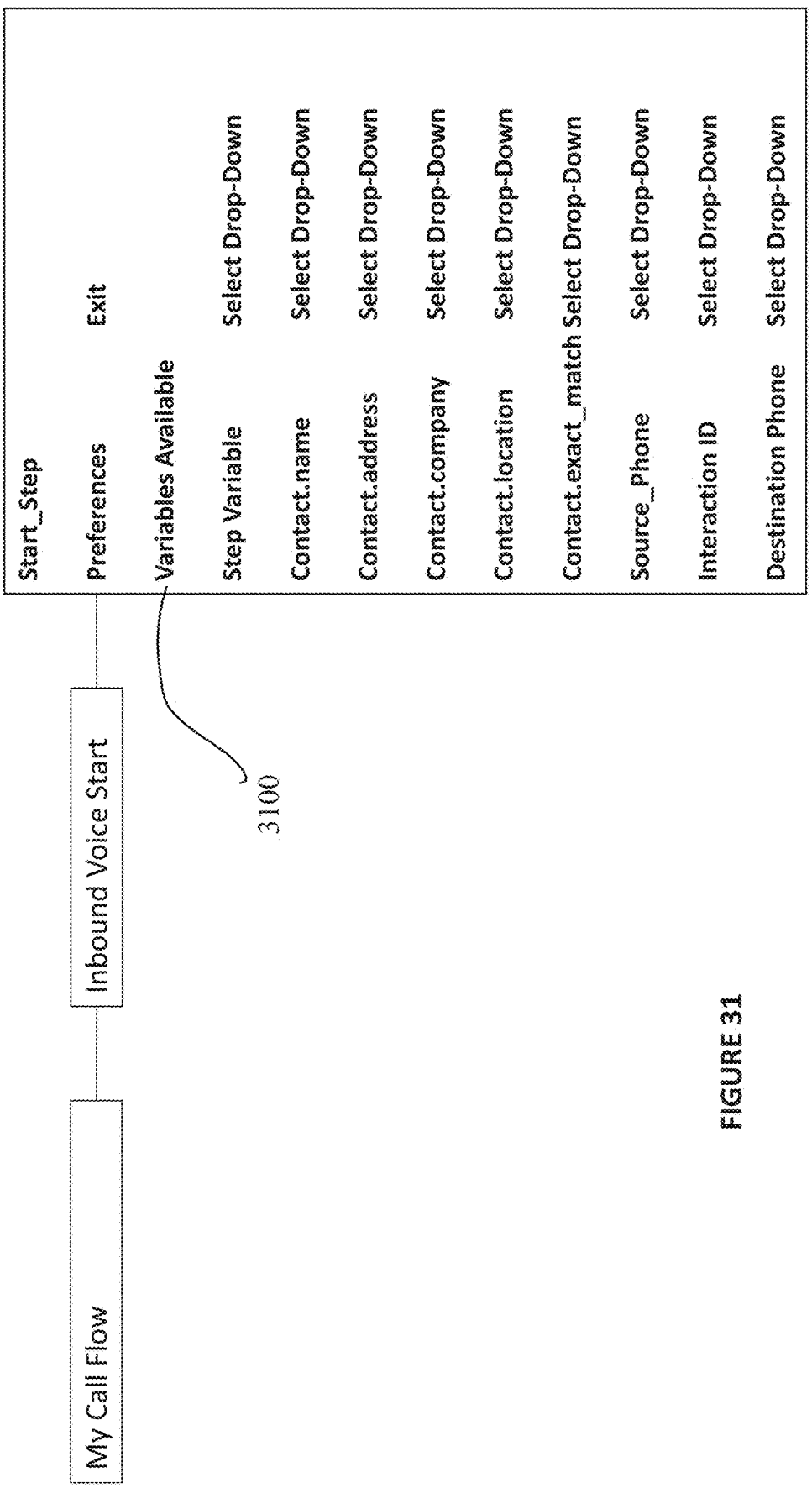
FIG. 31 is a schematic representation of a networked call center routing program with visual routing components and drop down menu options as disclosed herein.

Variables can be initialized from the initial step as shown in FIG. 31 or via a data dip in your CRM system.

Figure 34:
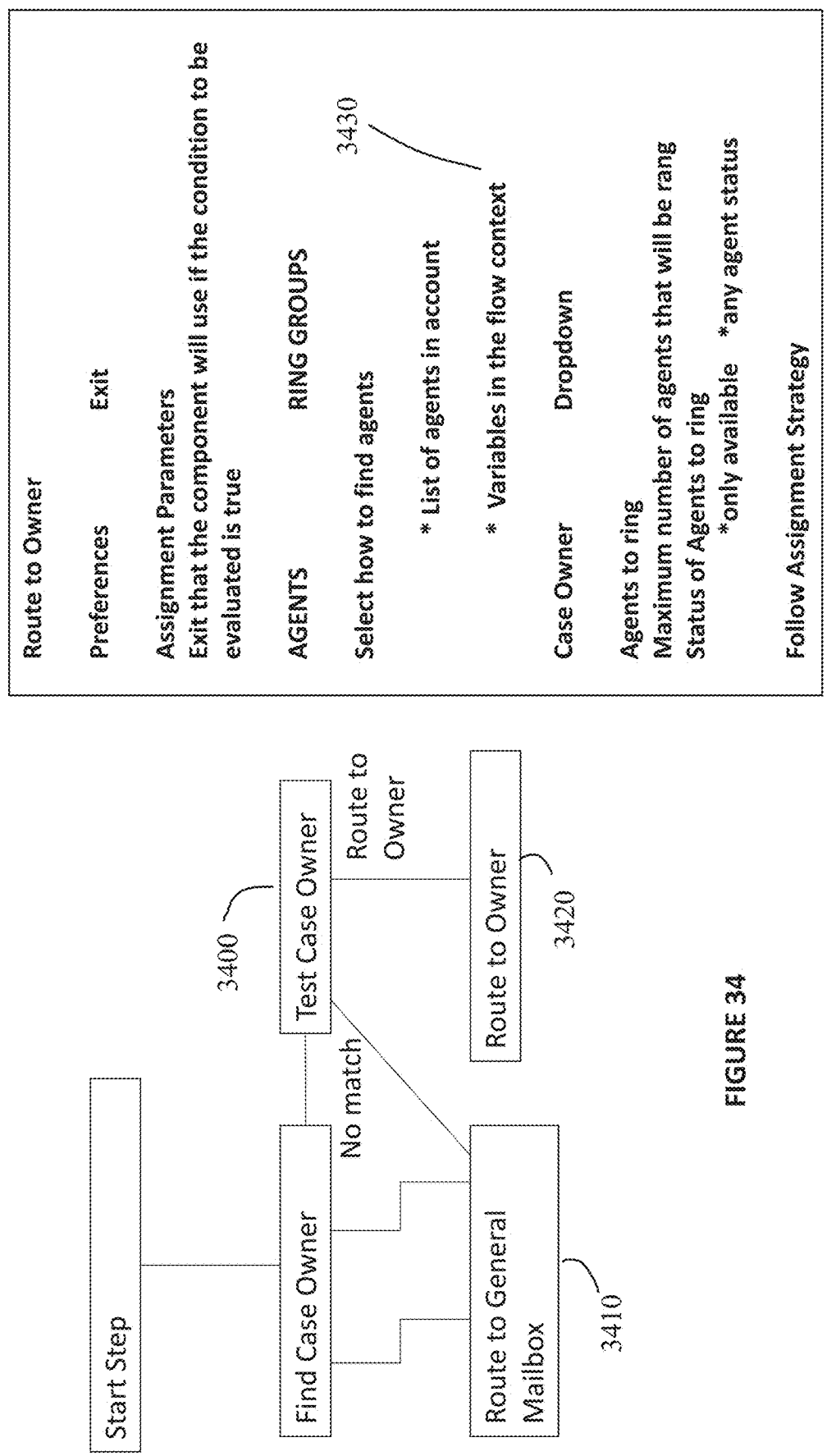
FIG. 34 is a schematic representation of a networked call center routing program with visual routing components and drop down menu options as disclosed herein.
Figure 35:
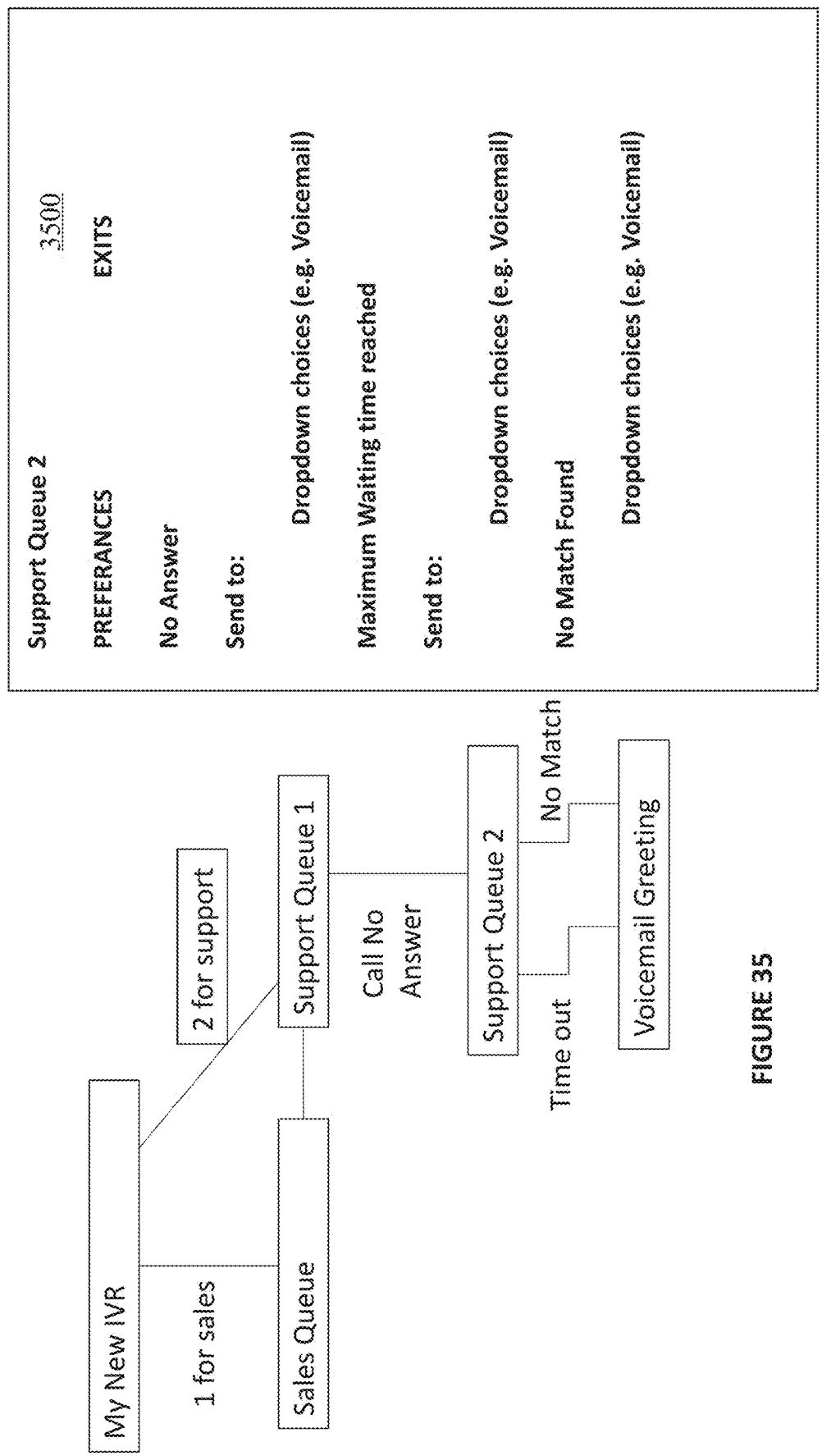
FIG. 35 is a schematic representation of a networked call center routing program with visual routing components and drop down menu options as disclosed herein.
Figure 36:
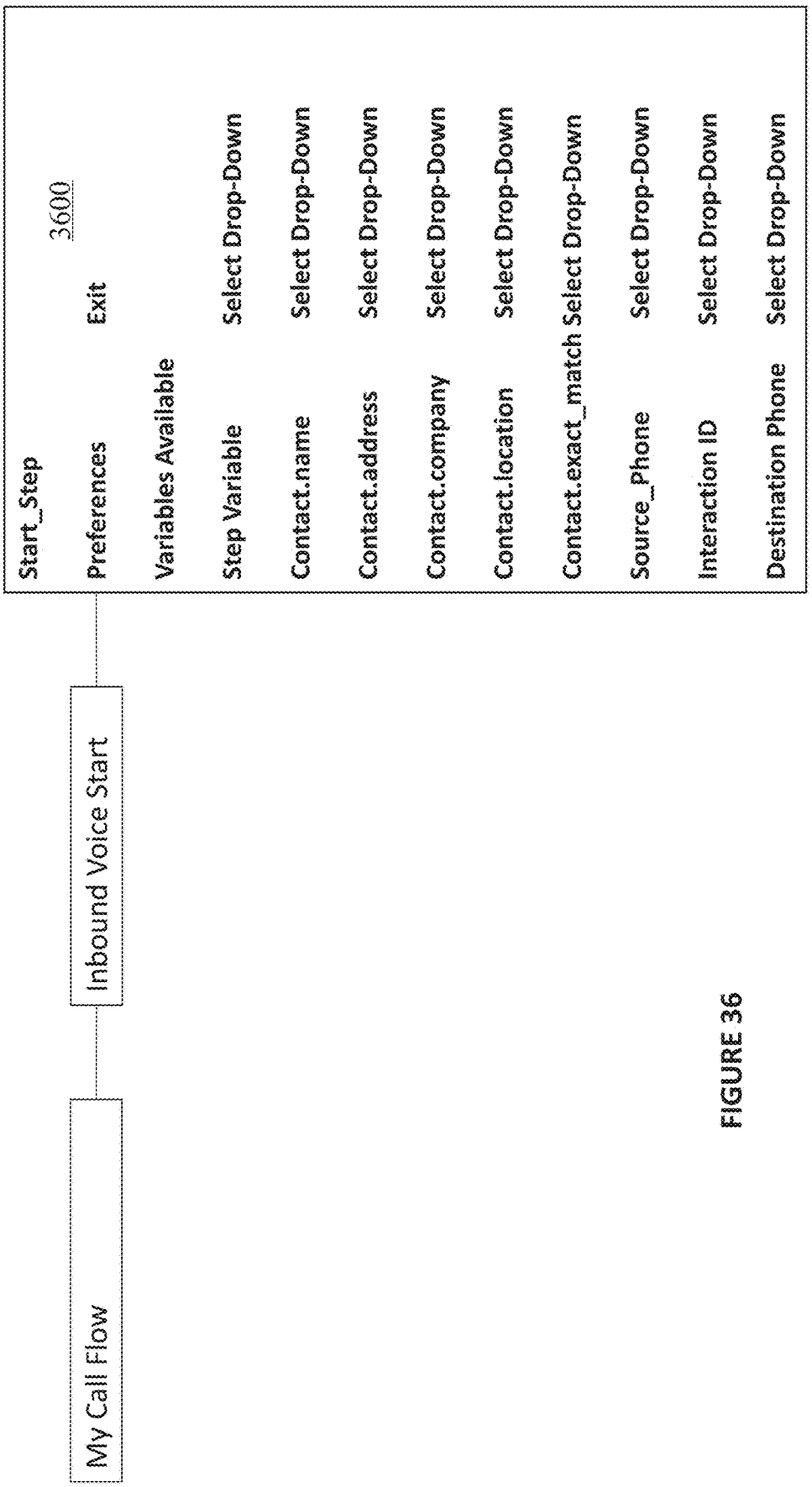
FIG. 36 is a schematic representation of a networked call center routing program with visual routing components and drop down menu options as disclosed herein.

Organizations that utilize call centers and other kinds of complex automated structures often have information storage facilities that are managed off site or even by third party data processing vendors (e.g., cloud based data storage offered by vendors such as but not limited to SalesForce). These organizations may use the embodiments herein to manage incoming communications data with the embodiments of this disclosure to create a simple flow to ask users to enter a case number to route sales-related calls directly to their third party vendor, such as a Salesforce case owner. The third party vendor may return useful data that would not necessarily be readily accessible on site at the user's location. This is shown in FIGS. 32 and 34 at component blocks 3200, 3300, 3400, 3410, 3430.

To use data dips with the graphical programming functions described herein, the user would need to add a variable to the "source_phone" data point and follow these non-limiting, exemplary steps:

Select the start step component 1700, 1800, 1900.
Under the Preferences tab, click on the drop-down next to "source_phone".
Hit Add New Variable.
Type in a name for the variable* (the example here is named "contact_phone").
Click on Add variable 2130.
Click the Sales queue component and select its Exits tab.
Expand the Send to drop-down menu for the No answer component and select Add new step.
Select Input IVR from the Component drop-down menu.

Figure 27:
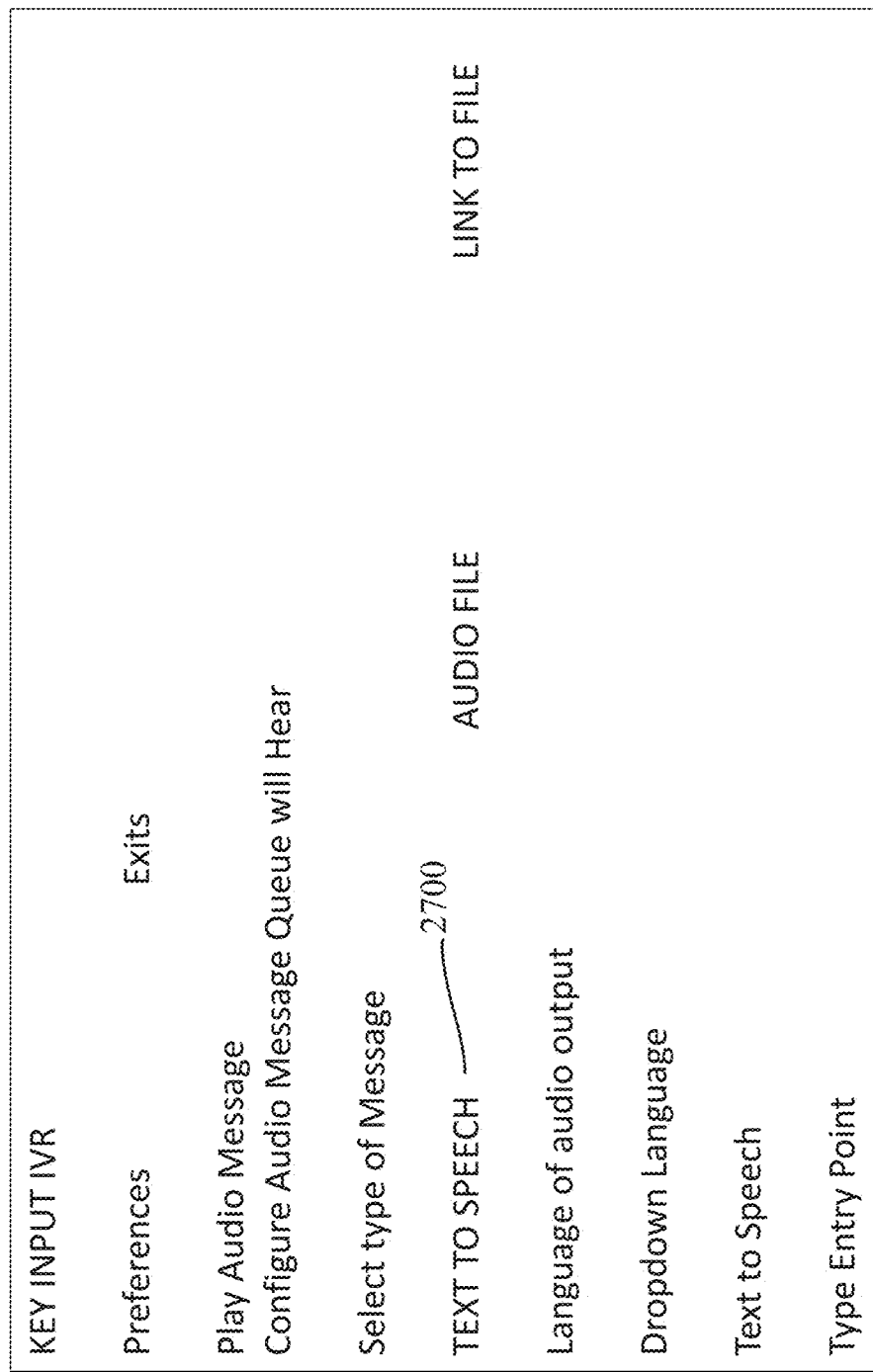
FIG. 27 is a schematic representation of a networked call center routing program with visual routing components and drop down menu options as disclosed herein.
Figure 28:
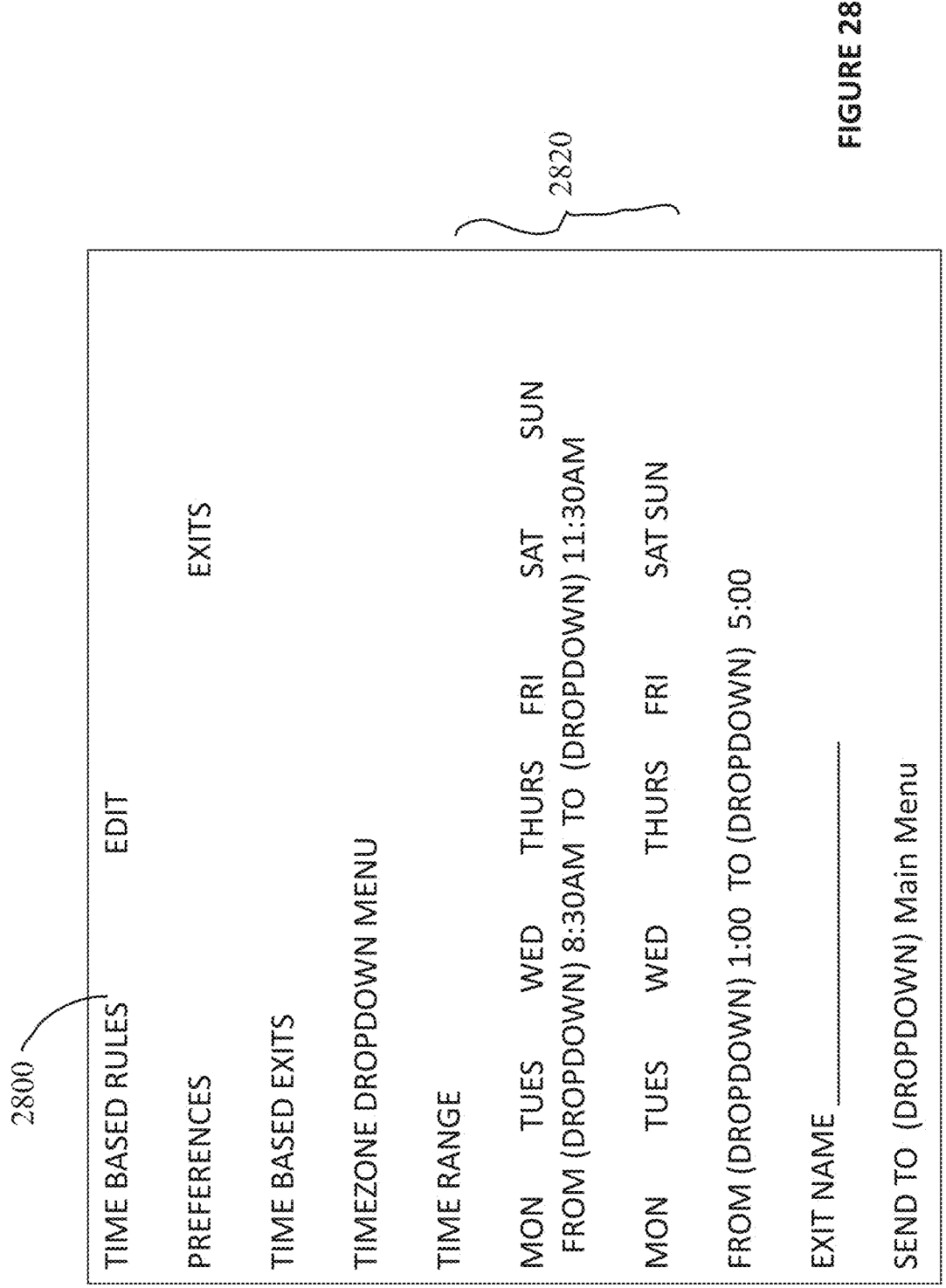
FIG. 28 is a schematic representation of a networked call center routing program with visual routing components and drop down menu options as disclosed herein.
Figure 29:
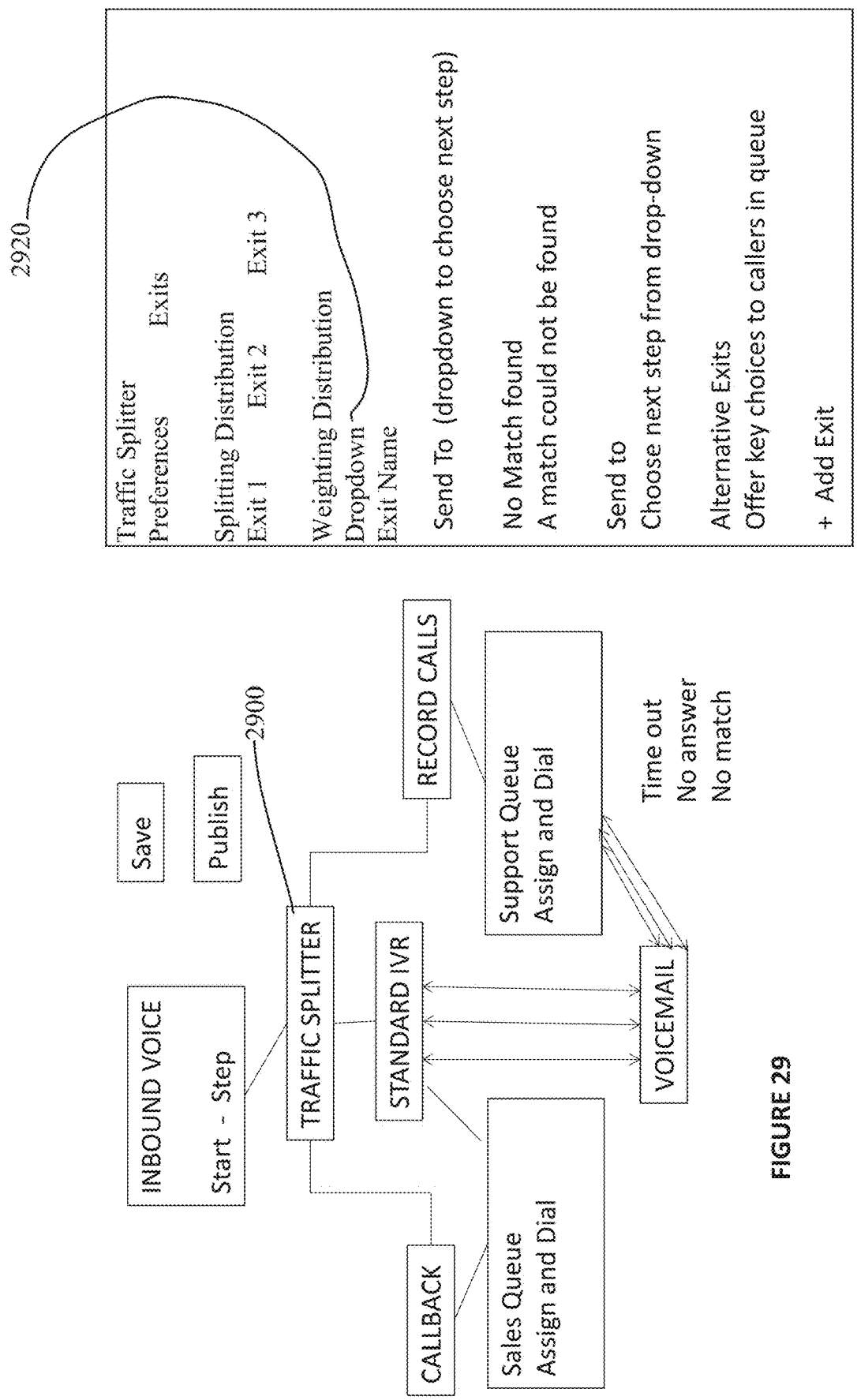
FIG. 29 is a schematic representation of a networked call center routing program with visual routing components and drop down menu options as disclosed herein.
Figure 30:
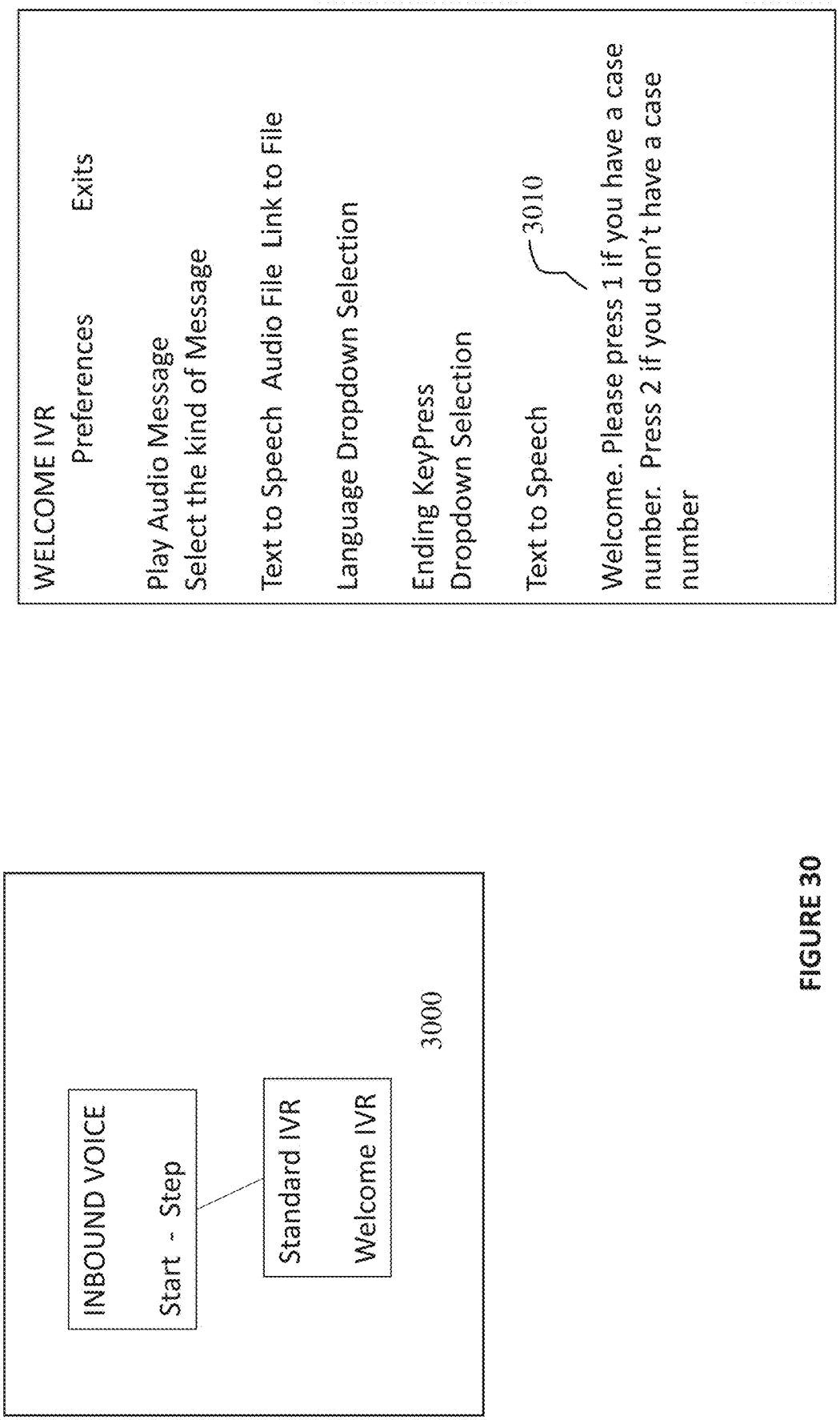
FIG. 30 is a schematic representation of a networked call center routing program with visual routing components and drop down menu options as disclosed herein.

Certain flow components may be programmed to accept individualized identifying information for call data, and a component may be programmed for a caller to enter such identifying information through voice or typed in data as shown in FIG. 22 at 2250. Typed data may be allowed in a particular format by programming a certain route 2600 with a protocol for key inputs, e.g., timing out if the keying party takes too long to complete the input as shown at the key input dropdown 2610. The keyed input may be subject to text to speech translation at 2700 of FIG. 27.

Type in a name for this exit step: e.g., "Ask for case number".
Press Add Step.
Scroll down to the "Maximum waiting time reached" section in the Sales queue component.
Expand the Send to drop-down menu and select Ask for case number.
Scroll down to the "No match found" section.
Expand the Send to dropdown menu and select Voicemail.
Save your changes.
Additional steps may include:
Click the newly created Ask for case number component and select its Preferences tab.
Make sure Text to speech is selected and on the Language of audio output dropdown menu, select the language to be used for the new greeting (we've selected "English, UK" for our example).
On the Text to speech box, type in the message you want your customers to hear when they reach this Sales IVR option (we've used: "If you know your case number please enter it now, then press pound").
Scroll down to "Keypress inputs" and select the Maximum number of digits that compose the case numbers (we've used "8" for our example).
Select the Ending keypress users should use after typing in the case number (we'll be using the "#" key).
Scroll down to "Variables". Expand the digits drop-down menu and select Add new variable.
Type in a name for the new variable (we've named ours "case_1") and hit the Add variable button.
Save changes.
Now select the Exits tab for the Ask for case number component.
Expand the Send to drop-down menu for the "Ok" section and select Add new step.
Select Salesforce data dip from the Component drop-down menu. Type in a name for this exit step: e.g., "Get case owner".
In the "Timeout" section, specify how many seconds the system will wait for the caller's input before directing the call to a different component (or the same if applicable).
Save changes.
Click the newly created Get case owner component and select its Preferences tab.
In the Query field type in or paste your Salesforce Object Query Language (SOQL) query. You can search Salesforce for specific information using SOQL. A query to case object must be done with case under quotation marks eg.: SELECT Id, Owner.Email, CreatedDate FROM "Case" Where . . . .
Hit the Retrieve Data button.
Three variables will be displayed: "Id", "Owner.Email", and "CreatedDate". For example, "Owner.Email" is a field in Salesforce that refers to the email of the agent who owns the contact, so we will be using it to route the call to said agent. Expand the drop-down menu for the Owner.Email string.
Select Add new variable and type in a name for the new variable (we've named ours "case_owner").*
Hit the Add variable button and Save your changes.

Now select the Exits tab.

Expand the Send to drop-down menu for the "Ok" section and select Add new step.

Select Assignment and Dial from the Component drop-down menu.

Type in a name for this exit step: e.g., "Route to case owner".

Hit Add Step.

Fill out the "No result" and "Error" sections. This is particularly useful in case the number that is calling your company does not exist in your Salesforce account.

Save your changes.

Now select the Exits tab.

Expand the Send to drop-down menu for the "Ok" section and select Add new step.

Select Assignment and Dial from the Component drop-down menu.

Type in a name for this exit step: e.g., "Route to case owner".

Hit Add Step.

Fill out the "No result" and "Error" sections. This is particularly useful in case the number that is calling your company does not exist in your Salesforce account.

Save your changes.

In another non-limiting embodiment one may select and configure which attributes will be used for matching a call with an agent.

Click the newly created Route to case owner component [40] and select its Preferences tab.

Under "Select assignment type" make sure Agents is selected.

Click the Variables in the flow context option and expand its drop-down list.

Tick the boxes next to the variable(s) you want to use for matching the call with an agent: in this case, the case_owner.

Fill out the remaining sections in the Route to case owner component (the Variables section is the only one that is not mandatory), including the ones on the Exits tab.

Save changes.

Some data points collected in the flow context can also be shared with the interaction context and be displayed in the agent's call bar.

To enable this, simply follow these three extra steps:

Click the "Manage Context" option { } on the left [45].

Tick the boxes next to the string values to be displayed on the agent's Callbar [46].

Save your changes.

The system is configured for users to enter Preferences for various features, such as but not limited to assignments for Agents to Ring in response to incoming communications data. In this component, you can configure the maximum number of agents that will be called simultaneously.

Status of Agents

Only Available: If all agents are "Away" or "Offline" at the moment, the call will immediately go through the "No Match" exit.

If all agents are "Busy", the system will wait the Maximum Waiting Time for any agent to become "Available" instead of going through the "No Match" exit.

If any agent is "Available" but rejects or doesn't answer the call, the call goes through the "No answer" exit.

Consider Any Status: When there are no "Available" agents, the component will wait the Maximum Waiting Time for any agent to become "Available" (including the ones "Away" or "Offline") instead of exiting through a "No Match".

If any agent is "Available" but rejects or doesn't answer the call, the call goes through the "No answer" exit.

Assignment Strategy

Number of Agents: Type in the maximum number of agents that will be called simultaneously.

Exhaust: The system will simultaneously ring the number of agents defined in the "Number of Agents" field. It will only ring that batch of agents once. If no agent takes the call, the system will ring a different batch of agents (only once as well). It will continue to do this until there are no more available agents left or when the timeout 2610 has been reached.

Single Attempt: The system will simultaneously ring the number of agents defined in the "Number of Agents" field. It will only ring that batch of agents once.

Conditional Statement

With the Conditional Statement component a user can direct a call to one of several exits. Each exit has its own condition(s). The exits are evaluated in order so the call is directed to the first one whose conditions are met. If no condition is met, the "No Match" exit is taken.

Input IVR

The Input IVR component allows a caller to input data via the dial pad. This can be useful if new data is needed to make better routing decisions or to provide a better service.

Text to Speech 2700

This component allows a user to type in a message that will be converted to audio and played to your customers. It is available in seven languages at least:

English (UK or United States)

German (Germany)

Spanish (Spain)

French (France)

Italian (Italy)

Portuguese (Portugal or Brazil)

Russian (Russia)

Time-based rules 2800

Define the time-based rules 2820 to allow routing according to time ranges or to any day(s) of the week.

Traffic Splitter 2900

This component enables a user to split incoming calls into routes of your choice by weight ratios 2920.

Assigning a Call to the Case Owner

The graphically programmed call router makes it easy for a user to collect data from third party vendors, cloud based resources, on site and off site servers, and other information repositories and use retrieved data to assign a call to an appropriate agent. A simple way to do this is by first requesting the caller to input their Case ID on the dial pad. Then, through a Data Dip in into a third party vendor's data resources via a network, (e.g., Salesforce) the user will find out which agent owns the case. Lastly, the agent will use the Assignment and Dial (A&D) component to assign the call to that agent.

Please follow these instructions to learn in detail how to assign a call using a data dip for a call flow such as the flow 3000:

1. Add the Standard IVR component to your flow.
2. Open the Standard IVR component, and on the Preferences tab, choose Text to speech as the message type.
3. Select the language you will write your message in.
4. In the "Text to speech" field 3010, type in the message that will be played when the flow reaches the Standard IVR component.

Example: "Welcome. Please press 1 if you have a case number. Press 2 if you don't have a case number."

Assigning a Call to the Same Agent 3300

If a user has a third party vendor information resources, such as but not limited to Salesforce integrated with a graphically programmed call router of this disclosure, a user can easily assign an incoming call to an agent who has previously dealt with the same caller. One of the simplest ways to do this is by matching the phone number the caller is using with the phone number associated with a case in database resources. The caller will then be connected to the agent who owns the case. If there isn't a match, the call can be directed to a general support line, for example.

Please follow these instructions to route a call to the owner of a case in Salesforce based on the phone number of a caller:

1. Open the Inbound Voice component and select the Preferences tab. The Preferences table may be pre-programmed to accept the kind of data entry at hand or may also be used to initialize other variables such as calendar and time of day answering rules as shown in the Preferences screen 2400 of FIG. 24.
2. Click on the drop-down next to "source_phone" and then on Add new variable.
3. Give a name to the variable. It will store the phone number that called your contact center. We've named it "contact_phone".
4. Select the Exits tab and add the Salesforce data dip component.
5. Open the Salesforce data dip component and paste the following query:
6. Click on Retrieve Data.
7. Click on the Owner_Email drop-down and add a new variable with the name "case_number". This variable will store data if there is a match between the phone number used to call the contact center and the phone number associated with a case in Salesforce.
8. Open the Exits tab and add the Conditional Statement component under the "Ok" section.
9. Under "No Result" and "Error" add the Assignment and Dial (A&D) component and name it "Route to General".
10. Open the Conditional Statement component, and select the Exits tab.
11. Use the drop-downs in the first "Exit" to create the following condition:
12. Under "Send to" add a new Assignment and Dial (A&D) component and name it "Route to Owner".
13. Under "No Match", direct the call to "Route to General" (A&D component).
14. Open the A&D component named "Route to Owner".
15. Select Agents as the assignment type.
16. Under "Select how to find agents", choose Variables in the flow context and select case_owner from the list.
17. Complete the configuration of this and the remaining components.
18. Save your flow.
19. From now on, if the phone number calling your contact center exists in a Salesforce case, the call will be routed to the agent who owns the case. If it doesn't exist, the call will be directed to a general support line.

Chained Routing

With the graphically programmed call router of this disclosure, assigning incoming calls to agents/ring groups is as easy as adding and configuring the Assignment and Dial (A&D) component. If a call isn't answered, a user can direct it to different agents/ring groups by adding another A&D component. For example, if a tier-1 support team is unable to answer a call, a user can direct it to a tier-2 support team. Please follow these instructions to create two or more layers of call assignment:

1. Add the Assignment and Dial (A&D) component to your flow and name it "Support Queue 1".
2. Open the A&D component, and select the Preferences tab.
3. Choose Ring Groups as the assignment type and select the appropriate ring group from the drop-down. In our example, we've chosen our "Tier 1 Support" ring group.
4. Fill out the remaining fields of the Preferences tab.
5. Select the Exits tab.
6. Add a new A&D component under the "No answer", "Maximum waiting time reached", and "No match found" sections. Every time the "Tier 1 Support" ring group is unable to answer a call, it will be directed to this new component.
7. Name the component "Support Queue 2" 3500.
8. Open "Support Queue 2", and select the Preferences tab.
9. Choose Ring Groups as the assignment type and select your corresponding "Tier 2 Support" ring group.
10. Fill out the remaining fields of the Preferences tab.
11. Select the Exits tab.
12. Add the appropriate components in case your "Tier 2 Support" is unable to answer the call. In our example, we will route the call to the Play Audio component in all three sections. This way we apologize to the caller for not being able to answer the call and tell them they can leave a voicemail.
13. Open the Play Audio component and type or paste your message. Example: "All of our agents are currently assisting other callers. Please call again later or leave a message after the beep."
14. Select the Exits tab and add the Voicemail component.
15. Complete the configuration of the Voicemail component or any other incomplete component you may have.
16. Save your flow.

From now on, if a "Tier 1 Support" ring group does not answer a call, it will be routed to the "Tier 2 Support" ring group. And if they are unable to answer the call as well, it will be directed to Voicemail.

Prioritizing Low CSATs

If an organization uses Salesforce and wants to prioritize incoming calls according to the Customer Satisfaction Score (CSAT) 3700 of a caller in Talkdesk, a programmer can do that through the use of Variables. For example, if a customer has a CSAT lower than 5, you can prioritize their call and/or assign it to more experienced agents.

Please follow these instructions to prioritize calls according to the CSAT of a caller:

1. Open the Inbound Voice component and select the Preferences tab.
2. Click on the drop-down next to "source_phone" and then on Add new variable.
3. Give a name to the variable. It will store the phone number that called your contact center. It will be used to check if in Salesforce the number is associated with a specific CSAT.
4. Select the Exits tab and add the Salesforce data dip component.
5. Open the Salesforce data dip component and paste the following query:
6. Click on Retrieve Data.

7. Click on the CSAT_SCORE_c drop-down, and add a new variable with the name "csat_score". This variable will store data if there is a match between the CSAT and the phone number.
8. Open the Exits tab and add the same Conditional Statement component to all three Exits.
9. Open the Conditional Statement component, and select the Exits tab.
10. Use the drop-downs in the first "Exit" to create the following condition:
11. Name the Exit "High Priority" and under "Send to" add an Assignment and Dial (A&D) component. We've named it "Premium Line" 3800 because we want to prioritize calls from customers with low CSATs.
12. Under "No Match", add a new A&D component. We've named it "Regular Line" 3810.
13. Open "Premium Line" (A&D component) and select the Preferences tab.
14. Scroll down to the "Priority" section, and choose "List of Priorities".
15. Since we want to prioritize these calls, select "1" for top priority.
16. Fill out all the remaining fields in both tabs.
17. Open "Regular Line", scroll down to the "Priority" section, and choose "List of Priorities".
18. In the "Priority" section, select any number except 1 so that this A&D does not have the same priority has the A&D for callers with a low CSAT.
19. Fill out all the remaining fields in both tabs and remember to save your flow when you are finished.

From now on, if calls coming through the two A&D components you configured end up in the same queue (directed to the same agents or ring groups), the "Premium Line" calls will be handled first.

Figure 39:
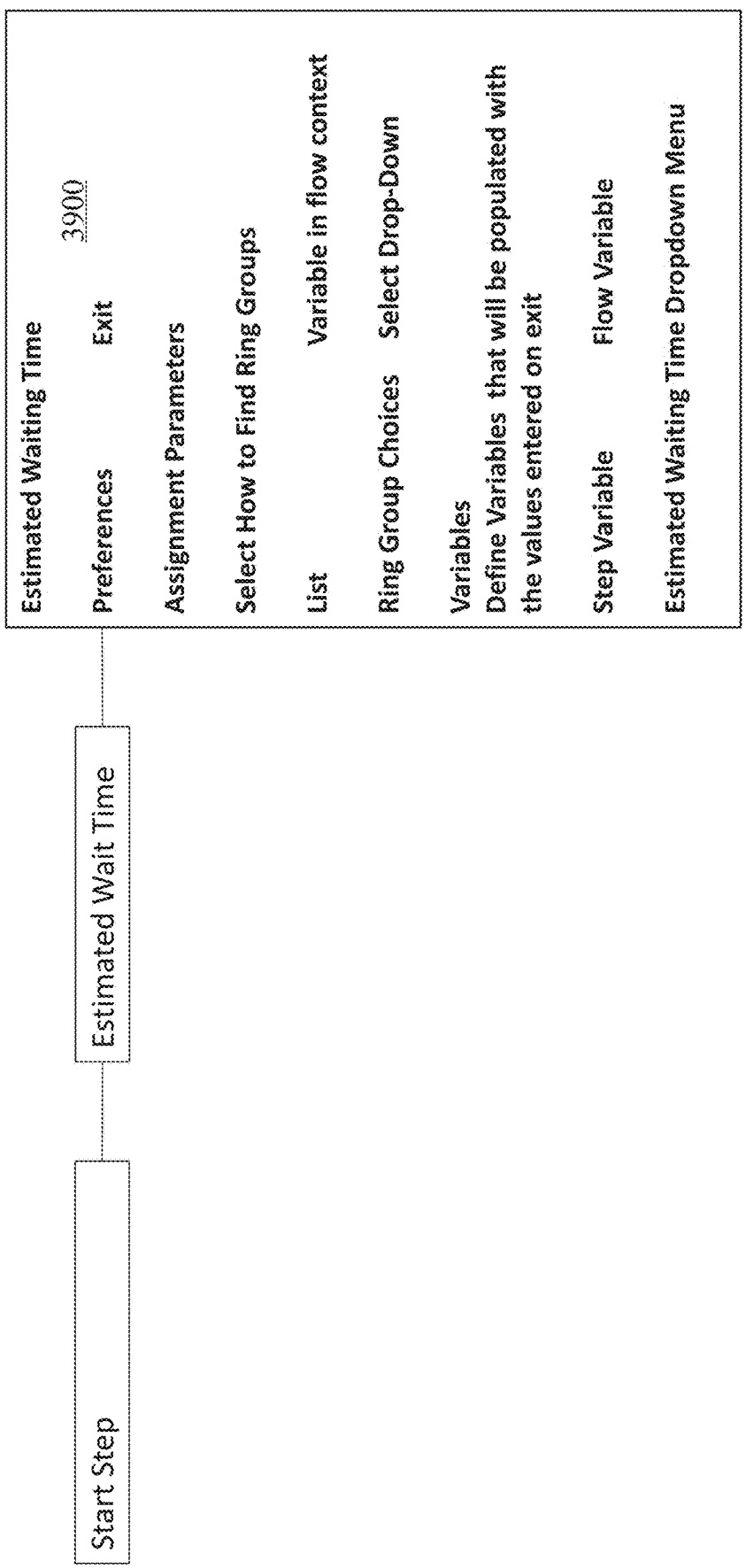
FIG. 39 is a schematic representation of a networked call center routing program with visual routing components and drop down menu options as disclosed herein.
Figure 40:
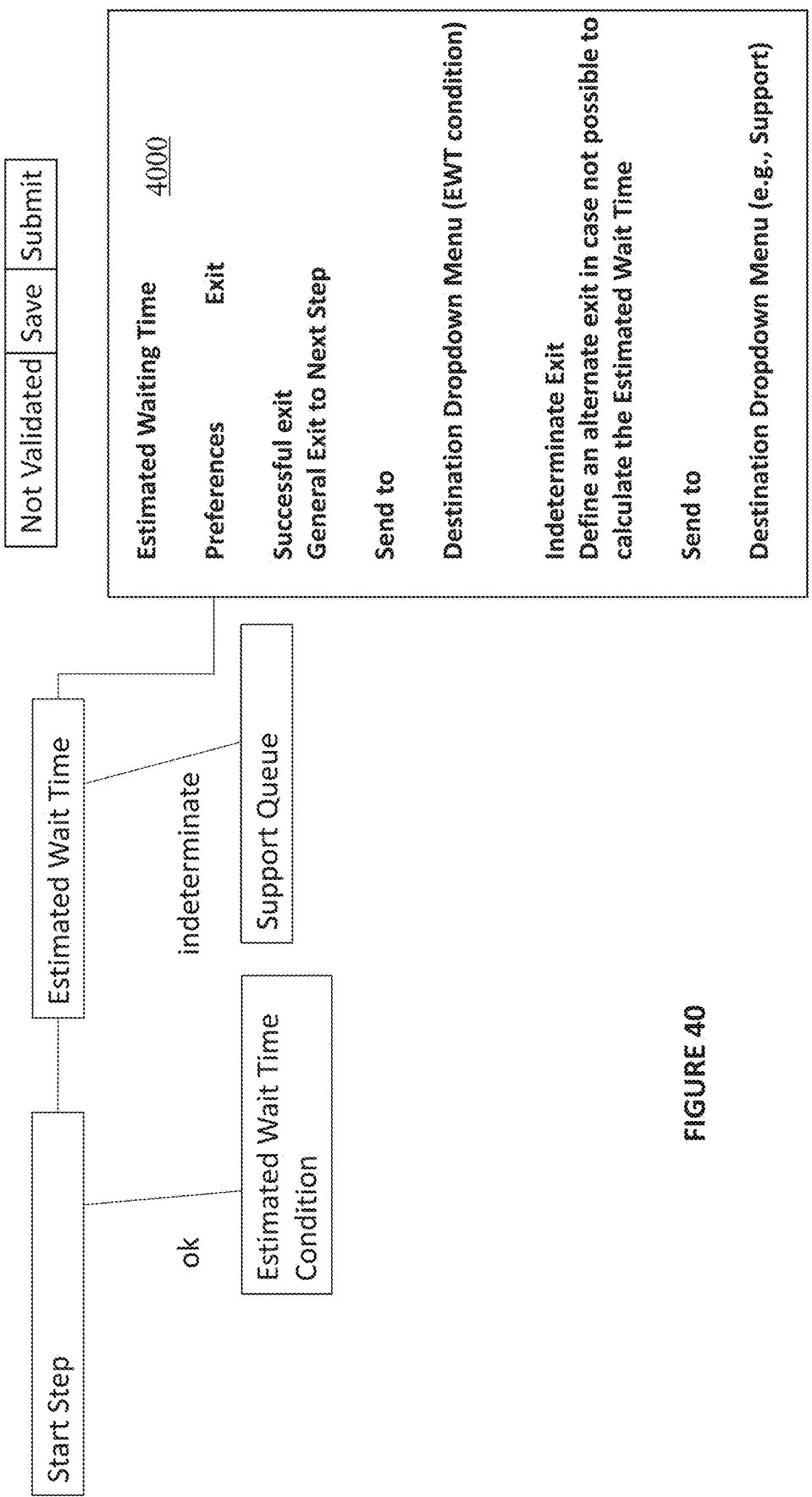
FIG. 40 is a schematic representation of a networked call center routing program with visual routing components and drop down menu options as disclosed herein.
Figure 41:
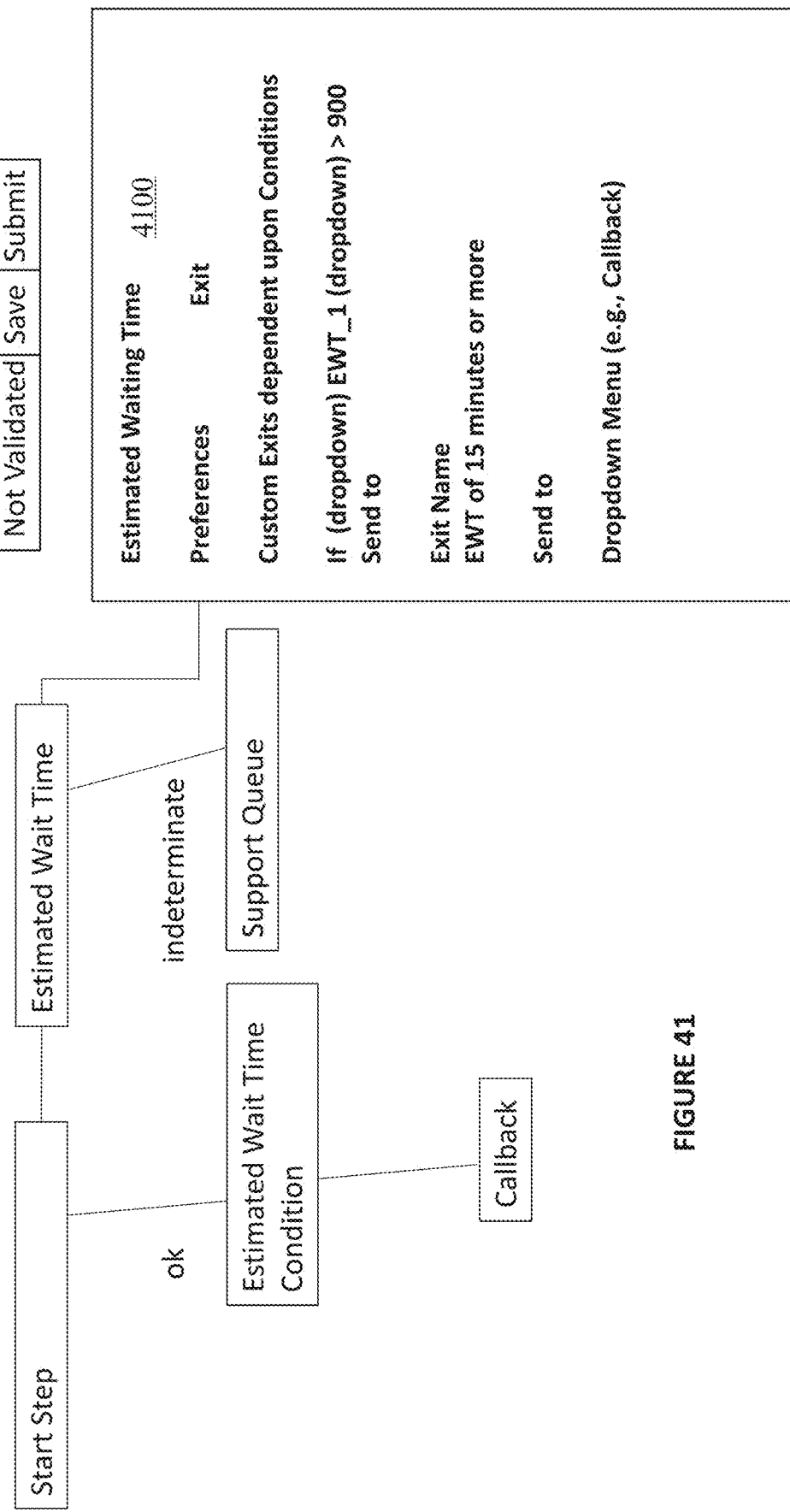
FIG. 41 is a schematic representation of a networked call center routing program with visual routing components and drop down menu options as disclosed herein.
Figure 42:
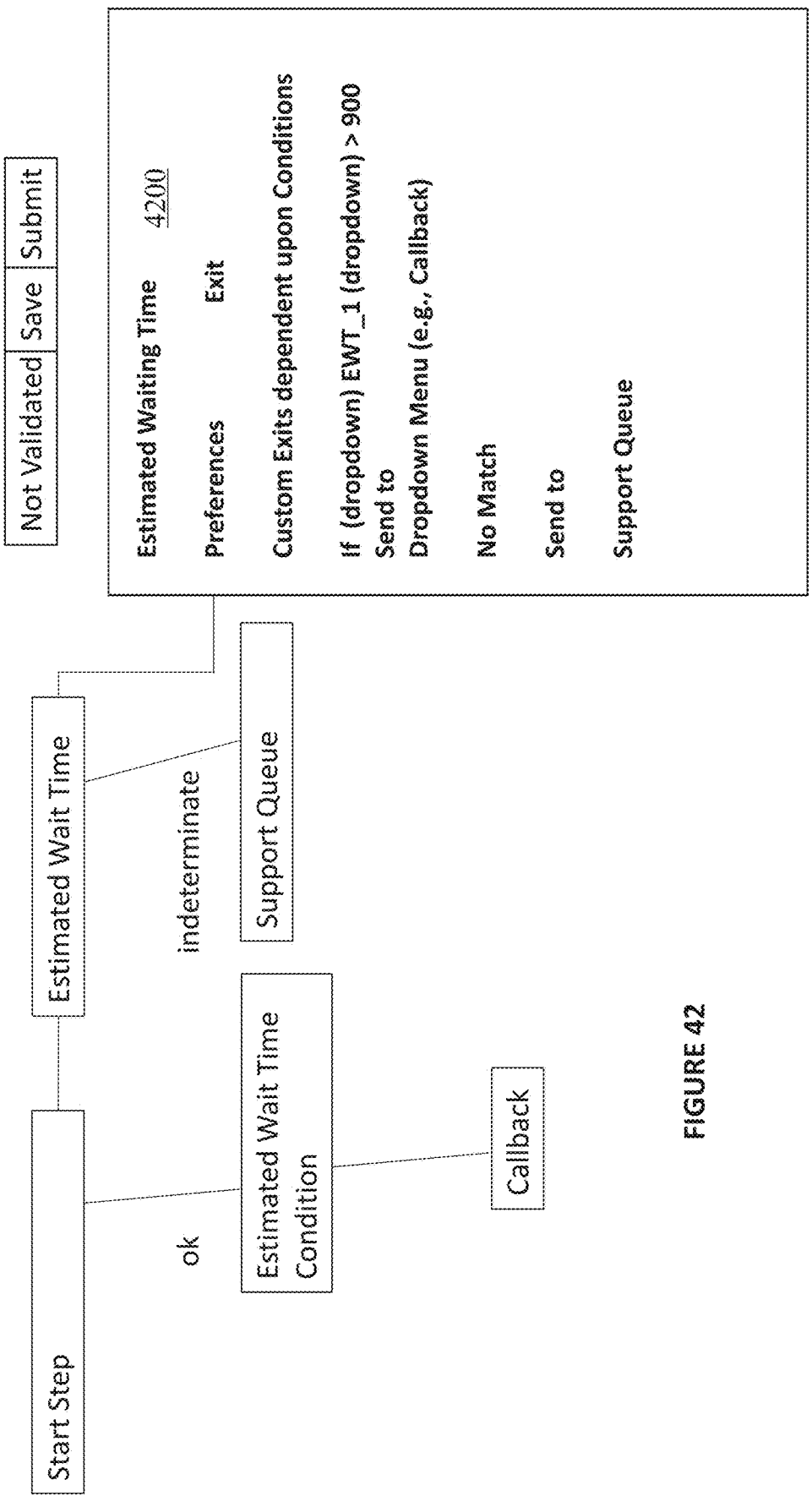
FIG. 42 is a schematic representation of a networked call center routing program with visual routing components and drop down menu options as disclosed herein.
Figure 43:
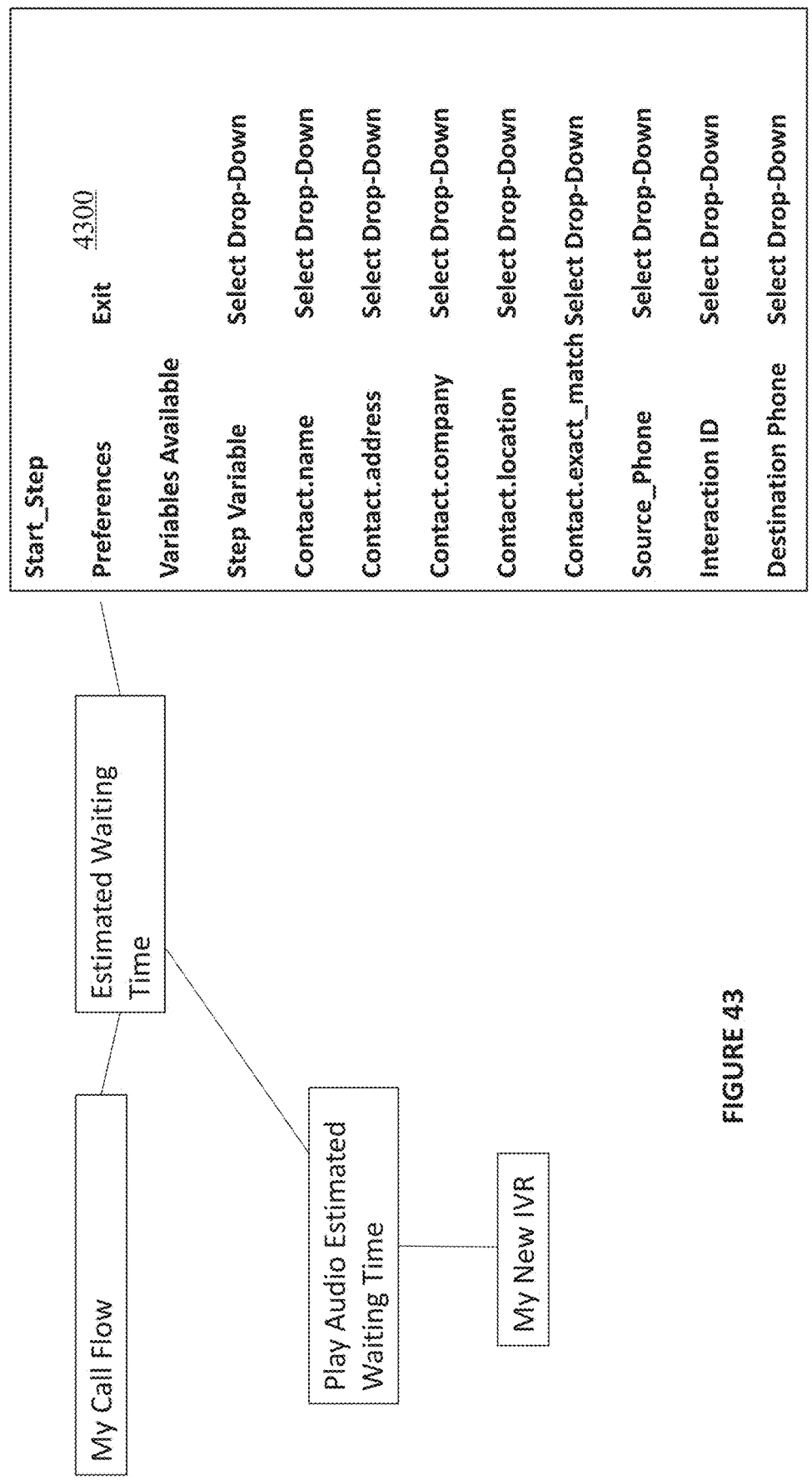
FIG. 43 is a schematic representation of a networked call center routing program with visual routing components and drop down menu options as disclosed herein.

FIGS. 39-40 illustrate Routing with the EWT Component

The graphically programmed call router enables a user to route a call based on the calculation of the Estimated Waiting Time (EWT) component. This is particularly useful if callers have to wait a long time before being connected to an agent of a particular ring group. For instance, if the EWT is more than 15 minutes, a user can send callers directly to Voicemail or to Callback. Please follow these instructions to use the EWT component to route a call:

1. Add the EWT component to your flow.
2. Open the EWT component, and select the Preferences tab.
3. Select the ring group for which the estimate will be given.
4. Add and name the variable that will store the calculated EWT. We've named ours "ewt_1".
5. Select the Exits tab.
6. Click on the drop-down under "Successful exit" and select Add new step.
7. Select the Conditional Statement component and give it a name.
8. Under "Indeterminate exit", choose where to direct the call in cases where the EWT cannot be calculated. We've selected the Assignment and Dial (A&D) component.
9. Open the Conditional Statement component, and select the Exits tab.
10. Under "Custom Exits", select "ewt_1" in the first drop-down, next select "Greater or Equal to", and in the last drop-down click on Add custom value and insert the time in seconds. We've inserted "900" seconds (equal to 15 minutes).
11. Name the Exit.
12. Click on Send to and choose where to direct the call if the EWT is 900 seconds or more. We've selected the Callback component.
13. Under "No Match", select where to direct the call in cases where the calculated EWT is not covered by the condition(s) you have set. In our example, this exit will be taken if the EWT is less than 15 minutes, so we are routing the call directly to the "Support queue" (A&D).
14. Lastly, complete the configuration of the Callback and A&D components that you have created.
    In the A&D case, you must use the same ring group that you used in the EWT component (step 3), otherwise, the EWT could be significantly different from the time the caller will effectively wait to be connected to an agent.

Updates to the graphical programming also include extensive reporting features as shown in FIG. 45, allowing for users and programmers to save reports 4500 and share with other users immediately by email or saving to a common server location. The reports include numerous analytics 4600.

The visual programming for call routing is amenable to numerous kinds of access across all computer types as shown in FIGS. 47 and 48.

The visual call routing mapping of this disclosure includes programming routes with drop down selections for flow component operation with route link identifiers visible thereon.

In other embodiments, Pan and Zoom features are available to analyze a visible call flow route with point and click operation to check an individual component.

This disclosure enables all kinds of web based call management in which the flow-based routing operational layer is independent of other telecommunications channels and IP addresses connected to the system. Instead of routing calls into a browser, certain embodiments keep the call bar active across all channels of incoming calls. The call bar therefore is active on an individual agent's hard drive or designated section of a cloud server, and the call bar can remain in place no matter what other tabs have numerous telecommunications activities thereon. In other words, this disclosure encompasses the ability to leave a call bar in place on an agent's screen regardless of other website operations on different channels.

Context data of incoming calls may be programmed in multiple components with data dips to outside information databases, and context is accessible via the call bar which can remain present on agent's screen regardless of other web operations in place on that screen. Multiple device modes still accommodate visible call bar at all times, and the context can include any object information about the caller, including name, geographic location, telephone number, mapping functions and the like.

The embodiments herein are described as managing context collection with variable definitions in call flow components. Intelligent routing of calls to particular agents or groups of agents may be accomplished by data dips based on content of flow component data and variable completion. Right now, each variable component is allowed only one data dip, but the variable can collect multiple fields from that record. The system currently requires different data dip for each record searched in an out-of-system database, but there will be developments in that regard.

The drop down menus are tied directly to the visibly present routes between routing components, and pre-programmed call assignment strategies can be viewed in each component. The pre-programmed call assignment strategies may make use of conditional statements in flow components to define which exit and the next step in a route.

The embodiments herein take advantage of traffic splitting to preferred balance of calls directed to different centers. Traffic splitting based on geographic location of call origin, based on call header data or area code can be combined with or vary the above noted weight ratios that determine which calls go to certain agents or groups of agents. Traffic splitting with weighting allows an administrator to study the reports of FIG. 45 to gauge most efficient call flow routes. For example, tracking a case history for an incoming call by telephone number or other identifying telecommunication data can server as a data point to address how to handle a certain call. Call prioritization with data dips and alert functions can also be available for agents to identify VIP calls. Call prioritization with in-house CSAT scores entered by agents also allows they system to make intelligent routing choices.

The system described herein is further characterized in part by the use of flow variables that can be defined within components to allow incoming caller to enter information across multiple channels—"omni channel data collection." This kind of multi-channel call flow routing and tracking allows for additional options such as intelligent reconnect for a dropped call so that customer who calls right back gets the same agent.

In one commercial embodiment of the system, tentatively known by example as a data explorer reporting system, can provide administrative reports across multiple channels of information collection. The report and data explorer is a customizable landing page for each user to see reporting functions of interest. This data explorer may include enhanced filtering capabilities for more granular data on each call. For example, there may be enhanced visual identification of efficiency and routing performance with multiple data types displayed directly on the screen of the visual programming call flow routes. The data explorer provides click and email report templates to users with access.

The data gathering and reporting system enables certain features such as an agent scoring module that is automatically scoring agents based on objective data gathered by the system, such as wait times, successful call completions, number of rings to answer, and the like. The agent score allows for ranking of agents according to context data stored for calls so that matching context to the best agents is possible.

The system may also be programmed to take advantage of data collection after a call has been completed, such as by compiling net promoter scores that allow callers to grade the agents and the customer experience on factors that set forth the call experience. This kind of net promoter scores for the call experiences may be gathered by channels other than the original channel a customer used to contact a data center. This kind of cross-channel data collection allows for more intensive studies of caller sentiment over the course of a call. The net promoter score can be based on objective data collected during a call, such as wait time, hold time and perceived sentiment from artificial intelligence that listen to an ongoing call. Accordingly, artificially intelligent bot operations may listen in on a call and develop a sentiment journey score by the words used and the volume or tone of a caller's input. Tracking a sentiment across a call can also give insight into areas in which agents were weak in maintaining a positive user experience.

A user's experience may be polled after a call or even during a call either on the same channel as originally used or via a simultaneously accessed parallel channel. For example, a caller may use voice data to enter a call center over a telecommunications data line, but while the call is proceeding, a user may be willing to also communicate via other channels such as simultaneous chatting or texting to give feedback on the sentiment journey for a particular call. A system according to this disclosure may ask a customer, during a call experience, or after the call is complete, to provide weights to which parts of the call are or were the most important and to rate the agent on those weighted criteria. The customer journey score and sentiment journey score can be weighted according to linear and nonlinear weighting functions across multiple criteria. This kind of weighting can give appropriate consideration to objective features of a call (time of day, length, wait times, and topic categories) but also correlate these weights to sales and success for better reporting.

Certain comprehensive software techniques are implemented to make the system more efficient behind the scenes. For example, improved performance in voice to text and text to voice can be implemented by enhanced use of punctuation (i.e., a comma after text conversion allows for slight pause in spoken version of numbers entered). Enhanced flow configuration can be available by making the exit name of a component consumable by another flow component as a variable function. Enhanced visual representation of flow links and routes may be implemented in ways such as showing telephone number on top level graphic for the destination phone number. Enhanced customer experience by seamless hold music over transfers (the music or advertisement loop starts where last left off if call is transferred to another hold situation.). The call flow features of this disclosure are also adaptable for routing all kinds of omni-channel data from all channels (voice, text, keyboard, audio, video, etc.) and the system will adapt all of the visual flow routing features to omni-channel data, even for "social media listening." The omni-channel options may even allow for switching of channels within a single call for the best customer experience.

The software embodiments described herein are appropriate for providing in functional sets that may be mixed and matched for the nature and complexity of the call center at hand. In fact, for very simple installations, the basics of the call center may be provided in a transportable and downloadable call center phone application that can be resident on a mobile device like any other "app." The user merely browses, clicks, installs, and uses. This app could be integrated with other software packages on each mobile device in an network at the option of the user.

Other installations may choose more of the blocks of software but not the "whole package" that may be available in a cloud based call center operation. Subsets of the functions available in this disclosure may be available in a web based environment because all of the functions described herein are separable so that they can be mixed and matched as necessary. In fact, a basic web based call center may be available for set up in five minutes or less because a user can select the modular functions shown in this disclosure as having independently available drop down sets, pick the number of phones or channels that should answer incoming data connections, and then simply select plug ins that will work on a browser and are available from a cloud based storage server.

The disclosure of these embodiments can be described as an intelligent call flow routing manager. In an intelligent call routing environment, the system can show an administrator (whether human or computerized artificial intelligence) and determine the usage rate of certain flow routes to and from various components. Alerts can be set up so that if certain criteria exceed a threshold, then a re-routing operation goes into effect, such as a re-routing by a back up flow route that has been previously planned. The back up flow route can also be triggered to operate simultaneously with the main flow package during peak times. In this way, over time, the system can learn where likely choke points are in a flow route. By coordinating flow weights along a route, volume across a route, choke points, and the like along with customer sentiment along a sentiment journey score, the most effective call routing can be implemented.

This disclosure has one non-limiting goal of building effective networks of call flow routes, data networks, and human agent interaction with customers, along with artificially intelligent assistants that also interact with the customers. The system may be either language based so that certain language inputs lead to actions and flows, or the system may be language agnostic in that a language processor can translate options and inputs from one language to another. A poly-linguistic portion of a flow may translate the incoming data to its most efficiently used form—foreign and domestic spoken languages for flows to humans and digital numeric languages for flows to other computers. In this way, incoming and outgoing data flows in a customer call center may be equally conversant with human agents, chat bots, IVRs, CRM data dips, and the like.

The invention claimed is:

1. A method for operation of a graphically interactive voice response (IVR) system for processing customer communications, the method comprising:
    presenting, on a computerized display for call routing, a graphical representation that allows a user to see a call flow route and a series of drop-down menus indicating options for transmitting incoming call data within an organization corresponding to the call flow route, said options including at least one intelligent virtual agent (IVA) component; and
    adding, to the computerized display, a graphical indication of an option selected by the user from the series of drop down menus and representing on the graphical representation a change to the call flow route based on the options from the series of drop-down menus selected by the user.

2. The method of claim 1 wherein the IVA component comprises a plurality of subcomponents for artificial intelligence (AI), machine learning (ML), and advanced speech technologies (AST).

3. The method of claim 2 wherein the AST provides at least one of natural language understanding (NLU), natural language processing (NLP), or natural language generation (NLG).

4. The method of claim 1 wherein the IVA component simulates a live unstructured cognitive conversation for at least one of a voice channel, a text channel, or a digital interactions channel.

5. The method of claim 1 wherein the IVA component is capable of listening in on an ongoing call.

6. The method of claim 5 wherein the IVA component produces a sentiment journey score based on at least one of one or more words utilized by the customer, a volume of the customer, or a tone of input from the customer derived from listening in on the ongoing call.

7. The method of claim 1 wherein the AST is capable of interfacing with an AI administrator for call routing.

8. A graphically interactive voice response (IVR) system for processing customer communications, said system comprising a memory, a call management subsystem, and a processor for:
    presenting, on a computerized display for call routing, a graphical representation that allows a user to see a call flow route and a series of drop-down menus indicating options for transmitting incoming call data within an organization corresponding to the call flow route, said options including at least one intelligent virtual agent (IVA) component; and
    adding, to the computerized display, a graphical indication of an option selected by the user from the series of drop down menus and representing on the graphical representation a change to the call flow route based on the options from the series of drop-down menus selected by the user.

9. The system of claim 8 wherein the IVA component comprises a plurality of subcomponents for artificial intelligence (AI), machine learning (ML), and advanced speech technologies (AST).

10. The system of claim 9 wherein the AST provides at least one of natural language understanding (NLU), natural language processing (NLP), or natural language generation (NLG).

11. The system of claim 8 wherein the IVA component simulates a live unstructured cognitive conversation for at least one of a voice channel, a text channel, or a digital interactions channel.

12. The system of claim 8 wherein the IVA component is capable of listening in on an ongoing call.

13. The system of claim 12 wherein the IVA component produces a sentiment journey score based on at least one of one or more words utilized by the customer, a volume of the customer, or a tone of input from the customer derived from listening in on the ongoing call.

14. The system of claim 8 wherein the AST is capable of interfacing with an AI administrator for call routing.

15. A non-transitory computer-readable medium comprising computer-readable instructions for processing customer communications that, when executed by a processor, cause the processor to:
    present, on a computerized display for call routing, a graphical representation that allows a user to see a call flow route and a series of drop-down menus indicating options for transmitting incoming call data within an organization corresponding to the call flow route, said options including at least one intelligent virtual agent (IVA) component; and
    add, to the computerized display, a graphical indication of an option selected by the user from the series of drop down menus and representing on the graphical representation a change to the call flow route based on the options from the series of drop-down menus selected by the user.

16. The computer-readable medium of claim 15 further comprising instructions whereby the IVA component comprises a plurality of subcomponents for artificial intelligence (AI), machine learning (ML), and advanced speech technologies (AST), wherein the AST provides at least one of natural language understanding (NLU), natural language processing (NLP), or natural language generation (NLG).

17. The computer-readable medium of claim 15 further comprising instructions whereby the IVA component simulates a live unstructured cognitive conversation for at least one of a voice channel, a text channel, or a digital interactions channel.

18. The computer-readable medium of claim 15 further comprising instructions whereby the IVA component is capable of listening in on an ongoing call.

19. The computer-readable medium of claim 18 further comprising instructions whereby the IVA component produces a sentiment journey score based on at least one of one or more words utilized by the customer, a volume of the customer, or a tone of input from the customer derived from listening in on the ongoing call.

20. The computer-readable medium of claim 15 further comprising instructions whereby the AST is capable of interfacing with an Al administrator for call routing.

\* \* \* \* \*